United States Patent [19] [11] 4,125,325

Batchelor et al. [45] Nov. 14, 1978

[54] AUTOMATIC DUPLEX CONTROL SYSTEM FOR A REPRODUCTION MACHINE

[75] Inventors: Phillip J. Batchelor; Gerald A. Gray, Jr.; Kenneth W. Laskowski; Stephen P. Wilczek, all of Fairport, N.Y.

[73] Assignee: Xerox Corporation, Stamford, Conn.

[21] Appl. No.: 829,020

[22] Filed: Aug. 30, 1977

[51] Int. Cl.[2] ...................... G03G 15/00; G03B 27/32

[52] U.S. Cl. ........................................ 355/26; 355/77; 355/14

[58] Field of Search ..................... 355/3 R, 14, 77, 23, 355/24, 26; 271/3.1, 9

[56] References Cited

U.S. PATENT DOCUMENTS

| | | | |
|---|---|---|---|
| 3,940,210 | 2/1976 | Donohue | 355/14 |
| 3,944,359 | 4/1976 | Fiske et al. | 355/14 |
| 3,944,360 | 3/1976 | Deetz et al. | 355/14 |
| 4,014,609 | 3/1977 | Ver Schage et al. | 355/14 |
| 4,035,072 | 7/1977 | Deetz et al. | 355/14 |
| 4,050,805 | 9/1977 | Hage | 355/14 |
| 4,067,649 | 1/1978 | Hubbard et al. | 355/14 |

*Primary Examiner*—L. T. Hix
*Assistant Examiner*—W. J. Brady

[57] ABSTRACT

A reproduction machine for making two-sided or duplex copies. When there is an odd number of simplex original documents to be copied in the duplex mode, the last copy sheet bears an image only on one side. The present invention provides a control system for operating various machine components in response to such an occurrence in order to optimize the throughput capability of the machine.

10 Claims, 49 Drawing Figures

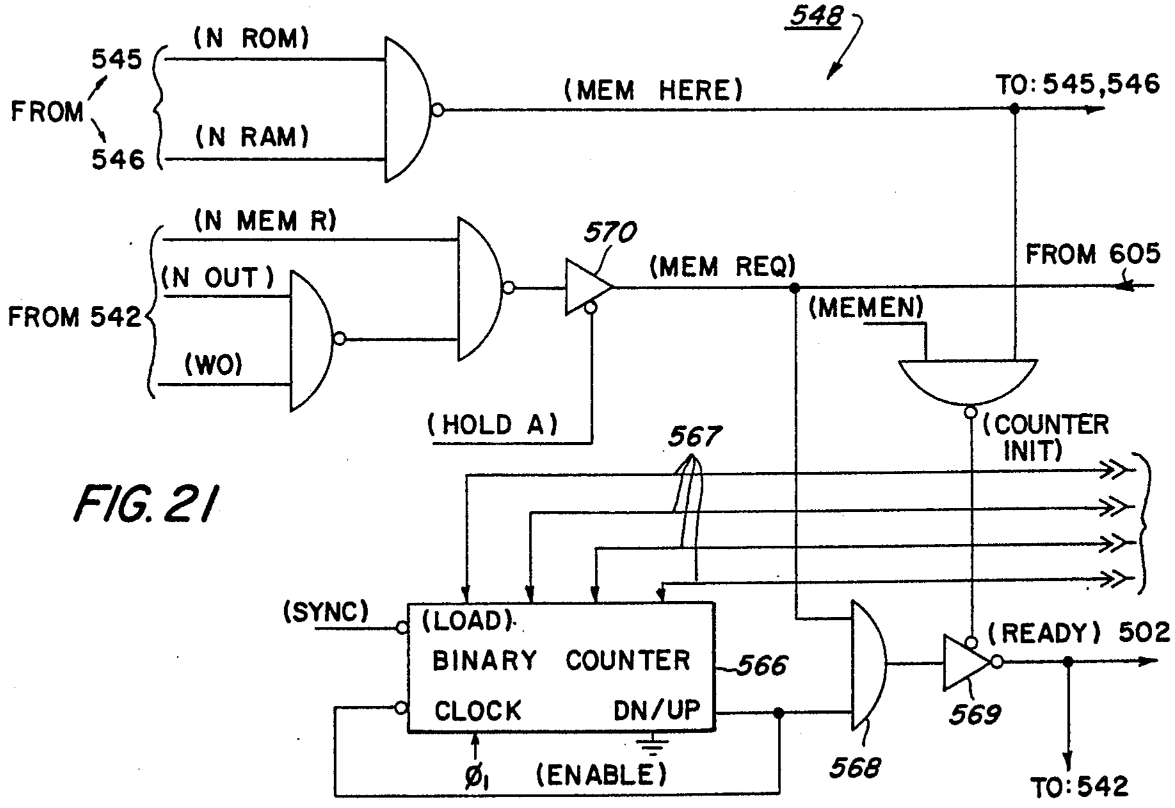
FIG. 21
MEMORY READY
FIG. 24
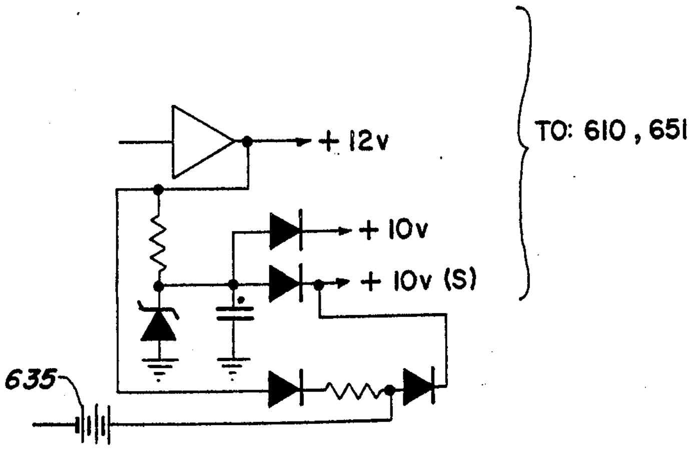

LEGEND:
CF - CONTROLLER FAULT
BF - BUS FAULT
RF - REMOTE FAULT

STATE CHECKER ROUTINE (TABLE I)

MACHINE INTERRUPT ROUTINE

LEGEND:
PNTR- POINTER
INCRM-INCREMENT
REL-RELATIVE
ADDR-ADDRESS
SR-SHIFT REGISTER
REG-REGISTER
SUBR-SUBROUTINE

REAL TIME INTERRUPT

LEGEND:

PNTR - POINTER
RTC - REAL TIME COUNTER
CNTR - COUNTER
REG - REGISTER

AUTOMATIC DUPLEX CONTROL SYSTEM FOR A REPRODUCTION MACHINE

BACKGROUND OF THE INVENTION

This invention relates to electrostatographic xerographic type reproduction machines, and more particularly, to an improved control system for such machines.

The advent of higher speed and more complex copiers and reproduction machines has brought with it a corresponding increase in the complexity in the machine control wiring and logic. While this complexity manifests itself in many ways, perhaps the most onerous involves the inflexibility of the typical control logic/wiring systems. For as can be appreciated, simple unsophisticated machines with relatively simple control logic and wiring can be altered and modified easily to incorporate changes, retrofits, and the like. Servicing and repair of the control logic is also fairly simple. On the other hand, some modern high speed machines, which often include sorters, a document handler, choice of copy size, multiple paper trays, jam protection and the like have extremely complex logic systems making even the most minor changes and improvements in the control logic difficult, expensive and time consuming. And servicing or repairing the machine control logic may similarly entail substantial difficulty, time and expense.

To mitigate problems of the type alluded to, a programmable controller may be used, enabling changes and improvements in the machine operation to be made through the expediency of reprogramming the controller. However, the control data which operates the machine and which is stored in the controller memory pending use, must be transferred to the various machine components at the proper time and in the correct sequence without unduly interfering with or intruding unnecessarily upon the other essential functions and operations of the controller.

The present day reproduction machine may include a variety of features such as the ability to make two-sided or duplex copies, as well as sorting individual sets of copies for easy retrieval by the user. The present invention is directed to a control system for automatically producing duplex copies and for collating sets of copies in proper numerical order. It was discovered that special consideration must be given to the control of the machine parameters when the number of original documents to be copied is odd. Otherwise unnecessary duplication of machine cycles may be required thereby resulting in the degradation of the speed of the machine.

OBJECTS AND SUMMARY OF THE INVENTION

Therefore, it is the primary object of this invention to provide a control system for a reproduction machine to permit duplex copying automatically, while at the same time optimizing the throughput capability of the machine.

This and other objects of the invention are accomplished by the interactive control of various machine components to provide automatic duplex copying capabilities, preferably under the command of a digital computer. The machine includes an automatic document handler (ADH) for locating originals to be copied on an exposure platen whereby images are subsequently formed on a photoreceptor. The images are transferred to copy sheets and fused to form finished copies on at least one side. If duplex copies are desired, a deflector mechanism prevents the finished copies from proceeding to an output receptacle such as an output tray or sorter, but directs them back to a container from which the copy sheets are subsequently fed to transfer another image on the back or second side of the sheets. If the last original document to be copied is odd in number the deflector is inhibited by the control system so that the finished copies proceed directly to the output receptacle without being fed back to unnecessarily complete the entire duplex copying feed back cycle.

BRIEF DESCRIPTION OF THE DRAWINGS

Other objects and advantages will be apparent from the ensuing description and drawings in which:

FIG. 21 is a logic schematic of the CPU memory ready;

FIG. 24 is a logic schematic of the nonvolatile memory power supply;

DETAILED DESCRIPTION OF THE PREFERRED EMBODIMENT OF THE INVENTION

Figure 1:
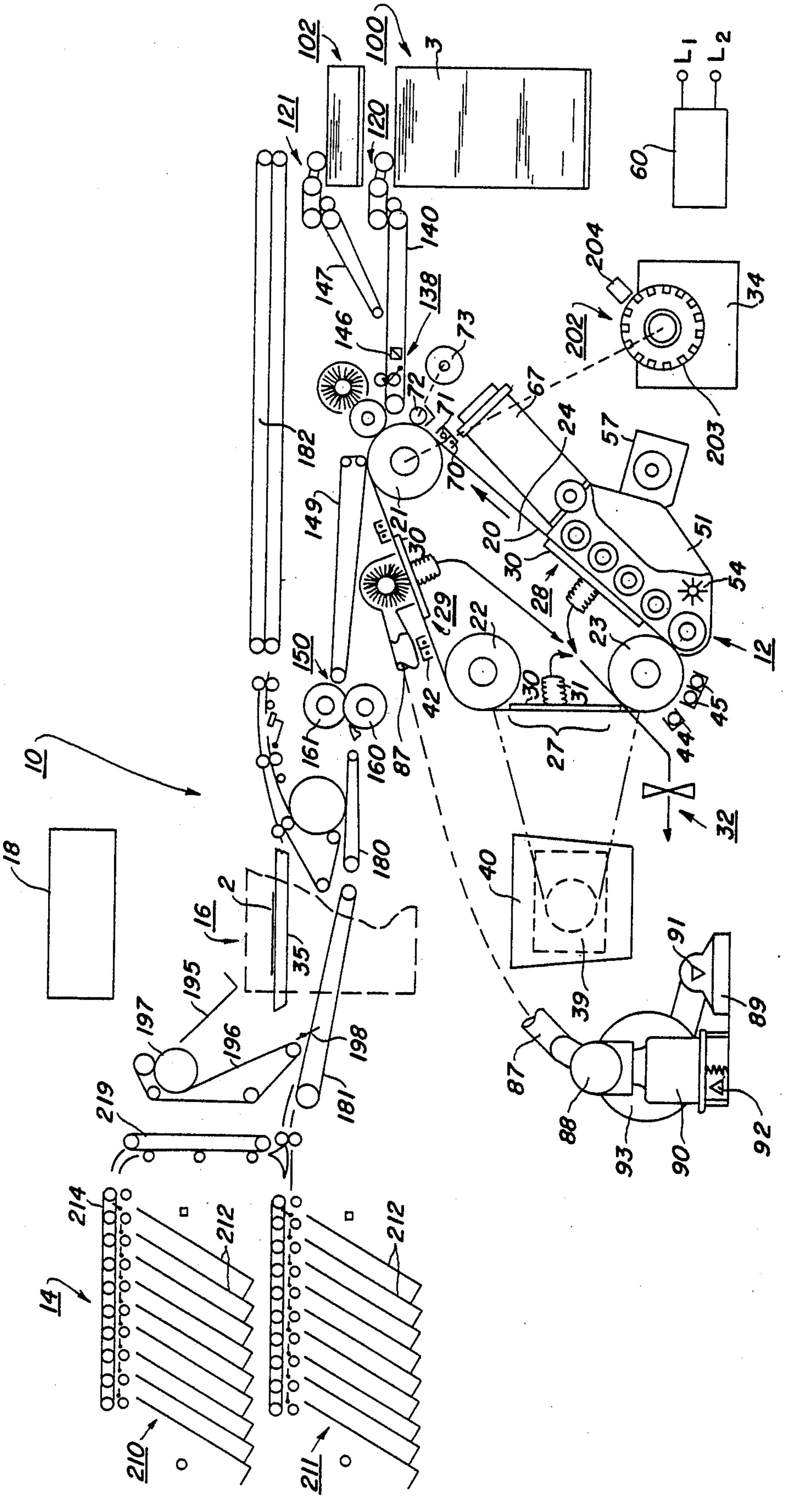
FIG. 1 is a schematic representation of an exemplary reproduction apparatus incorporating the control system of the present invention.
Figure 2:
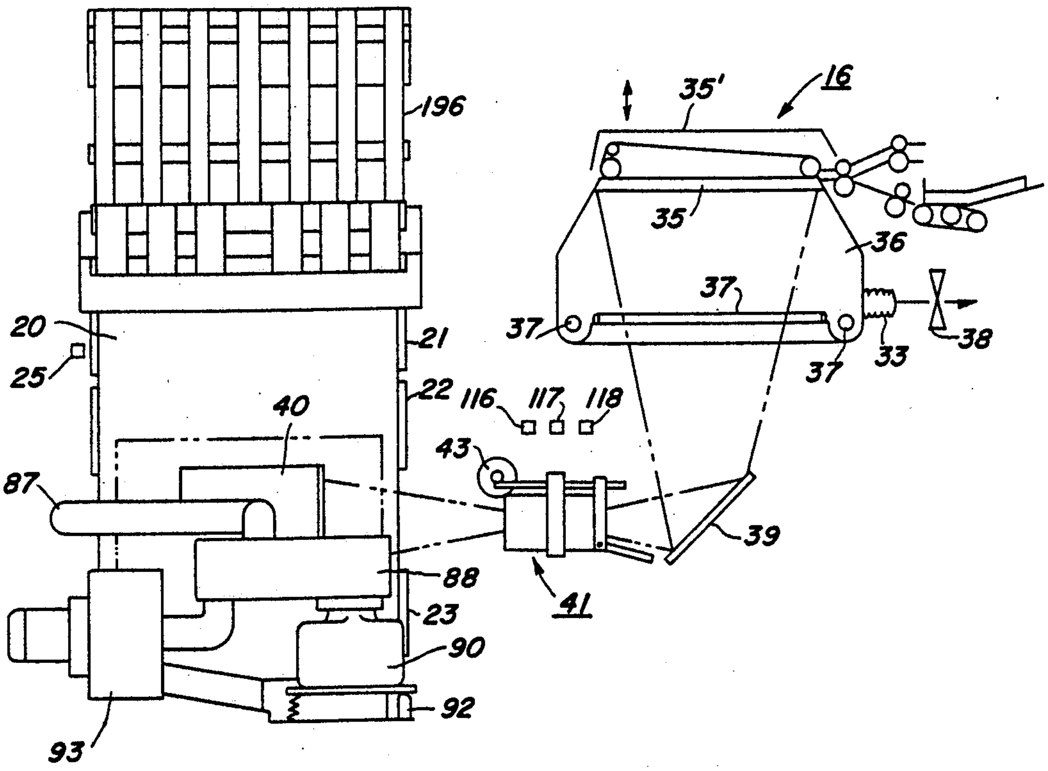
FIG. 2 is a vertical sectional view of the apparatus shown in FIG. 1 along the image plane.
Figure 3:
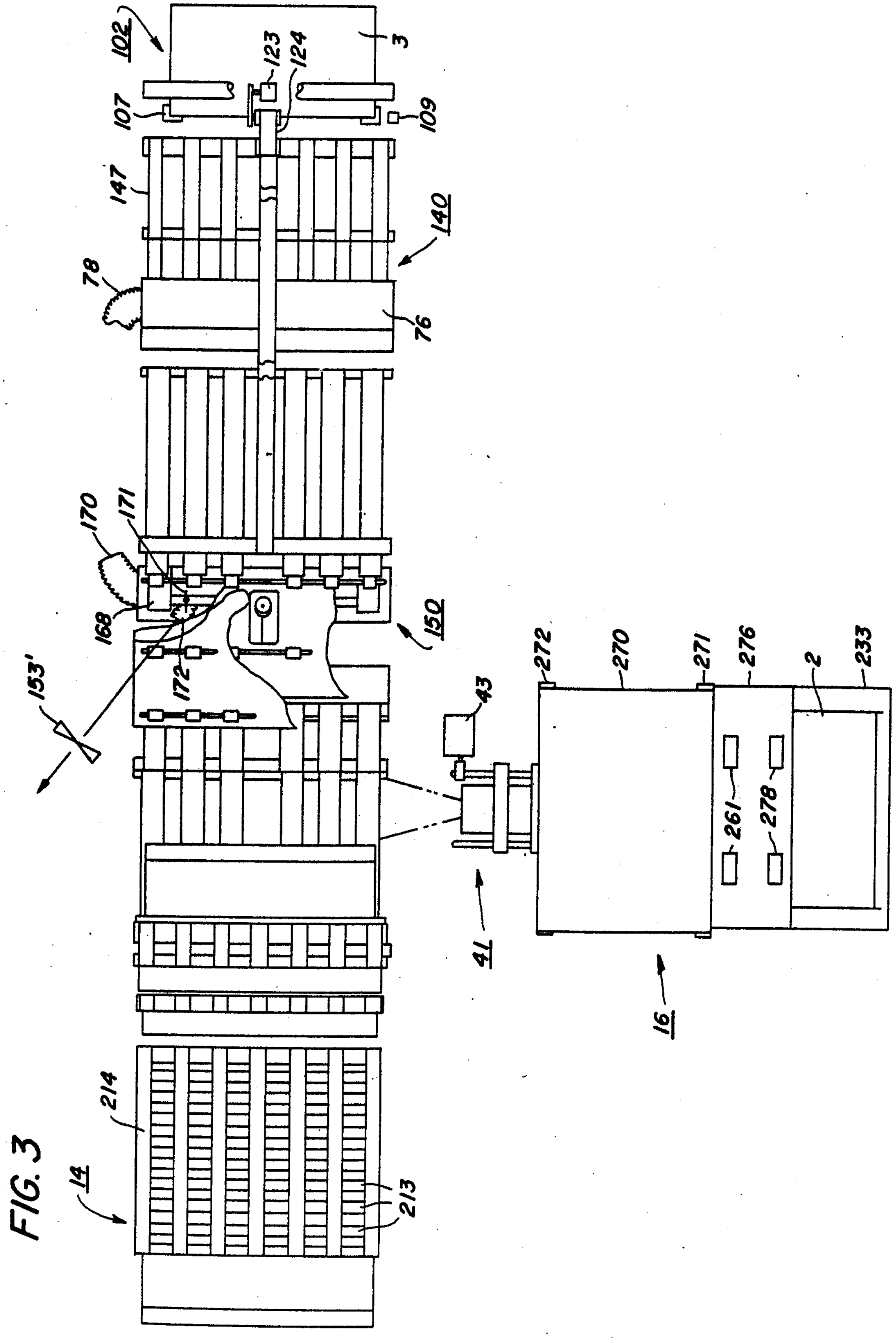
FIG. 3 is a top plane view of the apparatus shown in FIG. 1.

Referring particularly to FIGS. 1-3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
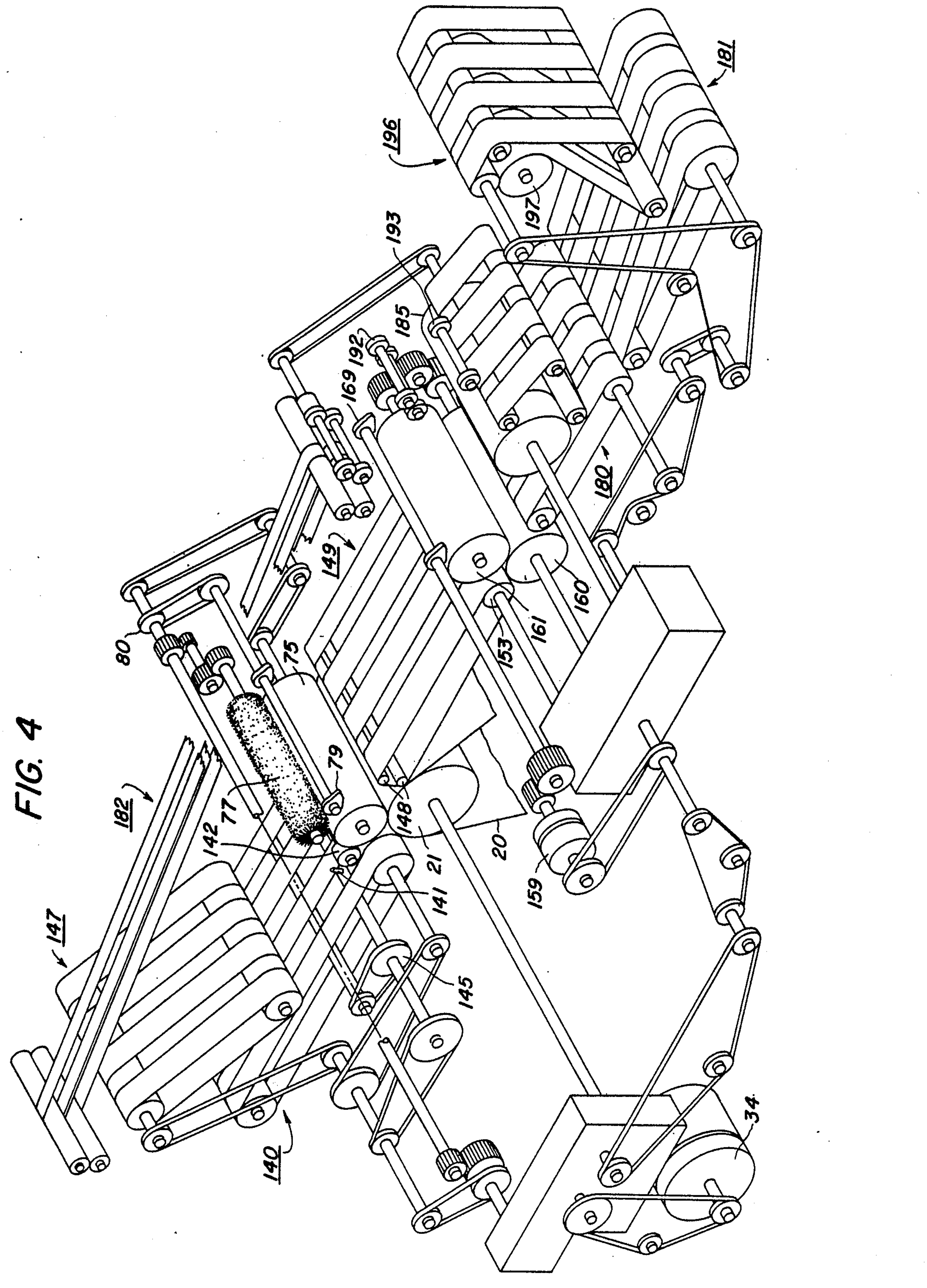
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
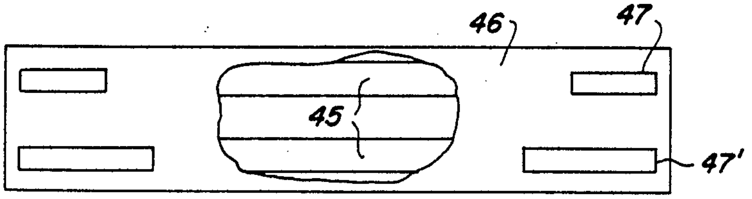
FIG. 5 is an enlarged view showing details of the photoreceptor edge fade-out mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
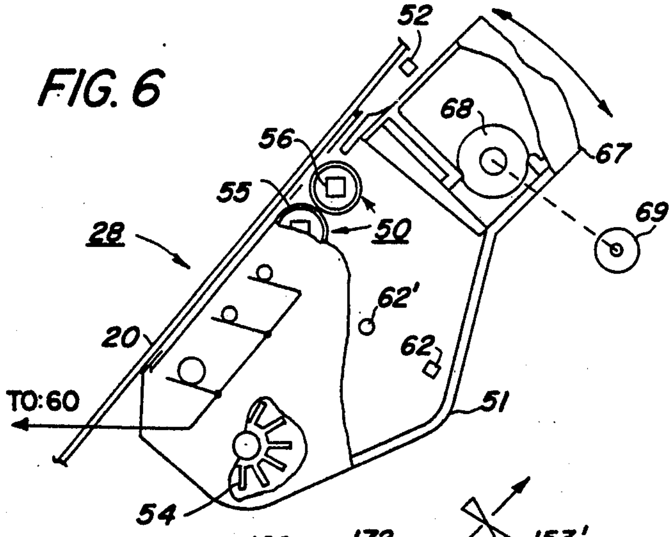
FIG. 6 is an enlarged view showing details of the developing mechanism for the apparatus shown in FIG. 1.
Figure 7:
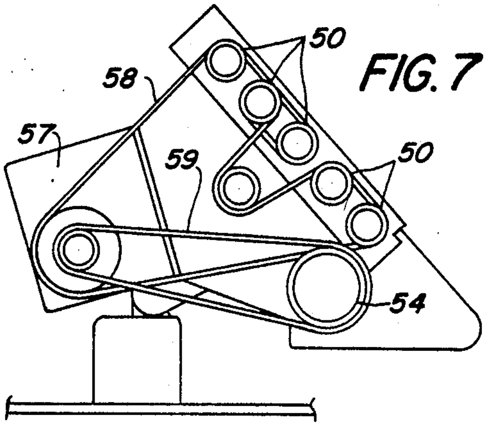
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
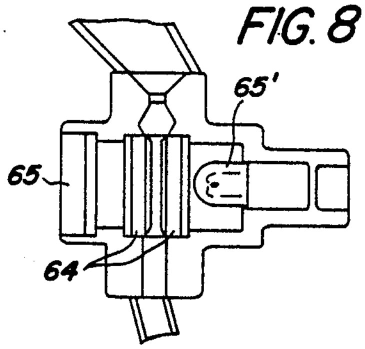
FIG. 8 is an enlarged view showing details of the developability control for the apparatus shown in FIG. 1.
Figure 11:
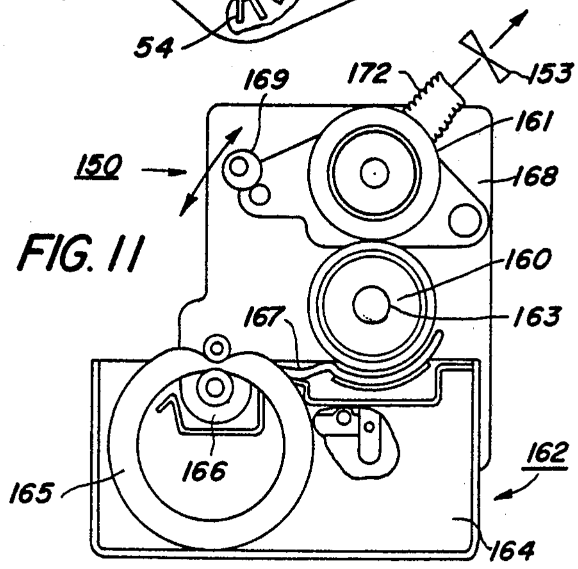
FIG. 11 is an enlarged view showing details of the fuser for the apparatus shown in FIG. 1.

Developing material is returned to the upper portion of developer housing 51 for reuse and is accomplished by utilizing a photocell 62 which monitors the level of developing material in housing 51 and a photocell lamp 62' spaced opposite to the photocell 62 in cooperative relationship therewith. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plate 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
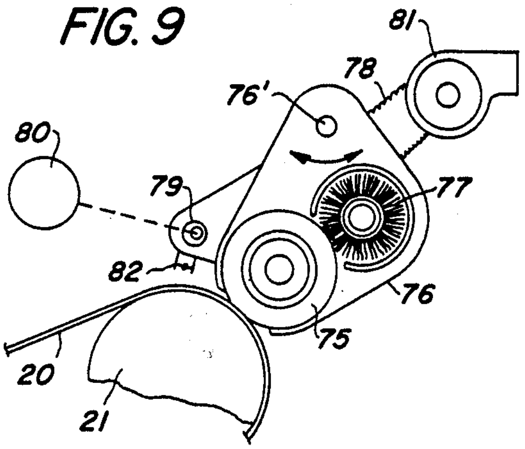
FIG. 9 is an enlarged view showing details of the transfer roll support mechanism for the apparatus shown in FIG. 1.
Figure 12:
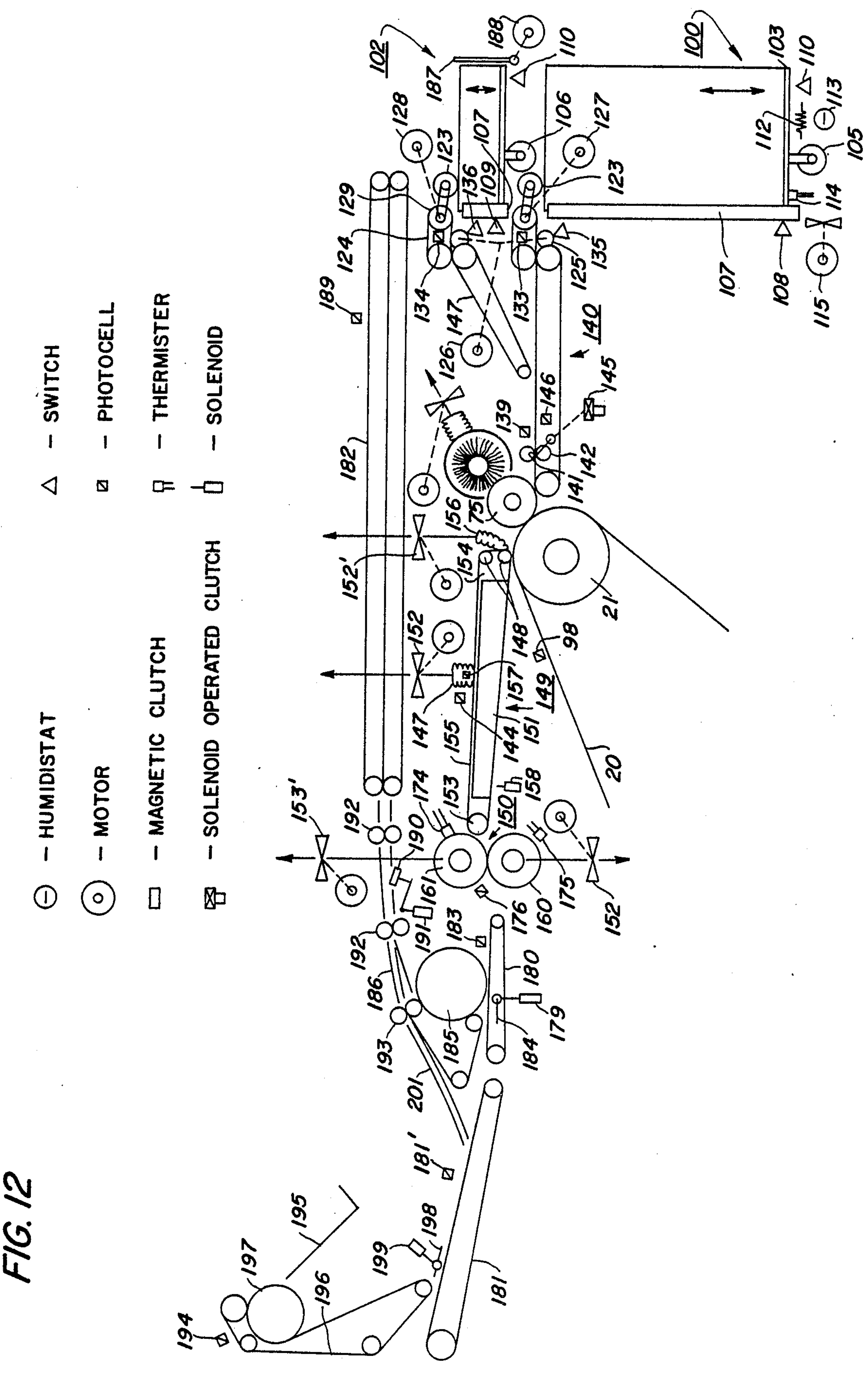
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted at 76' to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
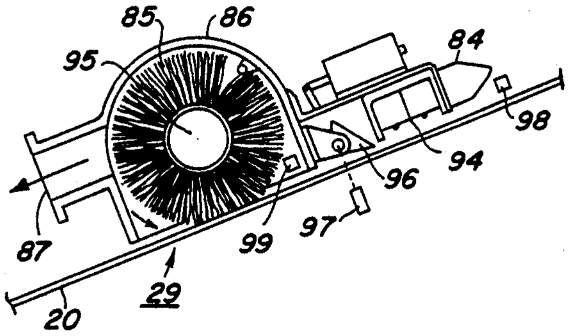
FIG. 10 is an enlarged view showing details of the photoreceptor cleaning mechanism for the apparatus shown in FIG. 1.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Sensor 175 protects against fuser overtemperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. The forward stop 187 of trays 102 is supported for oscillating movement. Motor 188 drives stop 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
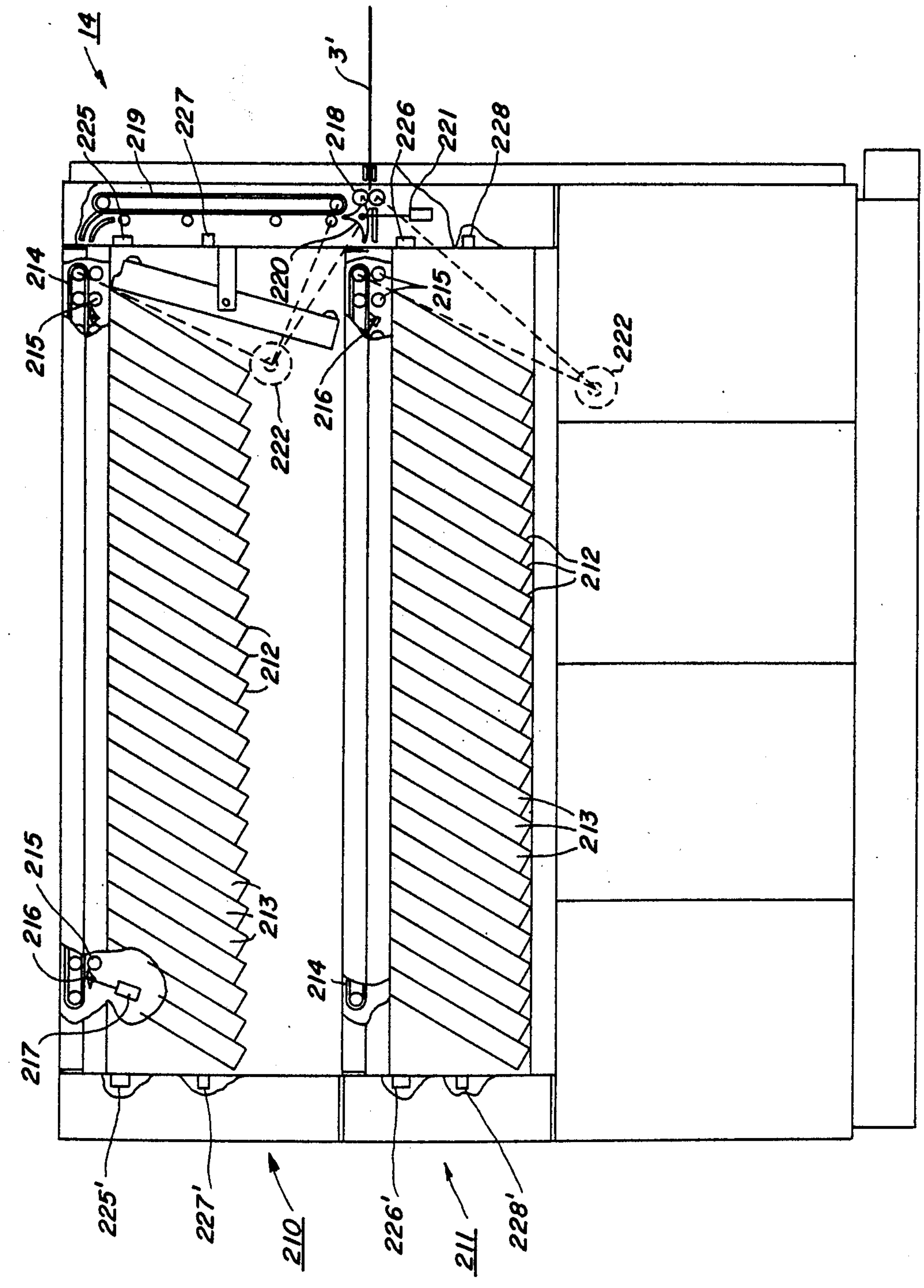
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual defelctors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided for each bin array to drive the conveyors 214 and 219 of upper bin array 210 and conveyor 214 of lower bin array 211. Roll pair 218 is drivingly coupled to both motors.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Reference lamps 227', 228' are disposed opposite sensors 227, 228.

DOCUMENT HANDLER

Figure 14:
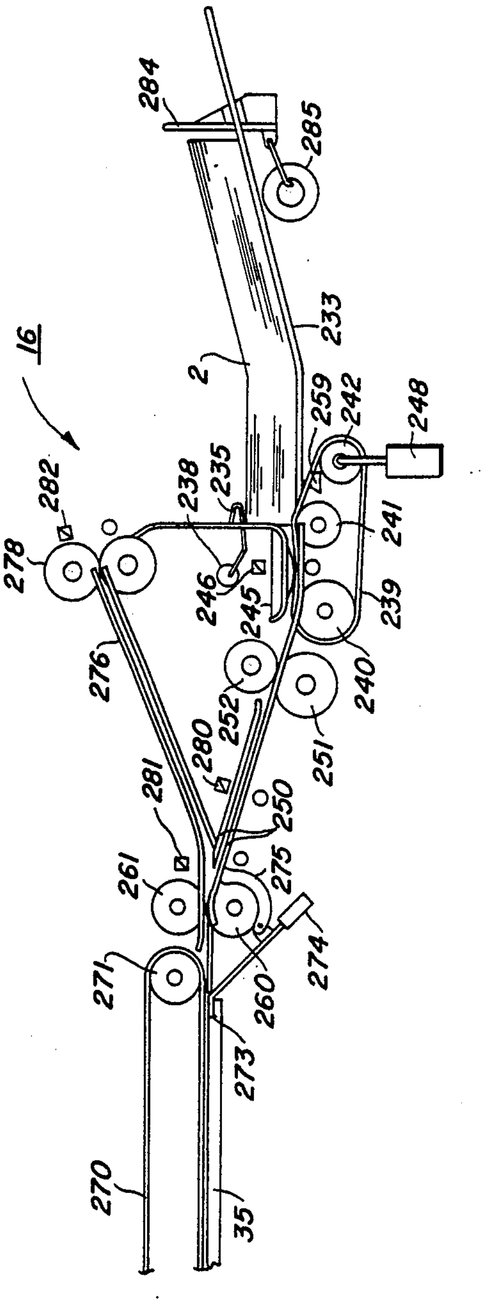
FIG. 14 is a schematic view showing details of the document handler for the apparatus shown in FIG. 1.
Figure 15:
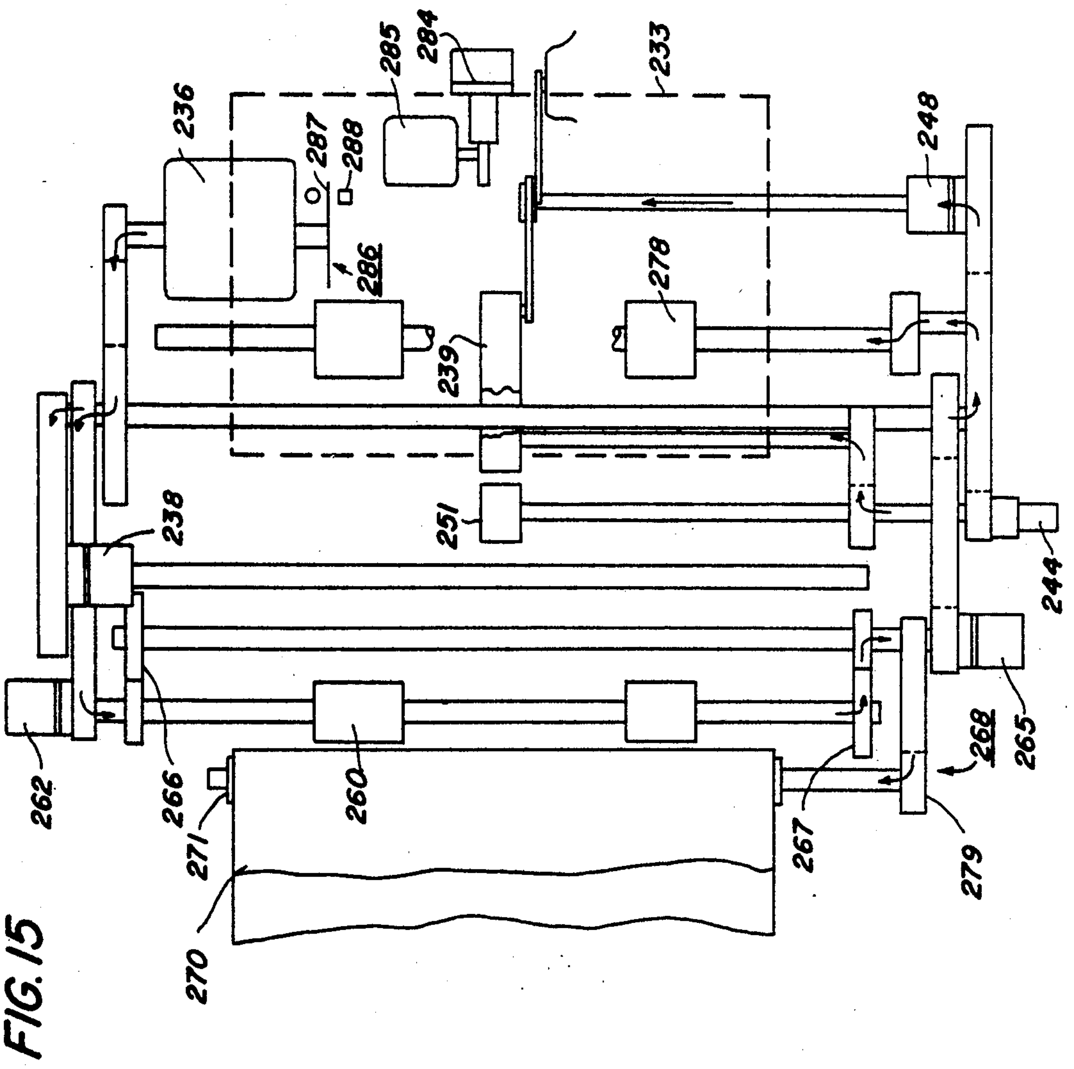
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail bar or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that the following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine driven clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
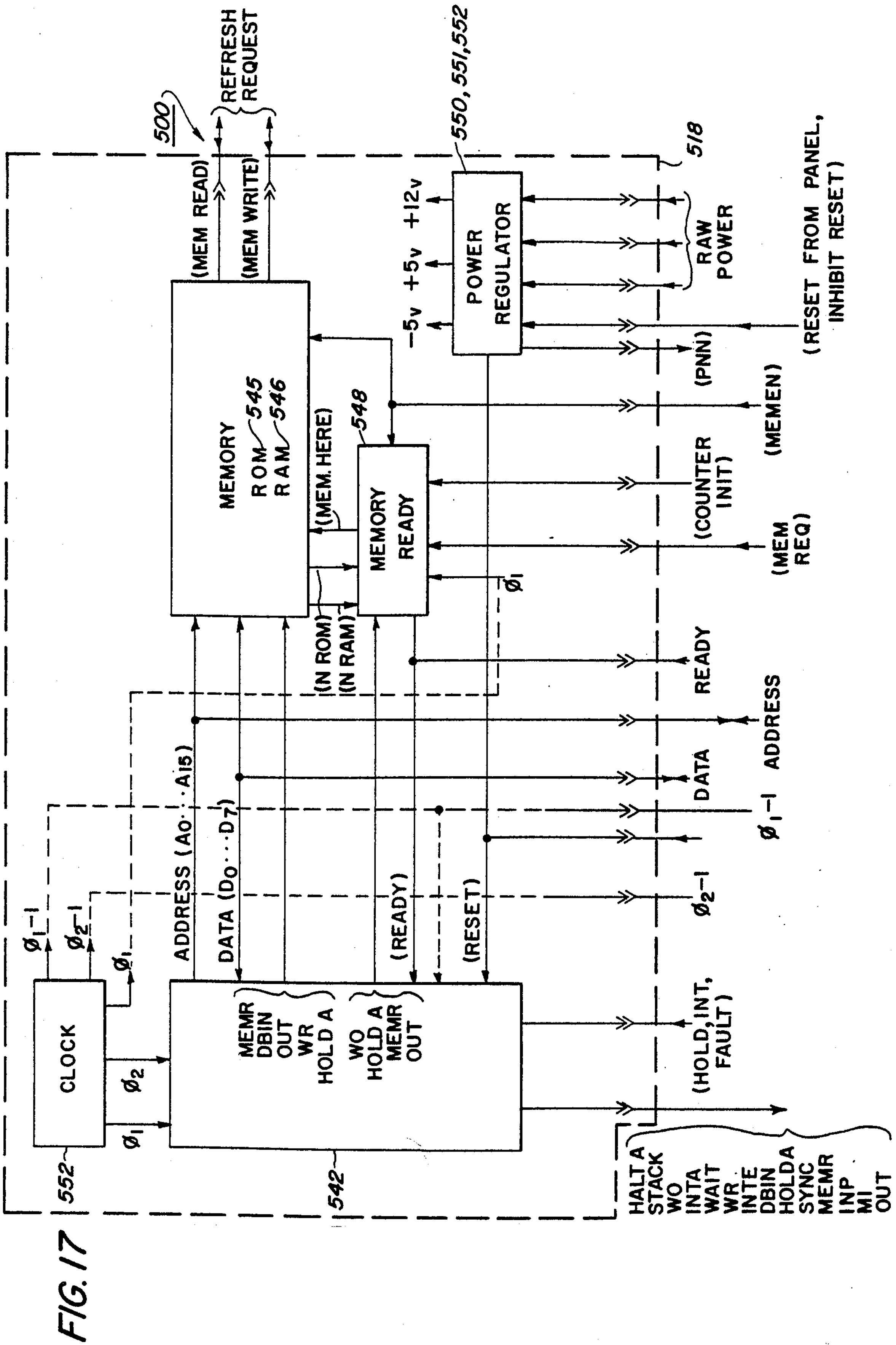
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock derived from clock 552 of FIG. 17, is utilized to control internal operations of the controller 18 as is known in the art, as well as the timing of some of the machine components.

CONTROLLER

Figure 16:
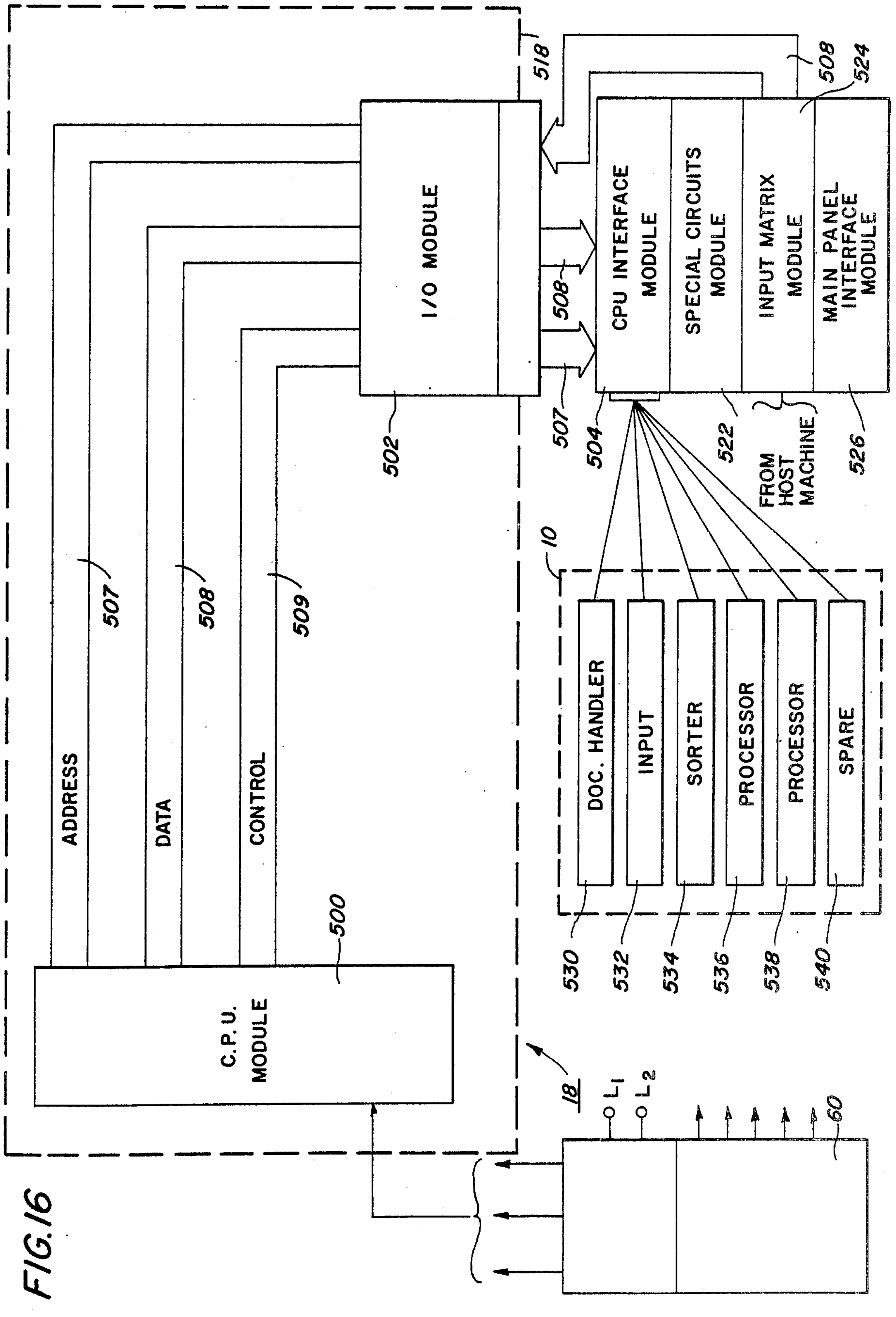
FIG. 16 is a block diagram of the controller for the apparatus shown in FIG. 1.

Referring to FIG. 16, controller 18 includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
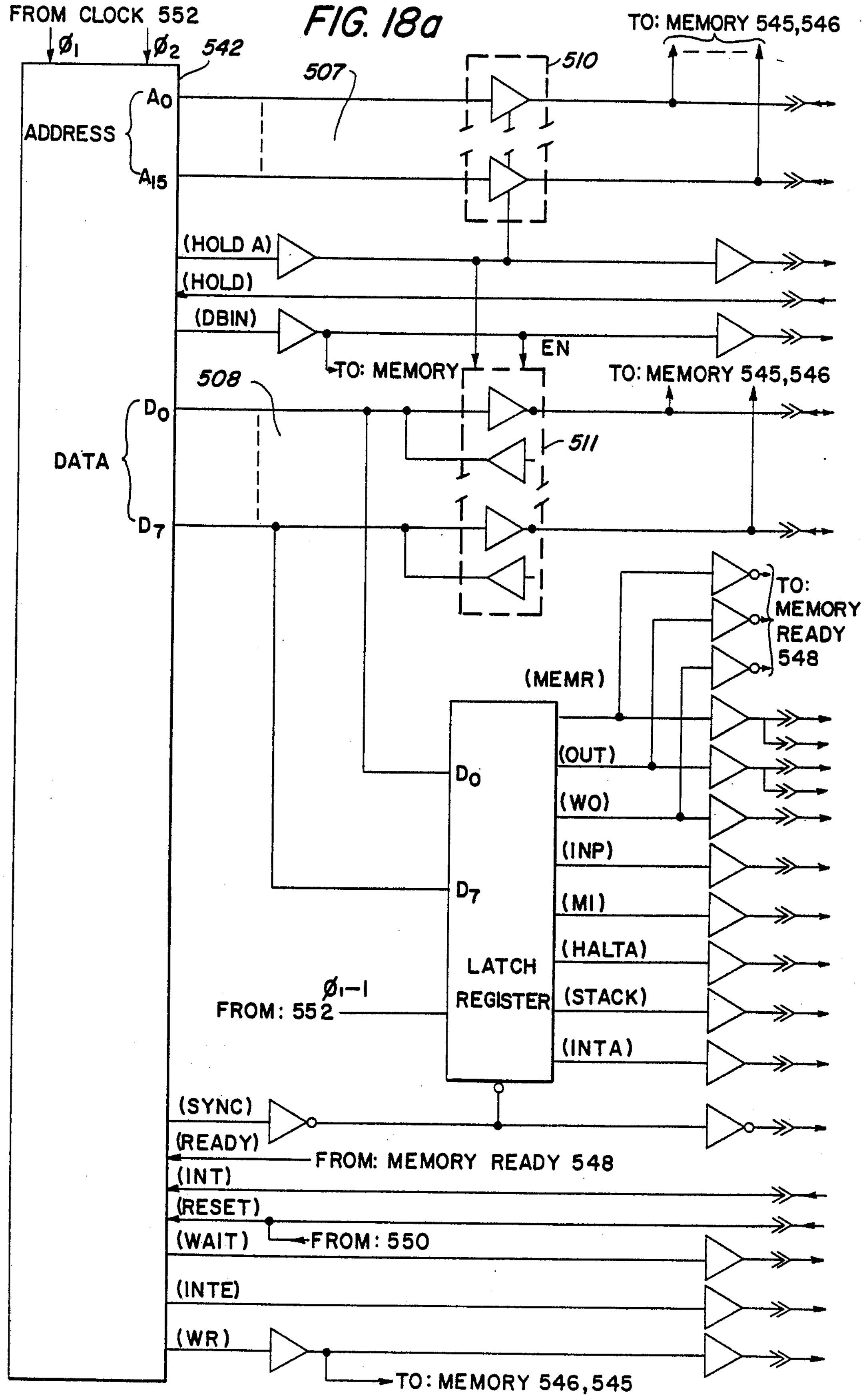
FIG. 18*a* is a block diagram showing the CPU microprocessor input/output connections.
Figure 18B:
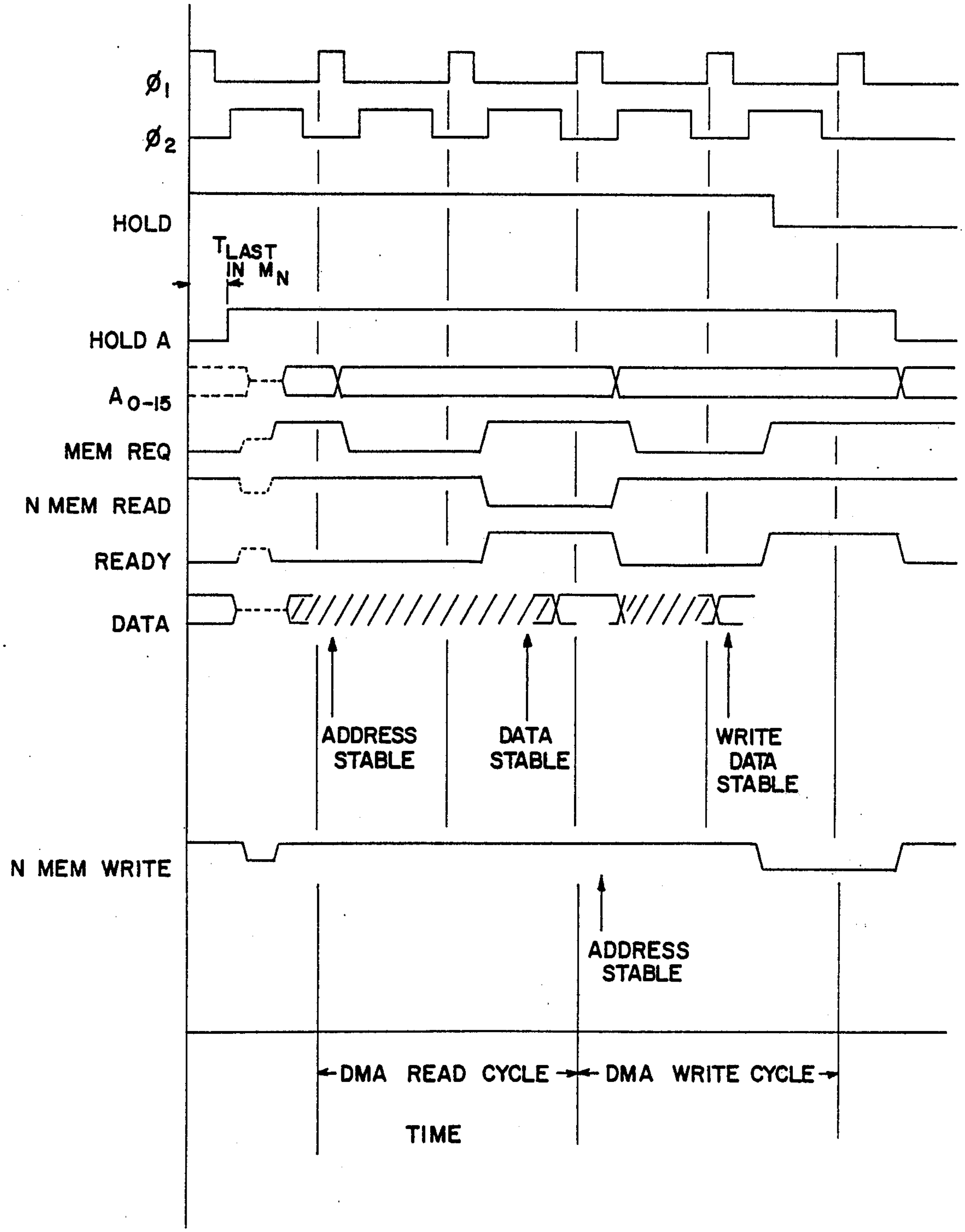
FIG. 18*b* is a timing chart of Direct Memory access (DMA) Read and Write cycles.

Referring to FIGS. 17, 18, CPU module 500 comprises a processor 542 such as an Intel 8080 microprocessor manufactured by Intel Corporation, Santa Clara, Calif. 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
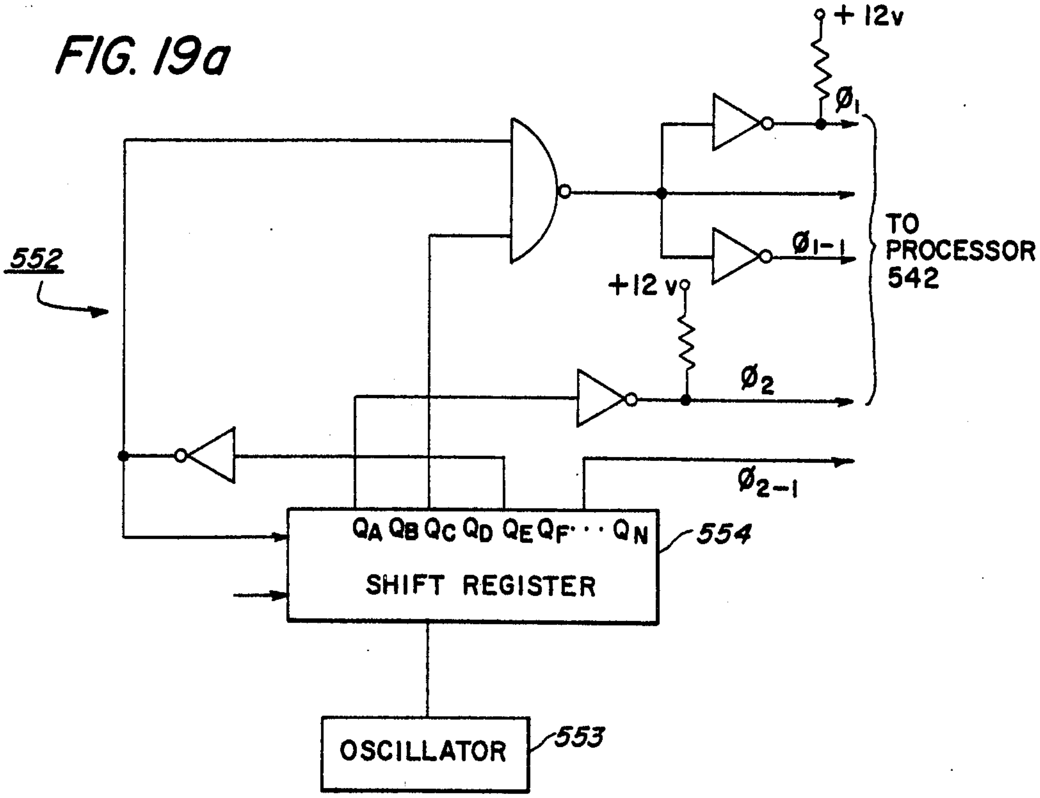
FIG. 19*a* is a logic schematic of the CPU clock.
Figure 19B:
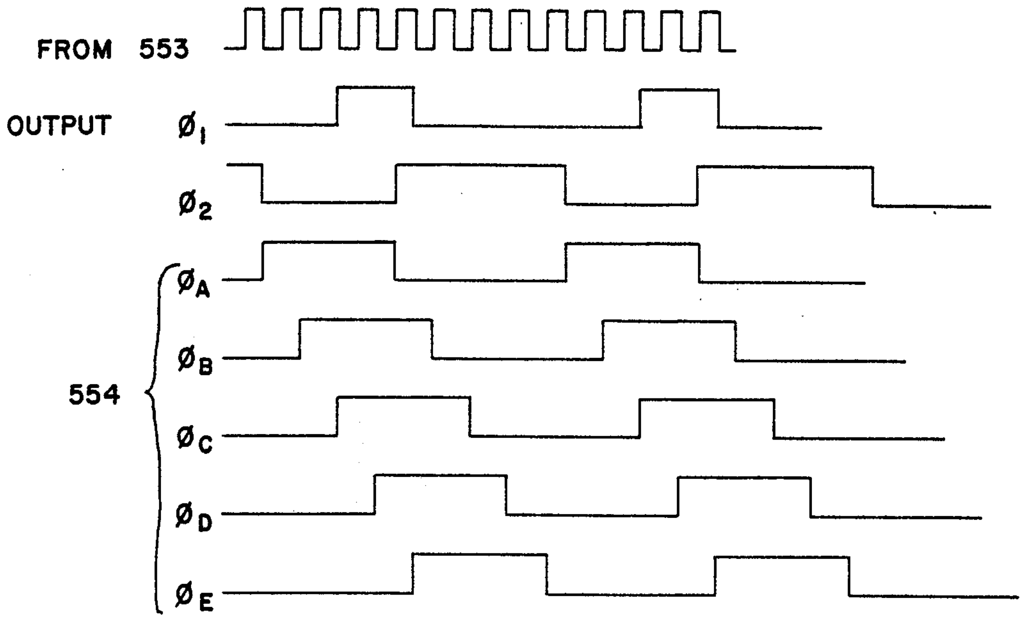
FIG. 19*b* is a chart illustrating the output wave form of the clock shown in FIG. 19*a*.

Referring particularly to FIG. 19, clock 552 comprises a suitable clock oscillator 553 feeding a multi-bite (Qa–Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Figure 20:
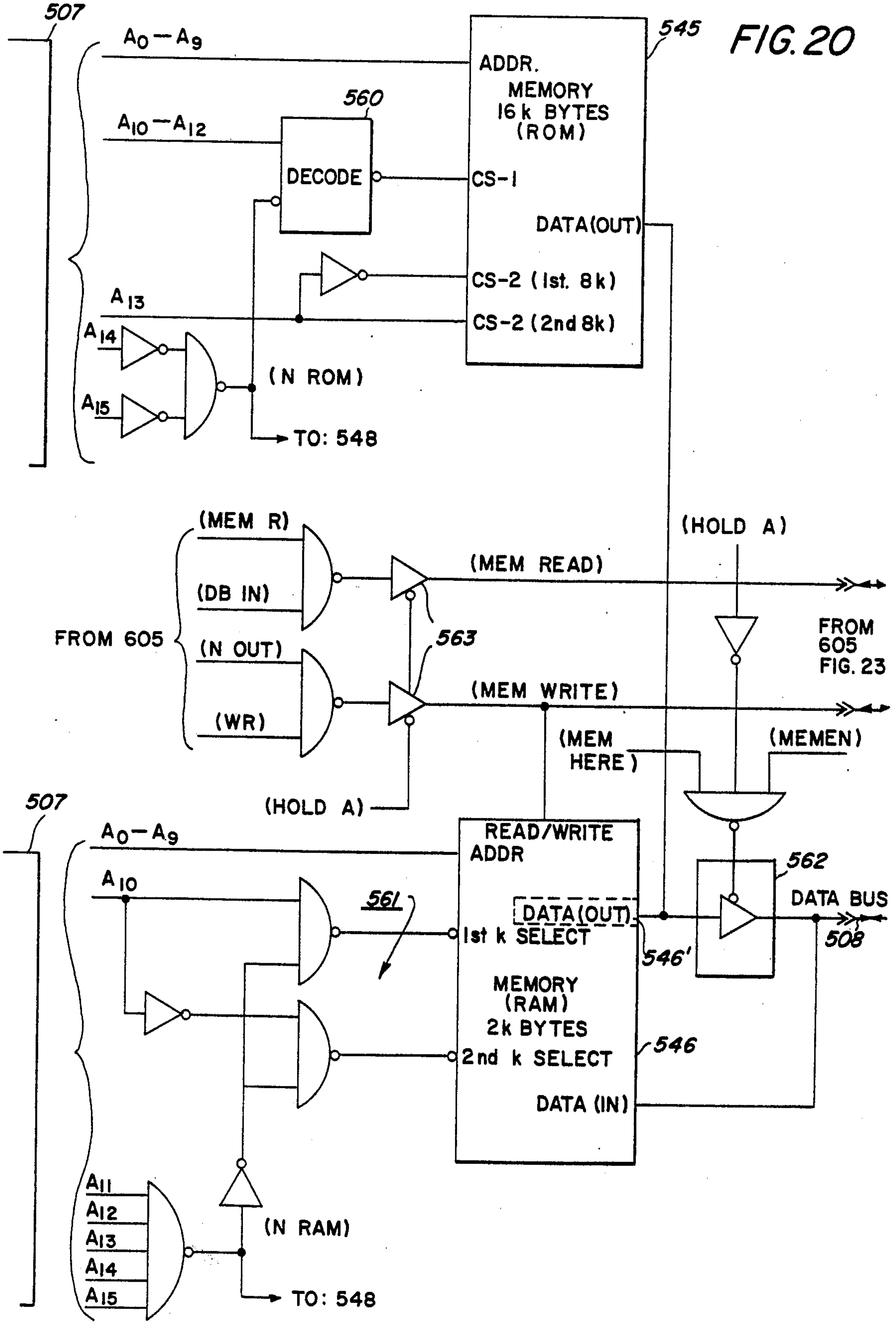
FIG. 20 is a logic schematic of the CPU memory.

Referring to FIG. 20, the memory bytes in ROM section 545 are implemented by address signals (A0–A15) from processor 542, selection being effected by 3 to 8 decode chip 560 controlling chip select 1 (CS-1) and a 1 bit selection (A13) controlling chip select 2 (CS-2). The most significant address bits (A14, A15) select the first 16K of the total 64 bytes of the addressing space. The memory bytes in RAM section 546 are implemented by Address signals (A0–A15) through selector circuit 561. Address bit A10 serves to select the memory bank while the remaining five most significant bits (A11–A15) select the last 2K bytes out of the 64K bytes of addressing space. RAM memory section 546 includes a 40 bit output buffer the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
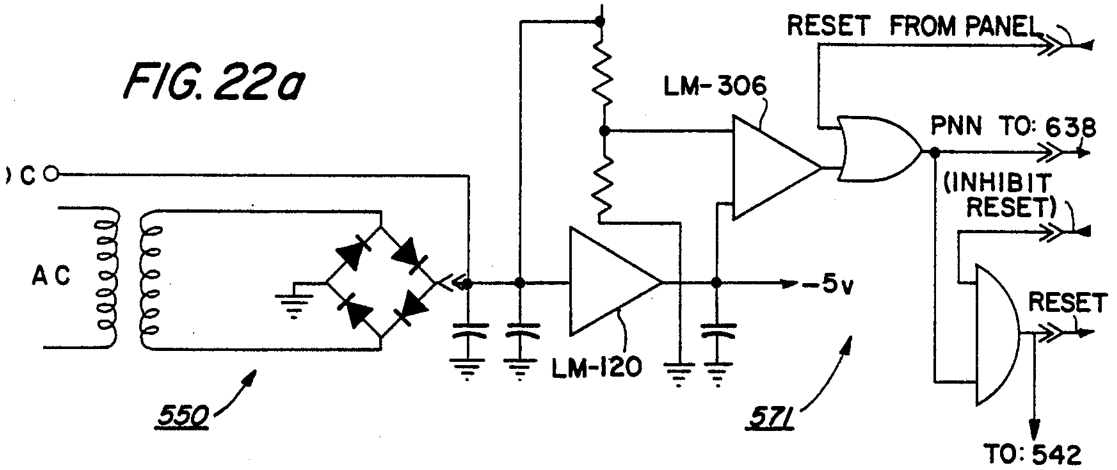
FIGS. 22*a*, 22*b*, 22*c* are logic schematics of the CPU power supply stages.
Figure 22B:
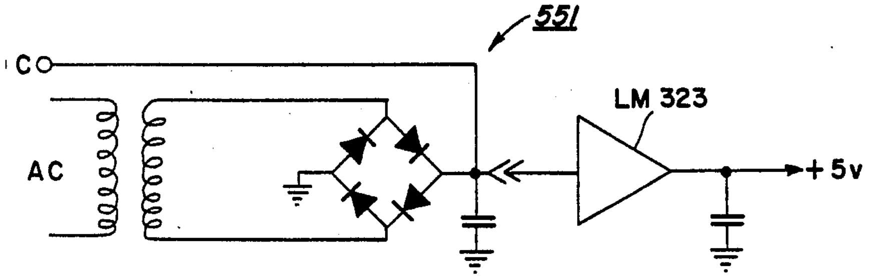
Figure 22C:
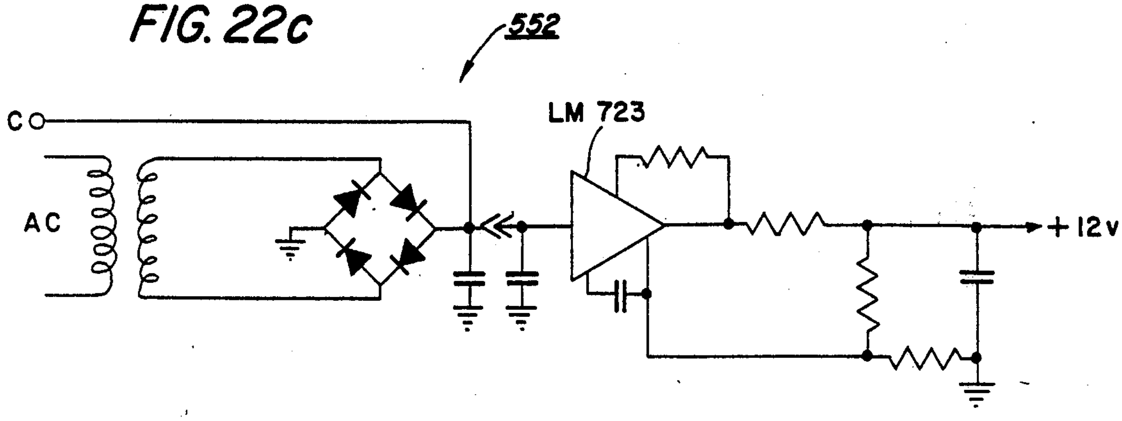

Referring to FIG. 22, power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN.

An enabling signal (INHIBIT RESET) allows completion of a write cycle in Non Volatile (N.V.) Memory 610 of I/O Module 502.

Figure 23A:
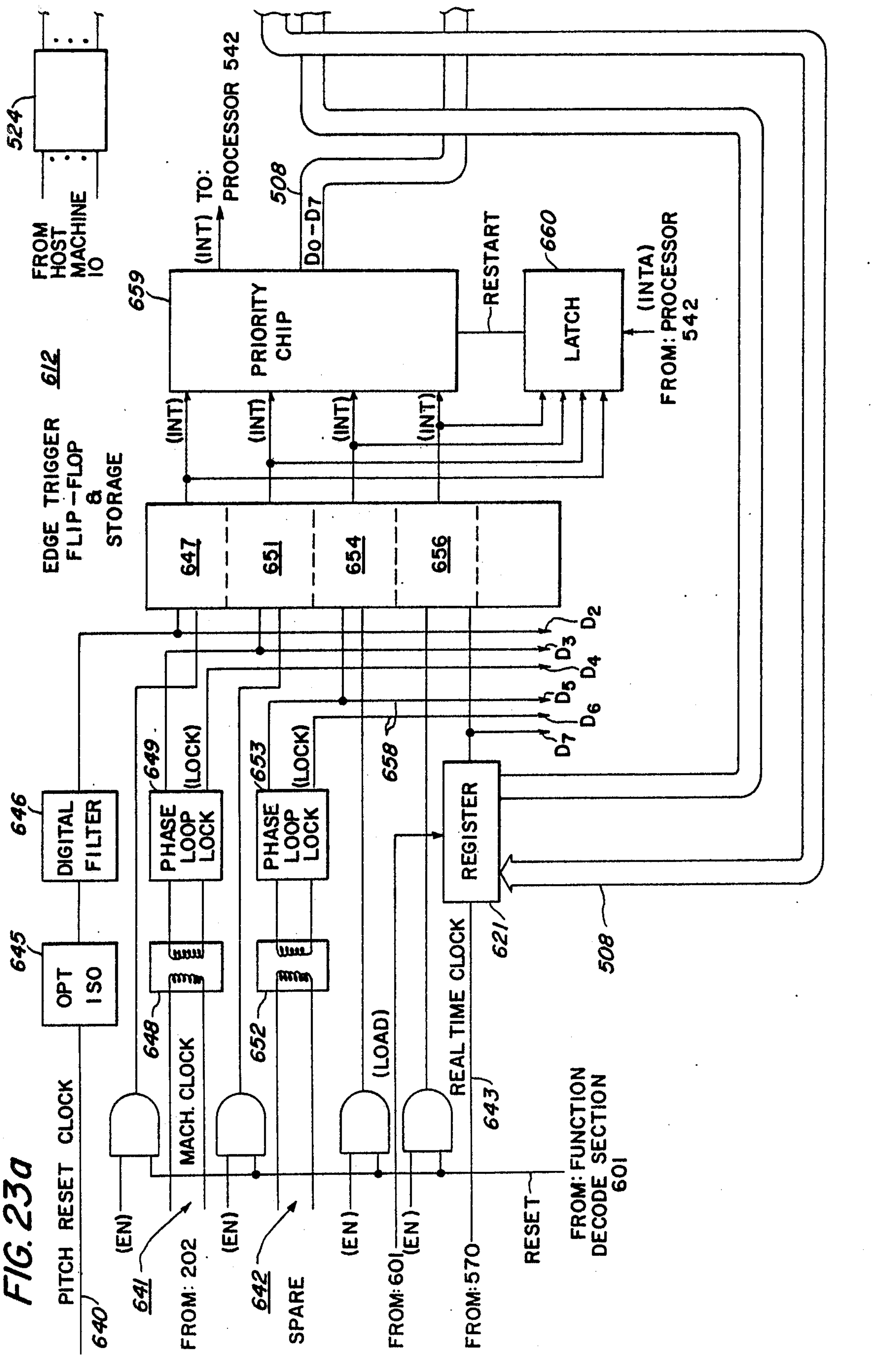
FIGS. 23*a* and 23*b* comprise a block diagram of the controller I/O module.

Referring to FIGS. 18, 20, 21 and the DMA timing chart (FIG. 18*a*) data transfer from RAM section 546 to host machine 10 is effected through Direct Memory Access (DMA), as will appear. To initiate DMA, a signal (HOLD) is generated by Refresh Control 605 (FIG. 23*a*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Figure 23B:
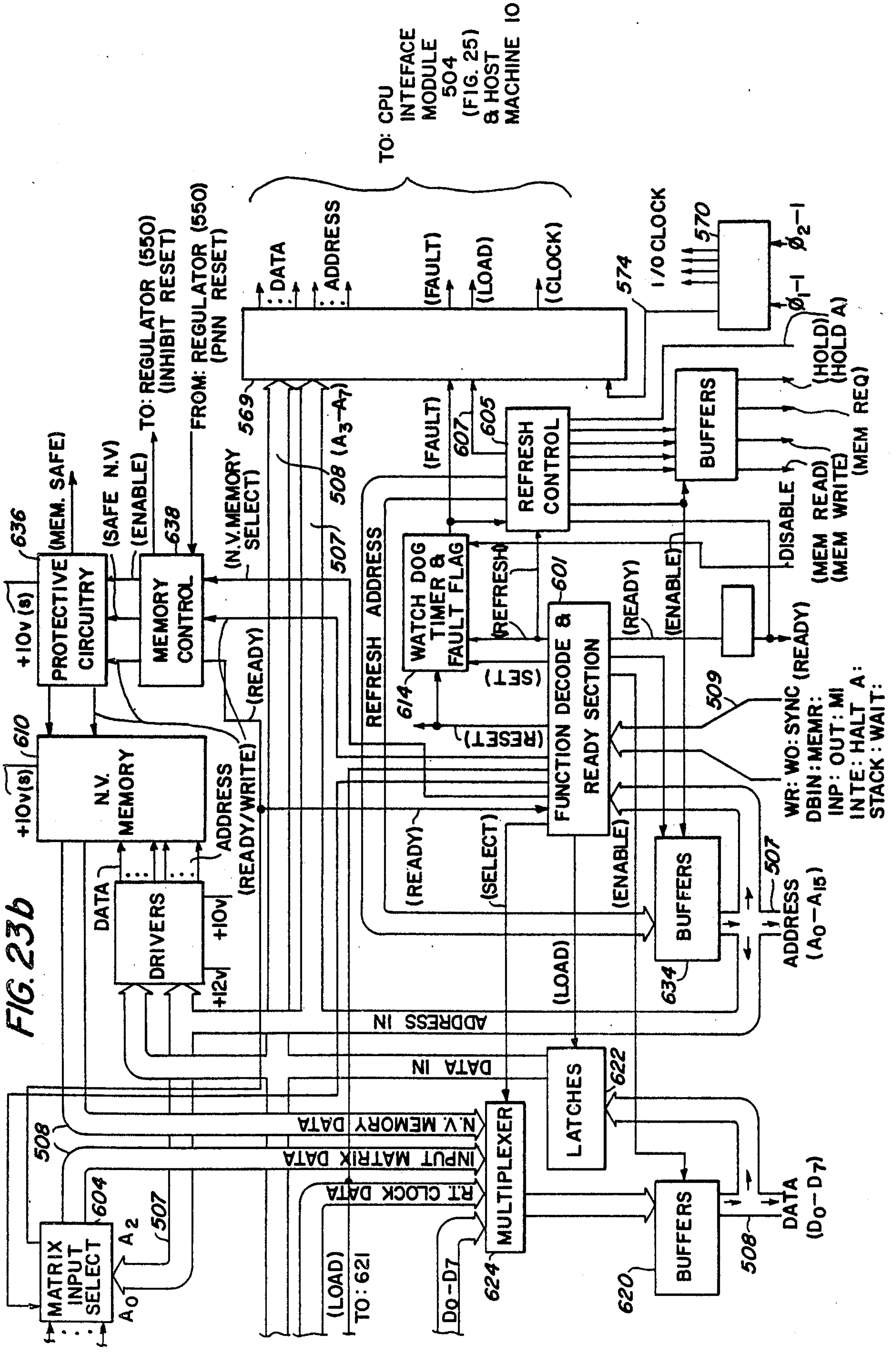

Referring to FIG. 23, I/O Module 502 interfaces with CPU module 500 through bi-directional Address, Data and Control buses 507, 508, 509. I/O Module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory access (DMA) by I/O module 502 to RAM section 546.

I/O module 502 includes Matrix Input select 604 (through which inputs from the host machine 10, are received), Refresh Control 605, Nonvolatile (NV) memory 610, Interrupt Control 612, Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits A0–A7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25m sec) a fault flip flop is set and a signal (FAULT) sent to the host machine 10. The signal (FAULT) also raises the HOLD line to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 has capacity to read up to 32 groups of 8 discrete inputs from host machine 10. Lines $A_3$ through $A_7$ of Address bus 507 are routed to host machine 10 via CPU Interface Module 504 to select the desired group of 8 inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from RAM memory output buffer 546' to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546' (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addessable latches and distributed in parallel directly to the required destinations.

N.V. memory 610 comprises a predetermined number of bits of nonvolatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIGS. 23(*a*) and 34, the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 261. Register 621 which is loaded and stored by memory reference instructions from CPU module 500 is decremented by a clock signal in line 543 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 552 (FIG. 19*a*). As described, clock 570 provides a reference clock pulse (in line 574) for synchronizing the output refresh data and is the source of clock pulses (in line 643) for driving Real Time register 621.

Figure 25:
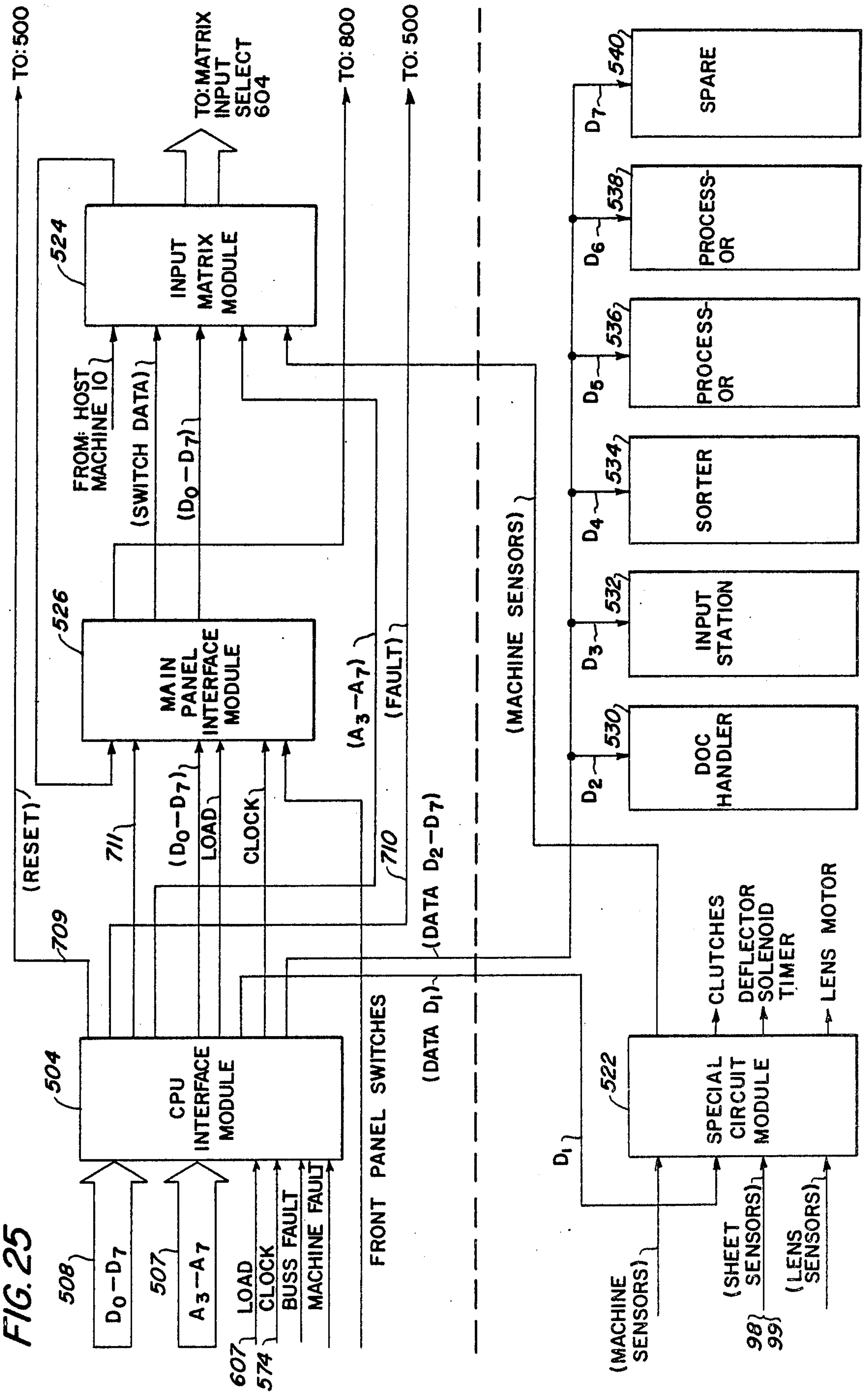
FIG. 25 is a block diagram of the apparatus interface and remote output connections.
Figure 26:
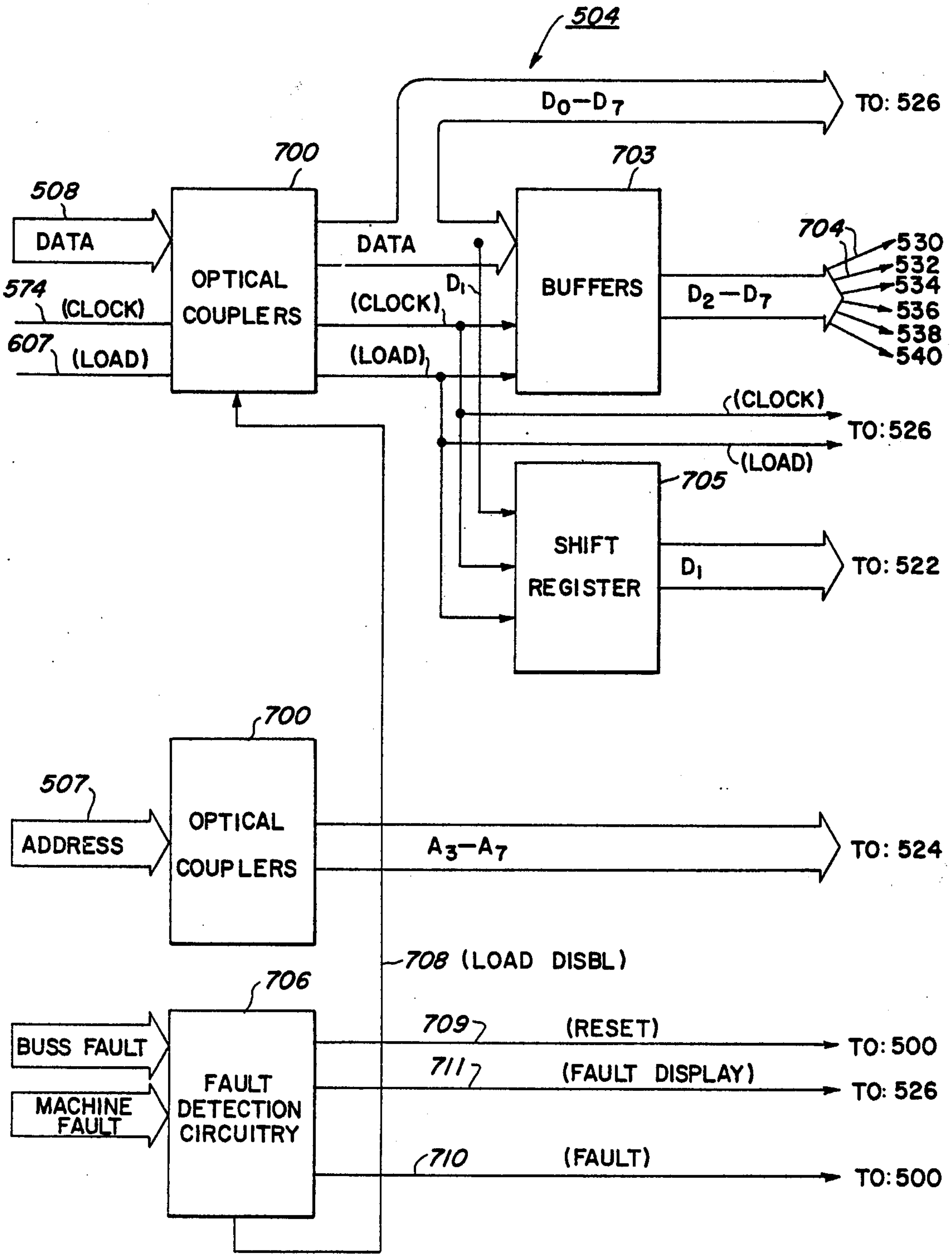
FIG. 26 is a block diagram of the CPU interface module.

CPU interface module 504 interfaces I/O module 502 with the host machine 10 and transmits operating data stored in RAM section 546 to the machine. Referring particularly to FIGS. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIG. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel D1 destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18) until the fault is removed. In the event of a machine fault, a signal is generated by the CPU in line 710 to actuate a suitably relay (not shown) controlling power to all or a portion of host machine 10. A load disabling signal (LOAD DISBL) is inputted to optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Figure 27:
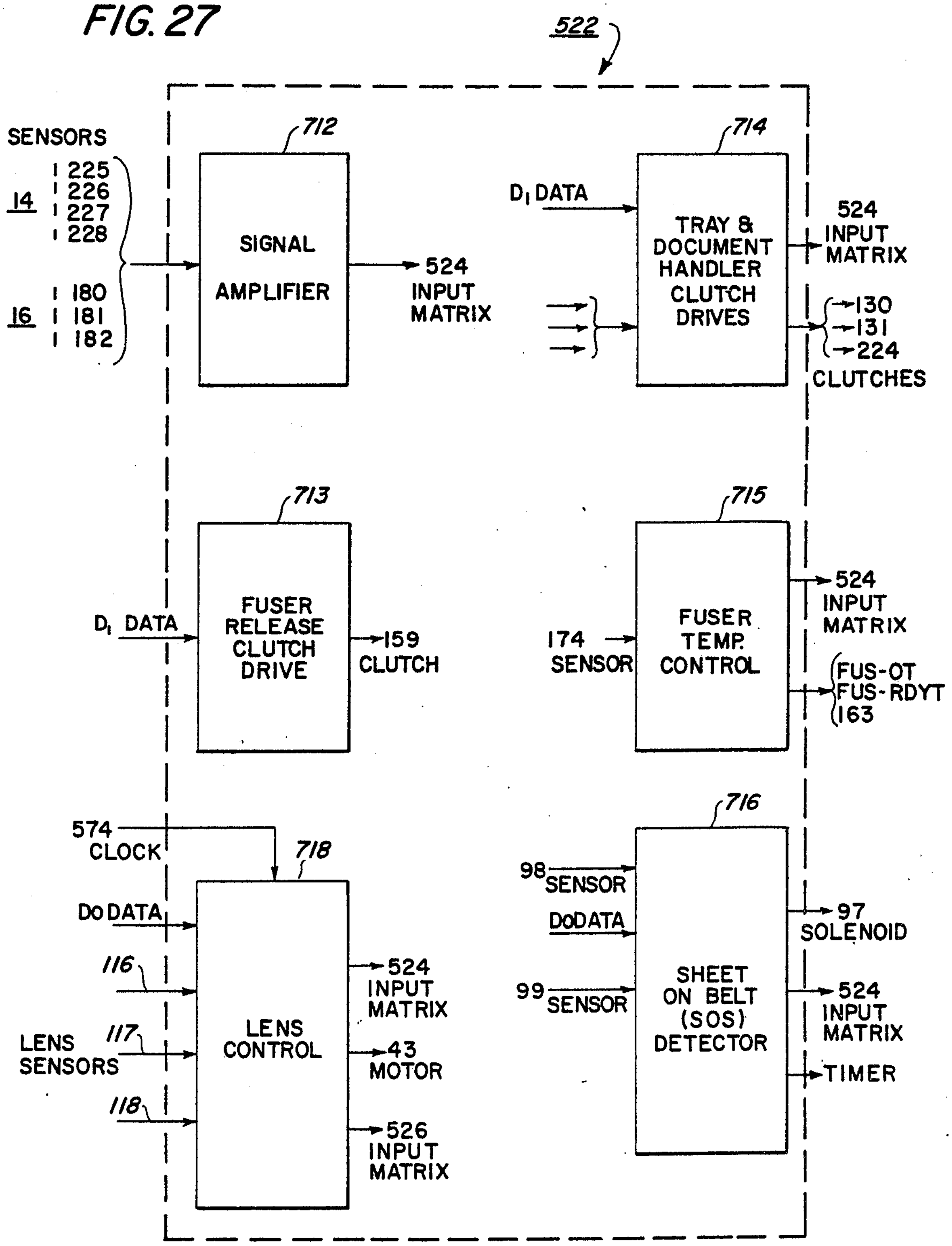
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time alloted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
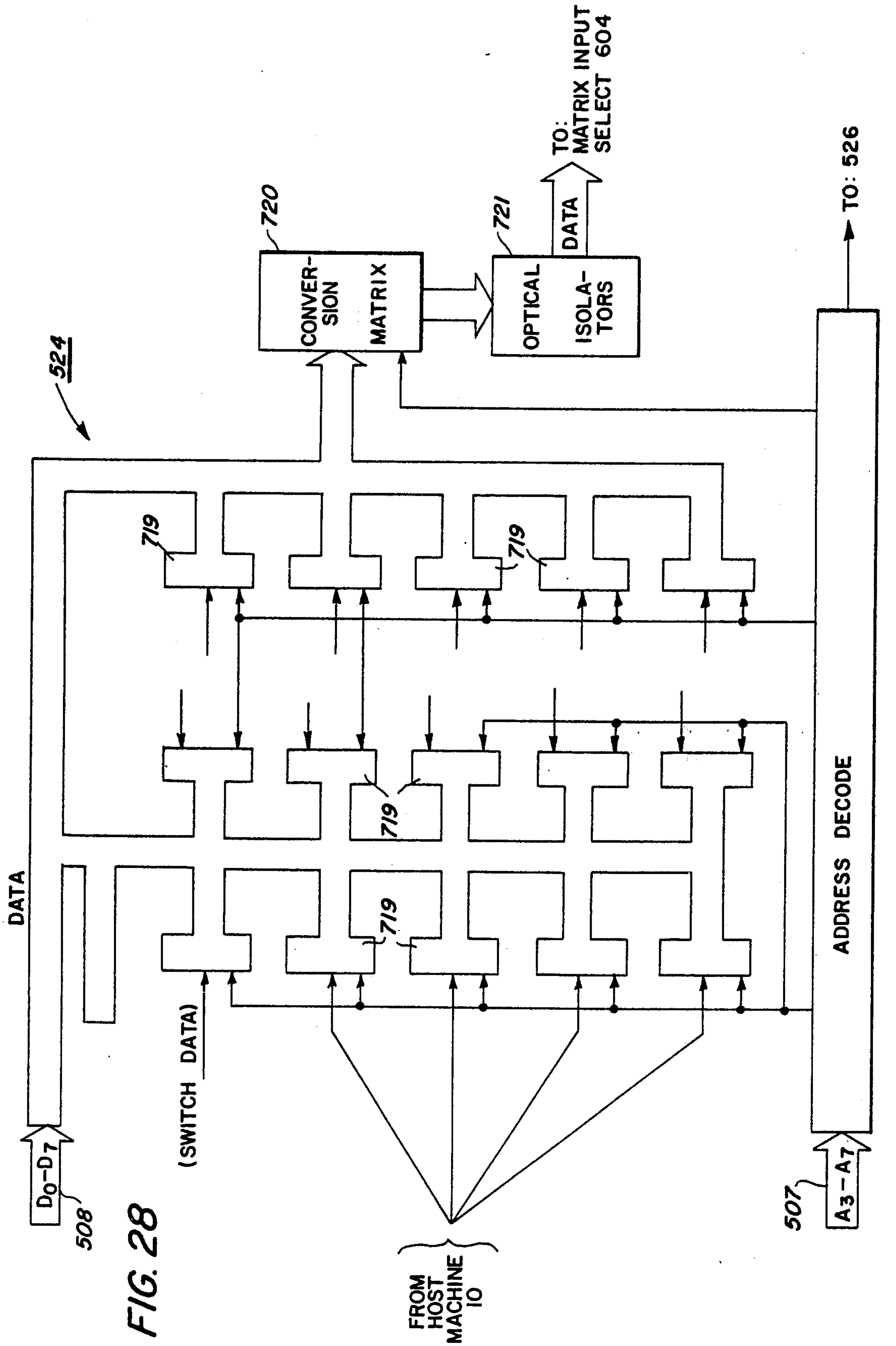
FIG. 28 is a block diagram of the main panel interface module.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmittal to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted-via optical isolators 721 and Input Matrix Select 604 of I/O module 502 to CPU Module 500.

Figure 29:
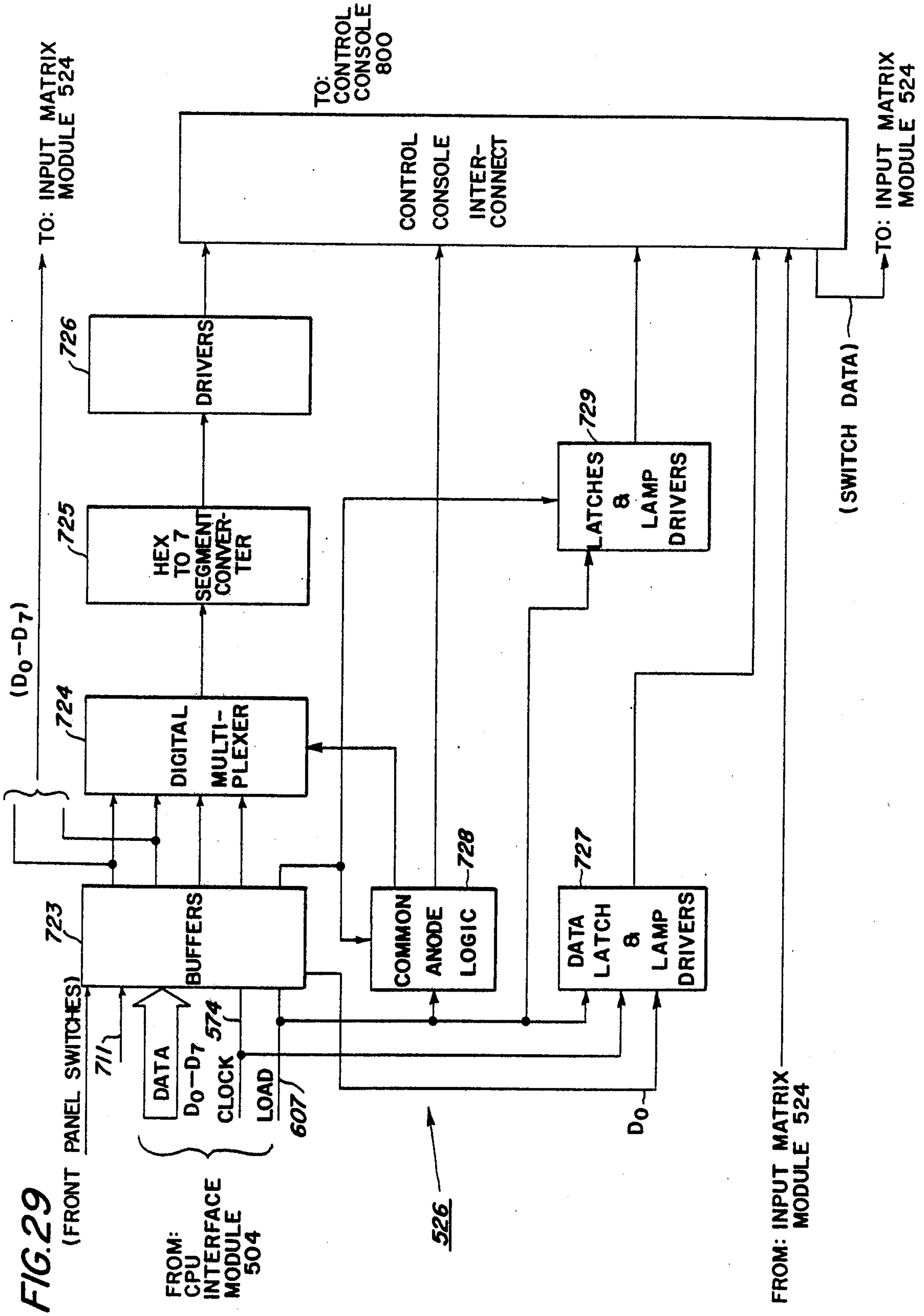
FIG. 29 is a block diagram of the input matrix module.

Referring particularly to FIG. 29, main panel interface module 526 serves as interface between CPU interface module 504 and operator control console 800 for display purposes and as interface between input matrix module 524 and the console switches. As described, data channels D0–D7 have data bits in each channel associated with the control console digital display or lamps. This data is clocked into buffer circuitry 723 and from there, for digital display, data in channels D1–D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Figure 30:
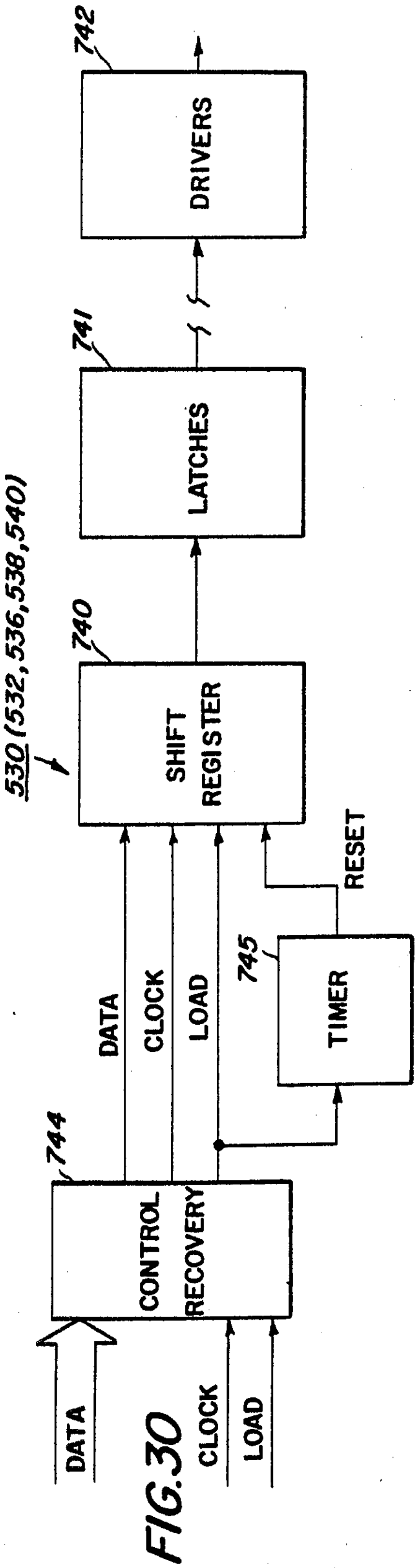
FIG. 30 is a block diagram of a typical remote.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Figure 31:
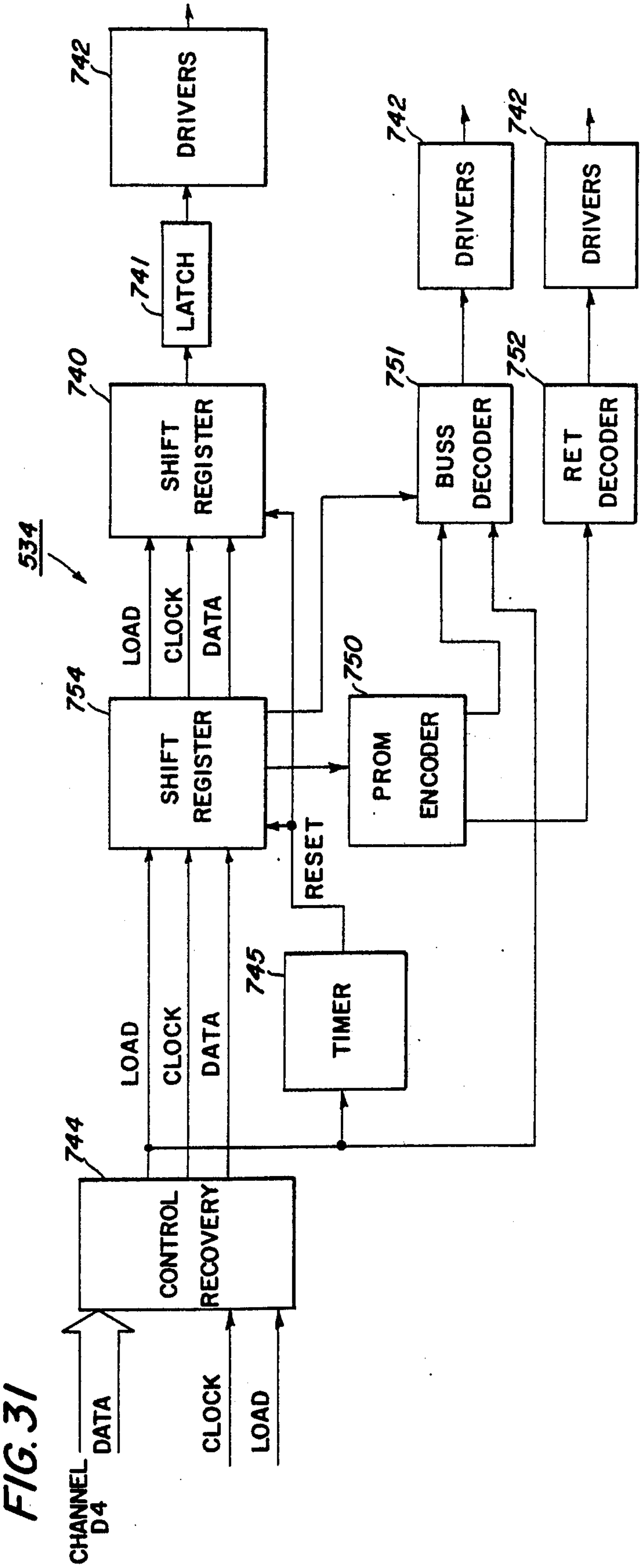
FIG. 31 is a block diagram of the sorter remote.

Referring to FIG. 31 wherein like numbers refer to like parts, to provide capacity for driving the sorter deflector solenoids 217, a decode matrix arrangement consisting of a Prom encoder 750 controlling a pair of decoders 751, 752 is provided. The output of decoders 751, 752 drive the sorter solenoids 217 of upper and lower bin arrays 210, 211 respectively. Data is inputted to encoder 750 by means of shift register 754.

Figure 32:
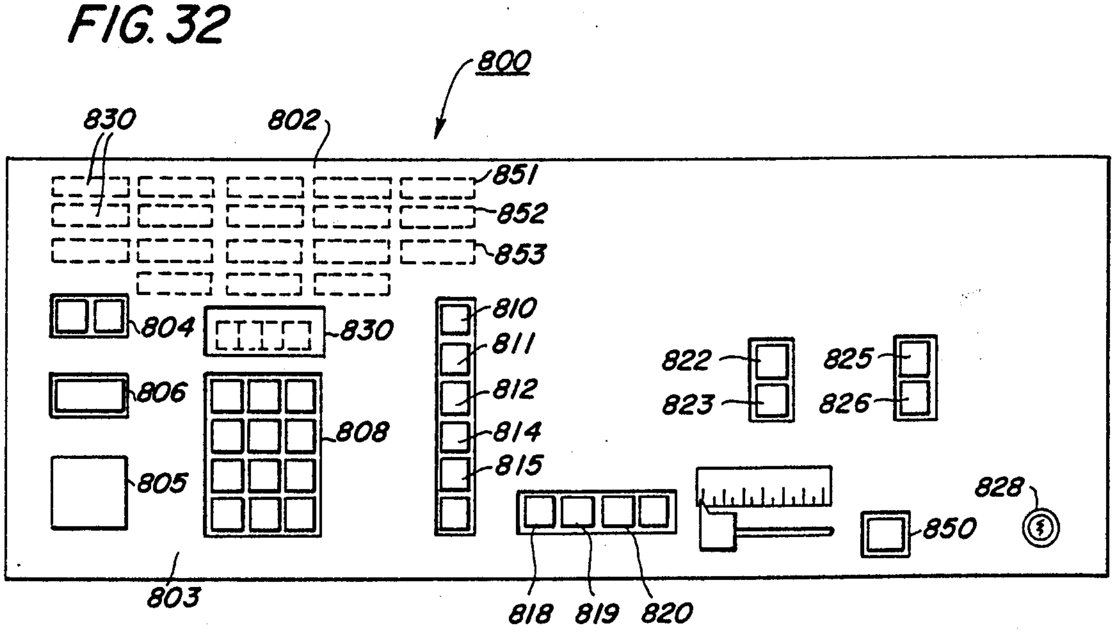
FIG. 32 is a view of the control console for inputting copy run instructions to the apparatus shown in FIG. 1.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stacks buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE AND UNLOAD SORTER. Other display information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer 546' of RAM memory section 546 is used to transfer/refresh control data to the various remote locations in host machine 10, control data from both Background and Foreground routines being inputted to buffer 546' for subsequent transmittal to host machine 10. Transmittal/refresh of control data presently in output buffer 546' is effected through Direct Memory access (DMA) under the aegis of a Machine Clock interrupt routine.

Foreground routine control data which includes a Run Event Table built in response to the particular copy run or runs programmed, is transferred to output buffer 546' by means of a multiple prioritized interrupt system wherein the Background routine in process is temporarily interrupted while fresh Foreground routine control data is inputted to buffer 546' following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
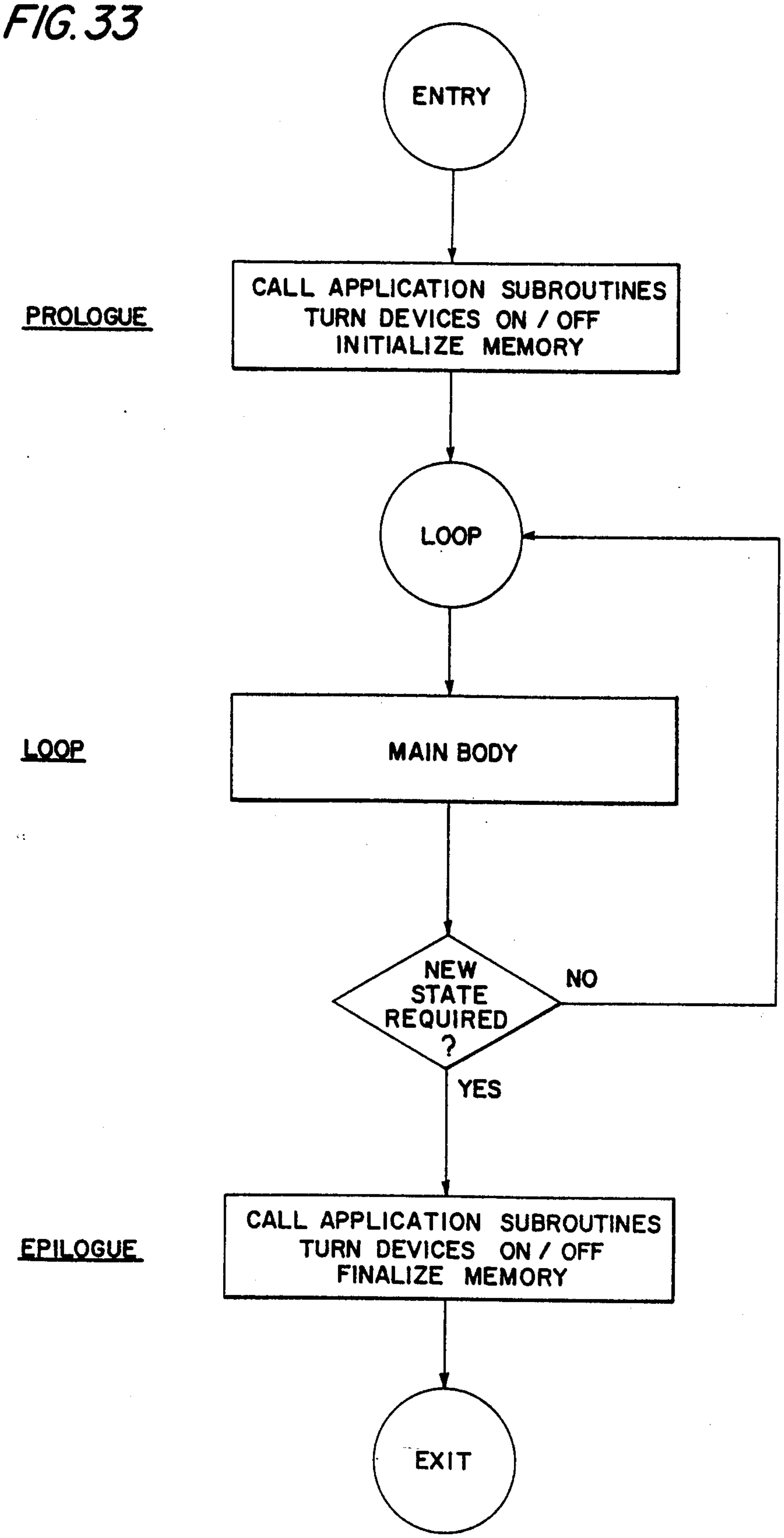
FIG. 33 is a flow chart illustrating a typical machine state.

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
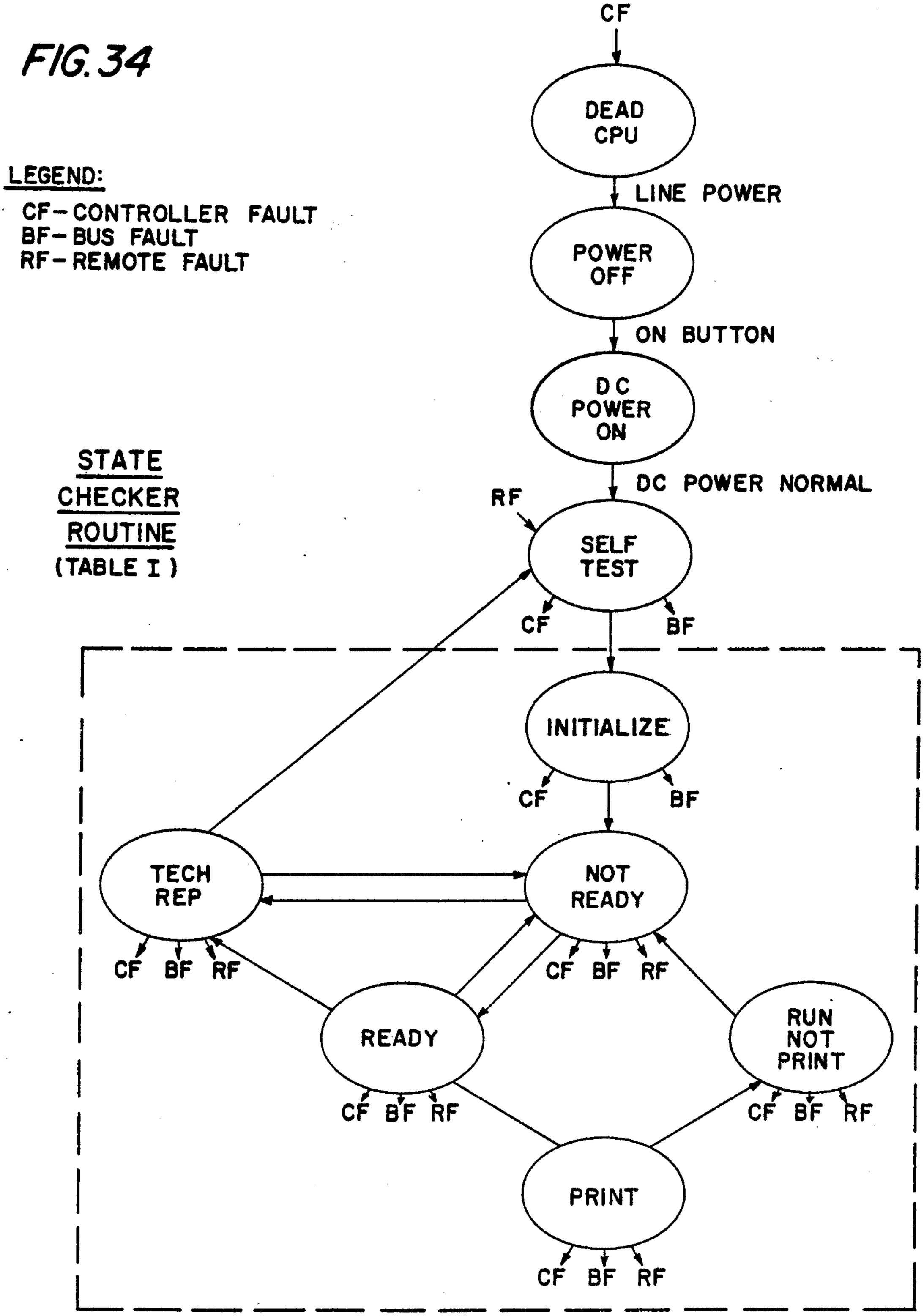
FIG. 34 is a flow chart of the machine state routine.

Referring to FIG. 34 and the exemplary program (STCK) in TABLE I. On actuation of the machine POWER-ON botton 804, the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECHREP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
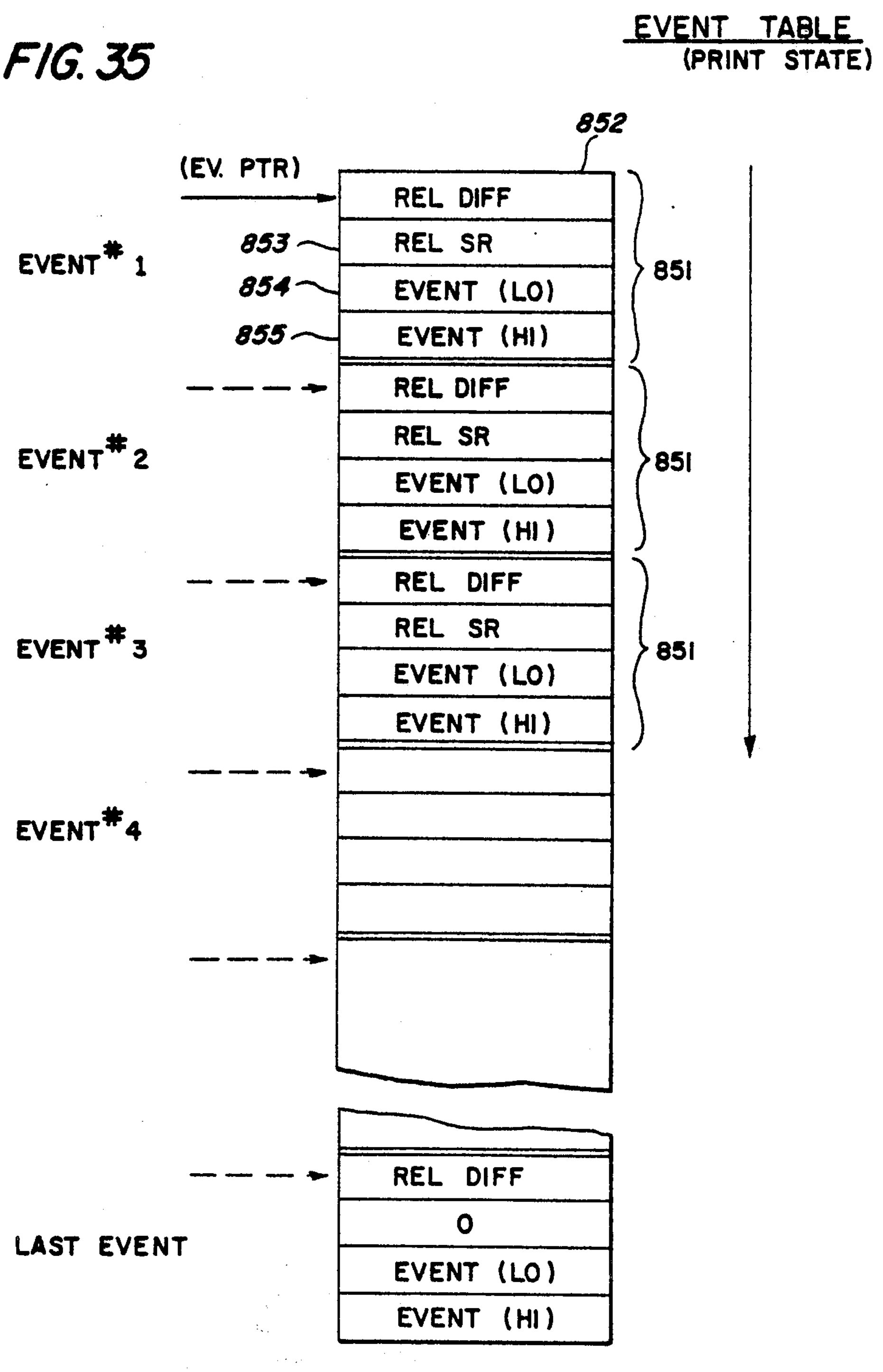
FIG. 35 is a view showing the event table layout.
Figure 36:
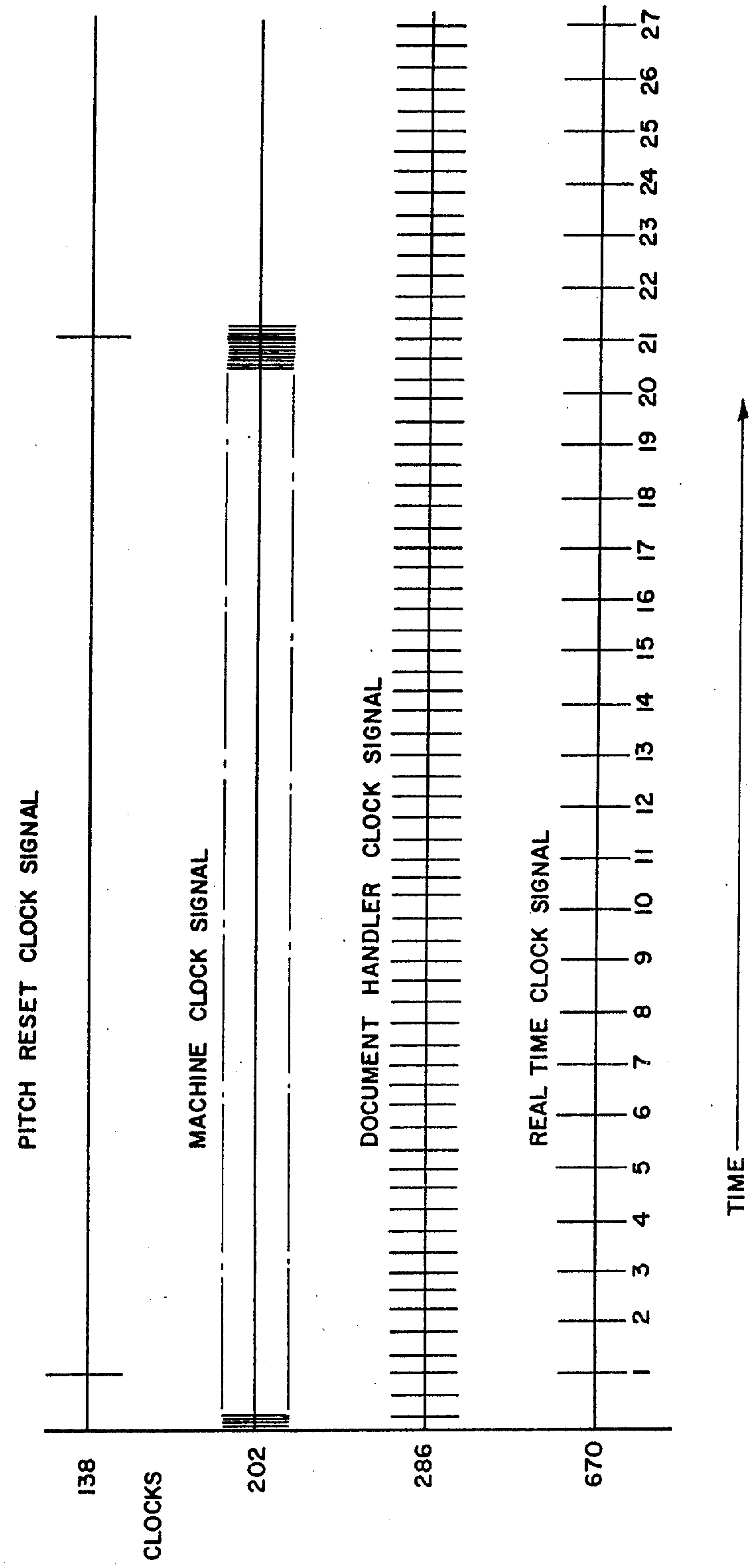
FIG. 36 is a chart illustrating the relative timing sequences of the clock interrupt pulses.
Figure 37:
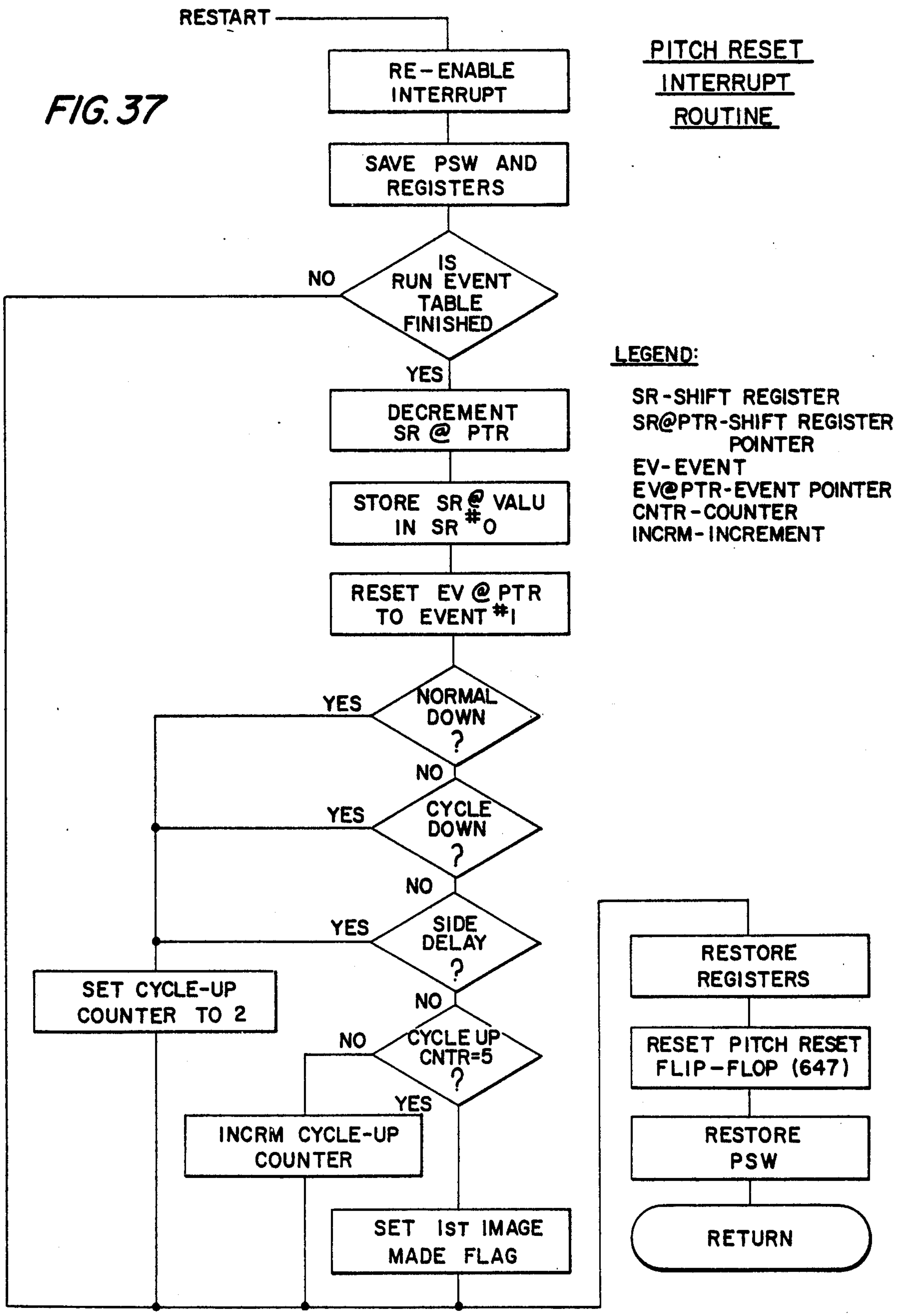
FIG. 37 is a flow charge of the pitch interrupt routine.

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foregound tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from ouput buffer 546' of RAM memory section 546 to the various locations in host machine 10 is through output Refresh via Direct Memory access (DMA) In response to machine clock interrupt signals as will appear. The interrupt routines are initiated by the respective interrupt signals.

Referring particularly to FIG. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Figure 38:
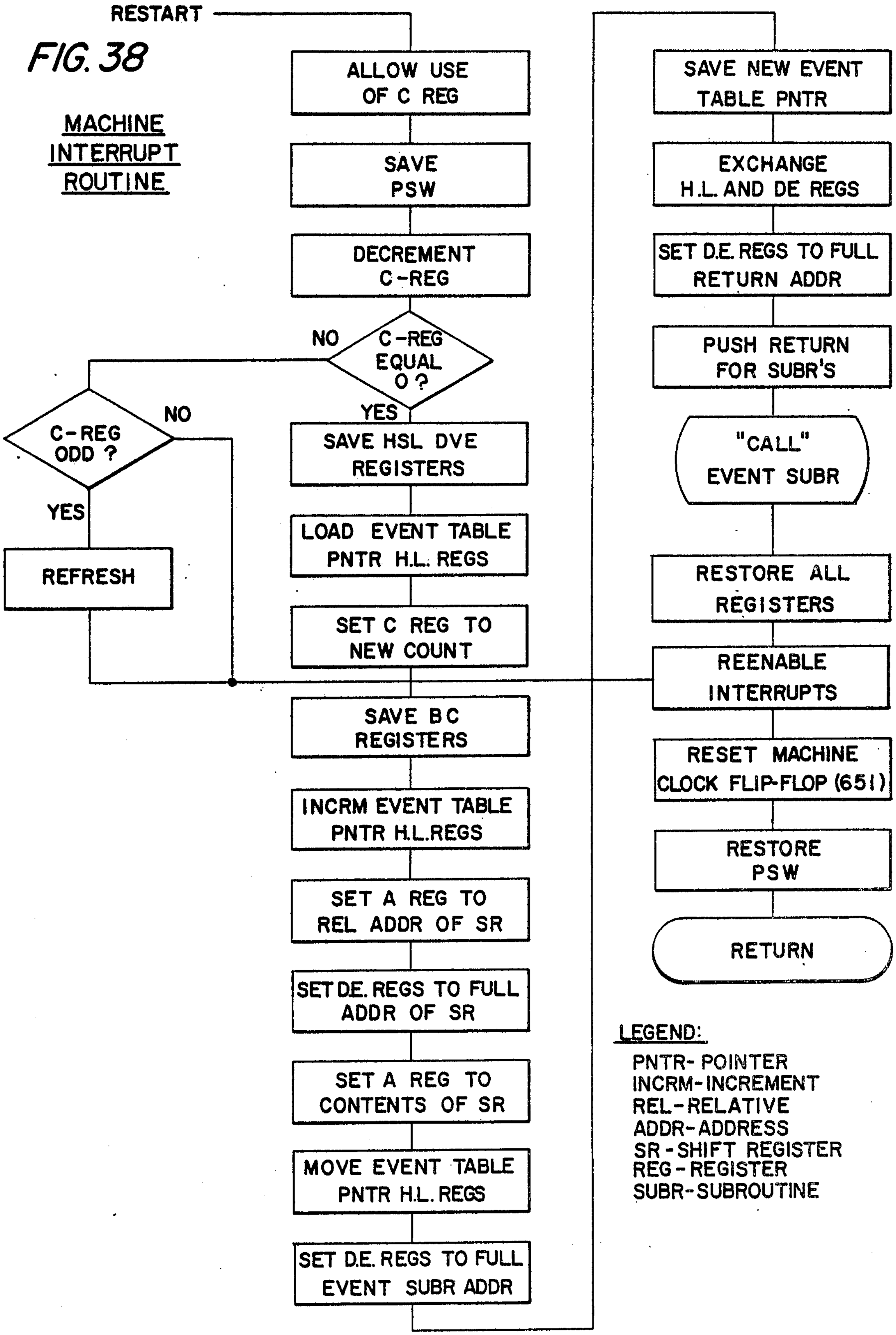
FIG. 38 is a flow chart of the machine clock interrupt routine.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D and E registers). The Event Pointer (EV PTR) is incremented to the first data block (REL DIFF) of the next succeeding event in the Run Event Table, saved, and the register pair (H and L registers) that comprise the Event Pointer are loaded with the event subroutine address from the register pair (D and E registers) holding the information. The register pair (D and E registers) are set to the return address for the Event Subroutine. Using the address information, the Event Subroutine is called and the subroutine data transferred to RAM output buffer 546′ for transfer to the host machine on the next Output Refresh.

Following this, the Machine Clock interrupt routine is exited as described earlier.

The Output Refresh cycle alluded to earlier functions, when entered, to transfer/refresh data from the output buffer of 546′ RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546′ of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
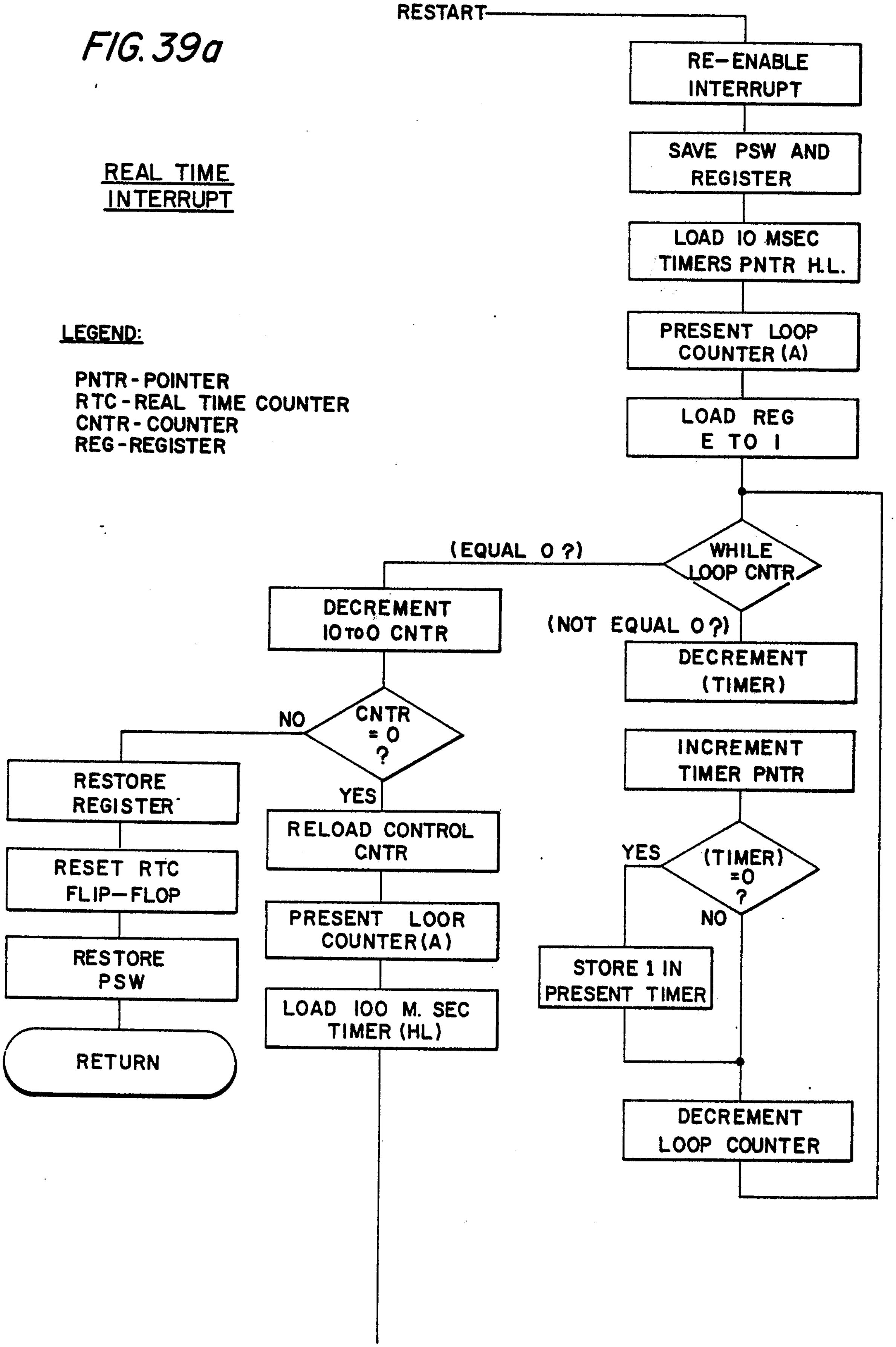
FIGS. 39*a* and 39*b* comprise a flow chart of the real time interrupt routines.
Figure 39B:
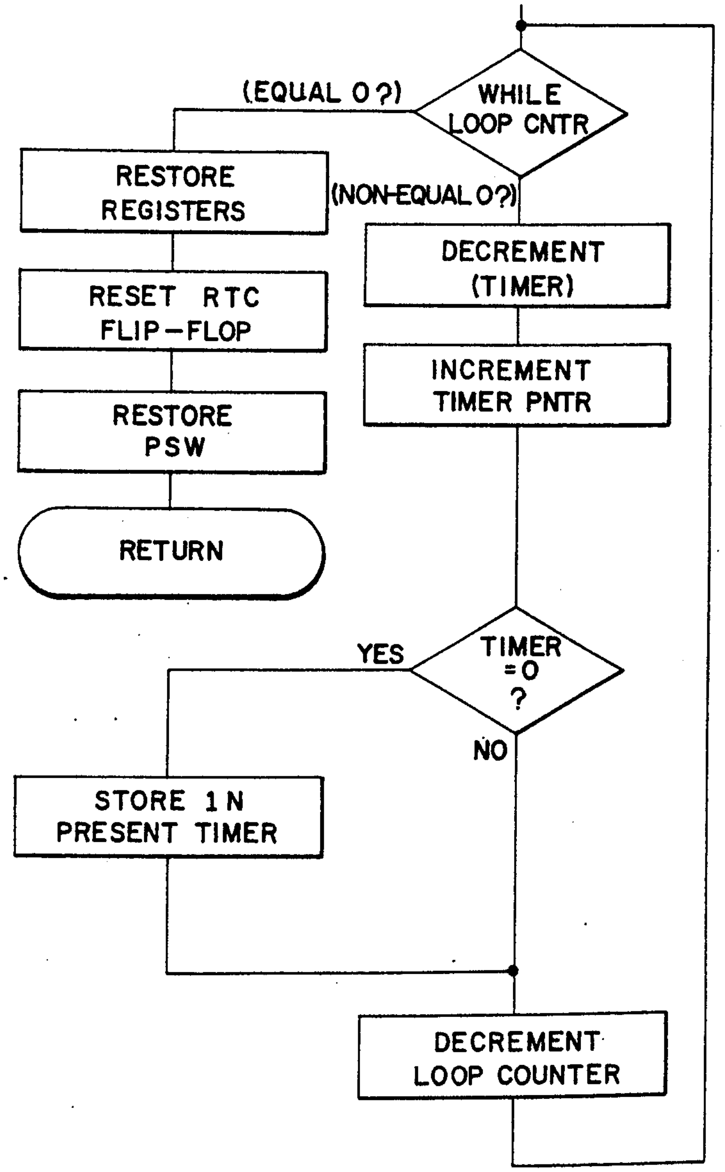

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"@" — is used to indicate flags, counters and subroutine names.

"#" — is used to indicate input signals.

"$" — is used to indicate output signals.

":" — is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                              *NAR
                              *
                              *          I N I T I A L I Z E   S T A T E
                              *
                              *          INIT: SUBROUTINE
                              *
                              *          INITIALIZE STATE- EXECUTED AFTER EACH START OR RESTART.  SETS
                              *          ALL POINTERS, FLAGS, AND DATA TO INITIAL VALUES REQUIRED TO
                              *          START EXECUTION OF ANY CONTROL ALGORITHIMS.  ALWAYS EXITS TO
                              *          'NOT READY' STATE.

                              *          EPILOG

05 00000    3E0A      A     INIT!      MVI        A,10
05 00002    3252FD    N                STA        DIVD:10                  INITIALIZE TO 10
05 00005    32B5FC    N                STA        SLOWTOGL                 INITIALIZE TO 10
05 00008    211907    N                LXI        H,EV@STBY:               H&L= ADDR OF STBY EVENT TABLE
05 0000B    2264FD    N                SHLD       EV@PTR:                  SAVE FOR MACH CLK ROUTINE
05 0000E    21FFFF    A                LXI        H,X'FFFF'                INIT INSTRUMENTATION REMOTE
05 00011    2272FB    N                SHLD       INS@PTRR                   ADDR PNTR TO END OF RAM
05 00014    21FFFF    N                LXI        H,ADH@RAMT-1             SET PNTR TO RAM CNTRL TABLE
05 00017    2278FB    N                SHLD       TAB@STRT                 SAVE PNTR
05 0001A    3E7F      A                MVI        A,X'7F'                  INIT TO UN-BYPASS
05 0001C    328DFC    N                STA        JAM@BYPS                                      ALL JAM SWS
                              *
                              *          TIMER INITIALIZATION
                              *          MUST BE DONE BEFORE ANY TIMERS CAN BE USED
                              *
05 0001F    211FF9    A                LXI        H,AVAIL!**8+X'1F'        SET H&L TO END OF AVAIL! TABLE
```

```
05 00022  36FF     A         MVI      H,X'FF'                           STORE X'FF' IN LAST TABLE ADDR
05 00024  3E1F     A         MVI      A,31                              SET A-REG TO VALUE TO BE STORED
                             REPEAT
05 00026  2D       A           DCR      L                               STEP TO NEXT TABLE LOCATION
05 00027  77       A           MOV      M,A                             STORE INITIALIZATION VALUE
05 00028  3D       A           DCR      A                               STEP TO NEXT VALUE
05 00029  C22600   N         UNTIL:   CC,Z,S                            IS INITIALIZATION COMPLETE
05 0002C  2120FE   A         LXI      H,ADR(DATA,TIME:OUT)              TO INITIALIZE TIME:OUT TABLE
05 0002F  225FFD   N         SHLD     INPTR:                             SET IN/OUT POINTERS TO
05 00032  2261FD   N         SHLD     OUTPTR:                           BEGINNING OF TIME:OUT TABLE
                       *
                       *     INITIALIZE SPOOL
                       *     POINTERS
                       *
05 00035  2140FE   A         LXI      H,ADR(DATA,SPL:TBL)               SET PNTRS
05 00038  226AFD   N         SHLD     SPL:IN                                          TO START
05 0003B  226CFD   N         SHLD     SPL:OUT                                                   OF TABLE
                       *
                       *     CHECK IF PAPER WAS PRESENT WHEN POWER WENT DOWN
                       *
05 0003E  3AC9E2   A         RNVNIB   NV@JAM@N                          A = JAM INFO FROM POWER DOWN
05 00041  0F       A         RRC                                        SET CARRY TO FDR JAM INFO
05 00042  D25A00   N         IF:      CC,C,S                            WAS THERE PAPER IN FDR AREA
05 00045  47       A              MOV      B,A                          YES, SAVE JAM INFO
05 00046  213CFD   A              SFBIT,P  FDR@AJAM,FDR@MJAM            SET FEEDER JAMS
05 00049  3E0C     A
05 0004B  B6       A
05 0004C  77       A
05 0004D  2121F9   A              SFBIT,P  ON@X@2,ON@X@3                SIGNAL TRANSPT CL'RANCE REQ'D
05 00050  3E03     A
05 00052  B6       A
05 00053  77       A
05 00054  3E80     A              SFLG     CLP@REQD                     TELL FLT HNDLR CLEARANCE REQD
05 00056  3267F4   A
05 00059  78       A              MOV      A,B                          RESTORE THE A-REG
                             ENDIF
05 0005A  0F       A         RRC                                        SET CARRY TO IMED@DN:
05 0005B  D27100   N         IF:      CC,C,S                            WAS THERE AN IMED@DN:
                       *
                                  MVI      L,MSK(FBIT,L@PR@FLT,JAM2@FLT,JAM3@FLT,JAM4@FLT,;
05 0005E  2EFF     A                       JAM5@FLT,JAM6@FLT,RET1@FLT,RET2@FLT)
                       *                                                SETS ALL JAM FBITS IN REG-L
05 00060  2603     A              MVI      H,MSK(FBIT,S@S@JAM,MISSTRIP)
                       *                                                SETS ADDITIONAL FBITS IN H
05 00062  2238FD   A              SHLD     ADR(FBYT,PAP:1)              MOVE FBITS INTO FBYTES
05 00065  3E80     A              SFLG     CLR@REQD                     TELL FLT HNDLR CLEARANCE REQD
05 00067  3267F4   A
05 0006A  2120F9   A              SFBIT,P  TS@FUS,TS@X@2                TURN ON UNDEDICATED MAP LAMPS
05 0006D  3E21     A
05 0006F  B6       A
05 00070  77       A
                             ENDIF
                             IF:      XBYT,A,AND,;                      IS EITHER SRT JAM FLAG SET
05 00071  E60C     A                  MSK(NVBIT,NV@LOW@J,NV@UP@J),NZ'   IN NVNIB
05 00073  CA8A00   N
                                  IF:      XBYT,A,EQ,;                  YES, ARE BOTH SET
05 00076  FE0C     A                       MSK(NVBIT,NV@LOW@J,NV@UP@J)
05 00078  C28300   N
05 0007B  3E80     A                 SFLG       TWO@ACT                 TELL SRT THAT THERE WAS A JAM
05 0007D  3261F4   A
05 00080  C38700   N              ELSE:
05 00083  0F       A                 RRC                                GET NV@LOW@J TO SIGN BIT &
                                     ID:READ    NV@LOW@J
05 00084  3237F4   A                 MODFLG     LOW@MOD                 TELL SRT IF UP OR LOW JAM
                                  ENDIF
05 00087  CD0000   N              CALL     JAM@SET                      LET SRT SET JAM FLAGS & LAMPS
                             ENDIF
05 0008A  3E80     A         SFLG     SRT@RDY                           SIGNAL SRT NOT IN USE (READY)
05 0008C  328CF7   A
05 0008F  3287F7   A         MODFLG   PROG@RDY                          SET PROG ROUTINE READY
05 00092  326BF4   A         MODFLG   2SD@ENAB                          ALLOW SELECTION OF DUPLEX MODE
05 00095  3EF2     A         MVI      A,X'F2'                           RE-ENABLE
05 00097  3200E6   A         STA      RSINTFF:                                        INTERRUPT
05 0009A  FB       A         EI                                                                 SYSTEM
05 0009B  CD0000   N         SOBIT,S  NPFO$ON,24V$SPL                   PFO OFF (INVT'D) & 24V ON
05 0009E  02       A
05 0009F  E480     A
05 000A1  EE80     A
05 000A3  CD0000   N         STIMR    FLT@DLY,25000,FLT@CHK             START LENS FAULT TIMER
05 000A6  12       A
05 000A7  FA       A
05 000A8  0000     N
05 000AA  CD0000   N         CALL     DOC@CLP                           INITIALIZE DOC@NUM TO 1        (1)
05 000AD  327AFC   N         STA      OF@DIGIT                          ENABLE '0' IN QTY FLASHED      (2)
05 000B0  3E08     A         MVI      A,MSK(FBIT,P@P@RS)                TELL FLT ASSUME
05 000B2  3286FC   N         STA      XP@PREV                                                BRUSH HOUSE OPN
05 000B5  3E02     A         MVI      A,:NRDY                           INIT STCK
05 000B7  3254FD   N         STA      :STATE:                                  SYNCRONIZED BACKGROUND
05 000BA  3253FD   N         STA      STATE:                                                 CONTROL LOOP
05 000BD  CD3702   N         CALL     NRDY:PRL                          INIT CONTROL TO NOT-READY STATE
                       ***************************************************************************
                       *                                                                         *
                       *    S Y C R O N I Z E D   B A C K G R O U N D   C O N T R O L   L O O P S *
                       *                                                                         *
                       ***************************************************************************

                       *     PRIORTIES:
                       *                  FIRST       10MS TIME OUT REQUESTS
                       *                  SECOND      10MS CALLS
                       *                  THIRD       SPOOLED CALLS
                       *                  FOURTH      20MS CALLS
```

```
                            *            FIFTH     100MS CALLS
                            *            SIXTH     100MS TIME OUT REQUESTS

05 000C0   2151FD   A         LXI     H,ADR(DATA,SB:RQST)         SET MEM PNTR TO SB BYTE
                              REPEAT                              LOOP-3 FROM HLT ON ALL INTER'S
                                  REPEAT                          LOOP-2 BACK AFTER EACH 100MS
                                      REPEAT                      LOOP-1 BACK AFTER EACH 20MS
05 000C3   7E       A                     MOV     A,M.            A= SYNC BKGND REQUESTS FROM RTC
                                          ID:READ SB:RQST
05 000C4   07       A                     RLC                     TEST FOR 10MS
05 000C5   D2F700   N                     IF:     CC,C,S                     SB REQUEST
                            *
                            *                                     TIMER SERVICE REQUESTS
                            *                                      CALLS TIMED OUT TIMER SUBRS
                            *                                      USING WRAP AROUND TABLE AND
                            *                                      IN/OUT PNTRS - RTCI SETS
                            *                                      INPTR: & ENTERS CALL ADDR
                            *
05 000C8   3A5FFD   N                         WHILE:    XBYT,INPTR:,NE,OUTPTR: ARE PNTRS AT SAME TABL
05 000CB   2161FD   N
05 000CE   BE       A
05 000CF   CAE500   N

05 000D2   6E       A                             MOV      L,M       SET L-REG TO ADDR(L) IN TABLE
05 000D3   26FE     A                             MVI      H,HADR(DATA,TIME:OUT) MEM PNTR NOW SET TO
05 000D5   5E       A                             MOV      E,M            MOVE CALL ADDR(L) TO E
05 000D6   23       A                             INX      H              STEP TO NEXT TABLE BYTE
05 000D7   56       A                             MOV      D,M            MOVE CALL ADDR(H) TO D
05 000D8   23       A                             INX      H              STEP TO NEXT TABLE BYTE
05 000D9   7D       A                             MOV      A,L       PREPARE TO UPDATE PNTR
                                                  ID:READ  TIME:OUT  DYNAMIC TABLE CONTAINING ADDRS
                                                  MODBYT   A,AND,;   ADJUST FOR END OF TABLE
05 000DA   E62F     A                                      TIME:MSK
05 000DC   3261FD   A                             STA      ADR(DATA,OUTPTR:) PNTR TO ADDR OF LAST SE
05 000DF   CD0000   N                             CALL     DE:IND    DO TIMEOUT CALL
05 000E2   C3C800   N                         ENDWHILE               YES, ALL TIME OUTS SERVICED
                            *                                        END TIMER SECTION
05 000E5   2A55FD   N                         LHLD     10:CALLS      GET PROPER 10MS CALL TABLE
05 000E8   CDC000   N                         CALL     HL:IND        DO 10MS CALLS
05 000EB   2151FD   A                         LXI      H,ADR(DATA,SB:RGST) SET MEM PNTR TO SB BYTE
05 000EE   F3       A                         DI
05 000EF   7E       A                         MODBYT   H,AND, 10:RQST REMOVE 10MS REQUEST
05 000F0   E67F     A
05 000F2   77       A

                                              ID:ALTR  SB:RQST
05 000F3   FB       A                         EI                     (WATCH OUT FOR UNPRINTABLE NOT)
05 000F4   C31501   N                     ELSE:                      DO ANY SPOOLED ROUTINES
05 000F7   3A6AFD   N                         IF:      XBYT,SPL:IN,NE,SPL:OUT
05 000FA   216CFD   N
05 000FD   BE       A
05 000FE   CA1101   N

05 00101   6E       A                             MOV      L,M
05 00102   26FE     A                             MVI      H,HADR(DATA,SPL:TBL)
05 00104   5E       A                             MOV      E,M
05 00105   23       A                             INX      H
05 00106   56       A                             MOV      D,M
05 00107   23       A                             INX      H
05 00108   7D       A                             MOV      A,L
05 00109   E64F     A                             MODBYT   A,AND,SPL:MSK
05 0010B   326CFD   A                             STA      ADR(DATA,SPL:OUT)
05 0010E   CD0000   N                             CALL     DE:IND
                                              ENDIF
05 00111   2151FD   A                         LXI      H,ADR(DATA,SB:RQST)
05 00114   7E       A                         MOV      A,M
                                          ENDIF
                                          ID:READ  SB:RQST
05 00115   07       A                     RLC
05 00116   07       A                     RLC                            TEST FOR 20MS
05 00117   D24201   N                     IF:      CC,C,S                           SB REQUEST
05 0011A   2A59FD   N                         LHLD     20PNTR          SET MEM PTR TO CALL IN 20MS TAB
05 0011D   5E       A                         MOV      E,M             MOVE CALL ADDR(L) TO E
05 0011E   23       A                         INX      H               STEP MEM PTR TO ADDR(H)
05 0011F   7E       A                         IF:      XBYT,M,EQ,X'FF' IS POINTER AT END OF TABLE
05 00120   FEFF     A
05 00122   C23701   N

05 00125   2A57FD   N                             LHLD     20:PNTR   YES, SET MOVING POINTER
05 00128   2259FD   N                             SHLD     20PNTR         BACK TO BEGINNING OF TABLE
05 0012B   2151FD   A                             LXI      H,ADR(DATA,SB:RQST)      SET MEM PNTR TO
05 0012E   F3       A                             DI
05 0012F   7E       A                             MODBYT   M,AND, 20:RQST REMOVE 20MS REQUEST
05 00130   E6BF     A
05 00132   77       A

                                                  ID:ALTR  SB:RQST
05 00133   FB       A                             EI
05 00134   C34201   N                         ELSE:
05 00137   56       A                             MOV      D,M       NO, MOVE CALL ADDR(H) TO D
05 00138   23       A                             INX      H              STEP TO NEXT CALL IN TABLE
05 00139   2259FD   N                             SHLD     20PNTR         SAVE FOR NEXT LOOP-1
05 0013C   CD0000   N                             CALL     DE:IND
05 0013F   2151FD   A                             LXI      H,ADR(DATA,SB:RQST) SET MEM PNTR TO SB BY
                                              ENDIF
                                          ENDIF
05 00142   7E       A                 UNTIL:   XBYT,M,AND,20:RQST,Z  MORE 20MS CALLS TO DO  (LOOP-1)
05 00143   E640     A
05 00145   C2C300   N

                                      ID:READ  SB:RQST
05 00148   7E       A                 IF:      XBYT,M,AND,100:RQST,NZ TEST FOR 100MS SB REQUEST
05 00149   E620     A
05 0014B   CA9E01   N

                                          ID:READ  SB:RQST
05 0014E   2A5DFD   N                     LHLD     100PNTR         SET MEM PNTR TO CALL IN 100 TAB
05 00151   5E       A                     MOV      E,M             MOVE CALL ADDR(L) TO E
```

```
05 00152   23      A               INX      H                 STEP MEM PNTR TO ADDR(H)
05 00153   7E      A               IF:      XBYT,M,EQ,X'FF'   IS PNTR AT END OF TABLE
05 00154   FEFF    A
05 00156   C29301  N
05 00159   2A58FD  N                  LHLD     100PNTR          YES, SET MOVING PNTR BACK
05 0015C   225DFD  N                  SHLD     100PNTR               TO BEGINNING OF TABLE
                         *
                         *                                      100MS TIMER SERVICE
                         *                                       DECREMENTS TIMERS AND CALLS
                         *                                       SUBROUTINE REQUESTED WHEN
                         *                                       TIMER TIMES OUT
                         *                                       USES 3 TABLES ON 3 CONSECUTIVE
                         *                                       RAM PAGES -100:CNT W/TIMER
                         *                                                 -100:LS W/ADDR(L)
                         *                                                 -100:LS W/ADDR(H)
                         *                                       ADDR IS FOR REQSTED SUBR
                         *
05 0015F   2130FA  N                  LXI      H,100:CNT        STARTING ADDR OF 100MS TIMERS
05 00162   1614    A                  MVI      D,100:TMAX       D-REG SET TO QTY OF 100MS TMRS

                         *                                      CONDITIONAL HOLD OF 100MS TMRS

05 00164   3A45FD  A                  IF:      FBIT,STDBOPNO,T IS STAND-BY RELAY OPEN
05 00167   E640    A
05 00169   CA6E01  N
                                         MVI      D,100:TMAX; YES, HOLD SPECIFIED NUMBER
05 0016C   1611    A                              -HOLDTMRS           OF TIMERS
                                      ENDIF
                         *
                                      REPEAT                    LOOP TO DECR & SERVICE TIMEOUTS
05 0016E   7E      A                     IF:      VBYT,M,NZ IS TIMER ACTIVE
05 0016F   A7      A
05 00170   CA8201  N
05 00173   35      A                        DCR      M          DECR TIMER
05 00174   C28201  N                        IF:      CC,Z,S HAS TIMER TIMED OUT
05 00177   D5      A                           PUSH     D        SAVE # TIMERS TO SERVICE
05 00178   E5      A                           PUSH     H        SAVE ADDR OF CURRENT TIMER
05 00179   24      A                           INR      H        STEP TO NEXT RAM PAGE
05 0017A   5E      A                           MOV      E,M      MOVE CALL ADDR(L) TO E
05 0017B   24      A                           INR      H        STEP TO NEXT RAM PAGE
05 0017C   56      A                           MOV      D,M      MOVE CALL ADDR(H) TO D
05 0017D   CD0000  N                           CALL     DE:IND
05 00180   E1      A                           POP      H        RECALL ADDR OF CURRENT TMR
05 00181   D1      A                           POP      D        RECALL NUMBER OF TIMERS
                         *                                          YET TO BE SERVICED
                                            ENDIF
                                         ENDIF
05 00182   23      A                     INX      H              STEP TO NEXT TIMER ADDR
05 00183   15      A                     DCR      D              DECR NUMBER OF 100MS TIMERS
05 00184   C26E01  N                  UNTIL:   CC,Z,S            HAVE ALL TIMERS BEEN SERVICED
                         *                                      END 100MS TIMER SECTION
05 00187   2151FD  A                  LXI      H,ADR(DATA,SB:RQST) SET MEM PNTR TO SB BYTE
05 0018A   F3      A                  DI
05 0018B   7E      A                  MODBYT   M,AND, 100:RQST REMOVE 100MS REQUEST
05 0018C   E6DF    A
05 0018E   77      A
                                      IO:ALTR  SB:RQST
05 0018F   FB      A                  EI
05 00190   C39E01  N               ELSE:
05 00193   56      A                  MOV      D,M              NO, MOVE CALL ADDR(H) TO D
05 00194   23      A                  INX      H                    STEP PNTR TO NEXT CALL
05 00195   225DFD  N                  SHLD     100PNTR              SAVE FOR NEXT LOOP-2
05 00198   CD0000  N                   CALL     DE:IND
05 0019B   2151FD  A                   LXI      H,ADR(DATA,SB:RQST) SET MEM PNTR TO SB BYTE
                                   ENDIF
                                ENDIF
05 0019E   7E      A         UNTIL:   VBYT,M,Z                  MORE SB CALLS TO DO  (LOOP-2)
05 0019F   A7      A
05 001A0   C2C300  N
                              IO:READ  SB:RQST
05 001A3   76      A          HLT                               COOL IT UNTIL INTERRUPT RESTART
05 001A4   CAC300  N       UNTIL:   CC,Z,C                      WAS INTERRUPT RTC  (LOOP-3)
05 001A7   F3      A       DI                                   ONLY KIDDING BEFORE, BUT THIS
05 001A8   76      A       HLT                                   TIME REALLY STOP (ABORT)
                         *
                         *  SUBR TO SET CALL TABLE POINTERS
                         *  CALLED BY EACH STATE PROLOG
                         *
                         *  POSITION SB:TABLE POINTER
                         *
05 001A9   3A53FD  N  SB:PNTRS LDA      STATE:                  WHAT STATE IS WANTED
05 001AC   110600  A           LXI.     D,X'06'                 LOAD D&E WITH SKIP NUMBER
05 001AF   210501  N           LXI      H,SB:TABLE-X'06'        H&L=6'<' TABLE ADDR
                               REPEAT
05 001B2   19      A              DAD      D                    SKIP THREE WORDS
05 001B3   3D      A              DCR      A                    DECR STATE LOOP COUNTER
05 001B4   F28201  N           UNTIL:   CC,S,S                  IS POINTER AT CORRECT STATE
                         *
                         *     TRANSFER ADDRS TO VARIABLE SB POINTERS
                         *
05 001B7   1155FD  N           LXI      D,10:CALLS              SET D&E TO FIRST OF SB PNTRS
05 001BA   0602    A           MVI      B,2                     LOAD 10:CALLS
05 001BC   CDCE01  N           CALL     MV:WORDS                            & 20:PNTR
05 001BF   2B      A           DCX      H                       ADJUST 'FROM' PNTR
05 001C0   2B      A           DCX      H                                    BACK 1 WORD
05 001C1   0602    A           MVI      B,2                     LOAD 20PNTR
05 001C3   CDCE01  N           CALL     MV:WORDS                           & 100:PNTR
05 001C6   2B      A           DCX      H                       ADJUST 'FROM' PNTR
05 001C7   2B      A           DCX      H                                    BACK 1 WORD
05 001C8   CDCC01  N           CALL     MV:WORD                 LOAD 100PNTR
                               IO:ALTR  10:CALLS,20:PNTR,20PNTR,;  DATA WORDS MODIFIED
                                        100:PNTR,100PNTR           BY THIS SUBR
```

```
05 001CB    C9       A             RET
                         *NAR
                         *
                         *         MV!WORD/MV!WORDS SUBROUTINES
                         *
                         *         SUBR TO TRANSFER WORDS (2BYTES) FROM MEMORY POINTED TO BY <H&L>
                         *          TO MEMORY POINTED TO BY <D&E>. CALL MV!WORD FOR 1 TRANSFER,
                         *          AND CALL MV!WORDS (WITH B-REG # WORDS TO TRANSFER) FOR
                         *          MULTIPLE TRANSFERS. USES ALL BUT C-REG.
                         *
05 001CC    0601     A   MV!WORD   MVI       B,1                       B= # WORDS TO BE MOVED
                         MV!WORDS  REPEAT
05 001CE    7E       A                 MOV       A,M                   A= 1ST 'FROM' BYTE
05 001CF    12       A                 STAX      D                     STORE IN 1ST 'TO' LOCATION
05 001D0    23       A                 INX       H                     ADVANCE 'FROM'
05 001D1    13       A                 INX       D                            AND 'TO' PNTRS
05 001D2    7E       A                 MOV       A,M                   A= 2ND 'FROM' BYTE
05 001D3    12       A                 STAX      D                     STORE IN 2ND 'TO' LOCATION
05 001D4    23       A                 INX       H                     ADVANCE 'FROM'
05 001D5    13       A                 INX       D                            AND 'TO' PNTRS
05 001D6    05       A                 DCR       B                     DECRM # OF WORDS CNTR
05 001D7    C2CE01   N             UNTIL!    CC,Z,S                    LOOP UNTIL ALL WORDS TRANSFERRD
05 001DA    C9       A             RET
                         *
                         *         TABLE OF SB CALL POINTERS
                         *         FOR EACH STATE
                         *
05 001DB    0906     N   SB!TABLE  DW        COMP10
05 001DD    0A06     N             DW        COMP20
05 001DF    1206     N             DW        COMP100
05 001E1    8105     N             DW        TREP10
05 001E3    8505     N             DW        TREP20
05 001E5    C305     N             DW        TREP100
05 001E7    4202     N             DW        NRDY10
05 001E9    4602     N             DW        NRDY20
05 001EB    5202     N             DW        NRDY100
05 001ED    AF02     N             DW        RDY10
05 001EF    B302     N             DW        RDY20
05 001F1    BF02     N             DW        RDY100
05 001F3    A803     N             DW        PRNT10
05 001F5    B203     N             DW        PRNT20
05 001F7    C803     N             DW        PRNT100
05 001F9    1905     N             DW        RUNN10
05 001FB    1D05     N             DW        RUNN20
05 001FD    2F05     N             DW        RUNN100

                         *
                         *         SUBR TO DO EPILOGS & PROLOGS LAST CALL IN EVERY 100MS TABLE
                         *
05 001FF    2153FD   A   STAT!CHG  LXI       H,ADR(DATA,STATE!)        A= PRESENT STATE # IF UNCHANGED
05 00202    7E       A             MOV       A,M                        OR NEXT STATE IF CHANGED
05 00203    23       A             INX       H                         H&L= ADDR 'FORMER STATE' GLOBAL
05 00204    BE       A             IF!       XBYT,A,NE,M               HAS THERE BEEN A STATE CHANGE
05 00205    CA3602   N
                                       ID!READ   STATE!,!STATE!
05 00208    46       A                 MOV       B,M                   YES, B= FORMER STATE
05 00209    77       A                 MOV       M,A                   UPDATE 'FORMER' TO 'PRESENT'
                                       ID!ALTR   !STATE!
05 0020A    78       A                 CASE!     VBYT,B                DO EPILOG FOR FORMER STATE
05 0020B    111F02   N
05 0020E    FE06     A
05 00210    CD0000   N
05 00213    1806     N                     C,0       COMP!EPL          COMPONENT CONTROL STATE
05 00215    DB05     N                     C,1       TREP!EPL          TECH REP STATE
05 00217    7A02     N                     C,2       NRDY!EPL          NOT-READY STATE
05 00219    E302     N                     C,3       RDY!EPL           READY STATE
05 0021B    E603     N                     C,4       PRNT!EPL          PRINT STATE
05 0021D    4105     N                     C,5       RUNN!EPL          SYSTEM RUNNING, NOT PRINT STATE
                                       ENDCASE
05 0021F    3A53FD   N                 CASE!     VBYT,STATE!           DO PROLOG FOR PRESENT STATE
05 00222    113602   N
05 00225    FE06     A
05 00227    CD0000   N
05 0022A    FF05     N                     C,0       COMP!PRL          COMPONENT CONTROL STATE
05 0022C    A505     N                     C,1       TREP!PRL          TECH REP STATE
05 0022E    3702     N                     C,2       NRDY!PRL          NOT-READY STATE
05 00230    A602     N                     C,3       RDY!PRL           READY STATE
05 00232    1603     N                     C,4       PRNT!PRL          PRINT STATE
05 00234    0B05     N                     C,5       RUNN!PRL          SYSTEM RUNNING, NOT PRINT STATE
                                       ENDCASE
                                   ENDIF
05 00236    C9       A             RET                                 RETURN TO 100 MSEC SYNC BKGND
                         *NAR
                         *
                         *         N O T    R E A D Y     S T A T E
                         *
                         *         NOT READY STATE- EXECUTES AFTER INITIALIZE UNTIL ALL READY CONDITIONS
                         *         ARE MET.  THIS STATE CAN ALSO BE ENTERED FROM 'RUN NOT PRINT','READY'
                         *         AND 'TECH REP'.  CONTROL EXITS TO EITHER 'READY' OR 'TECH REP' STATES.

                         *         PROLOG

05 00237    CDA901   N   NRDY!PRL  CALL      SB!PNTRS                  SYNC BKG PNTRS TO NEW STATE
05 0023A    CD0000   N             STIMR     INST@TMR,1000,NEXT@FLT    UPDATES INST FLT CODE IN STBY
05 0023D    49       A
05 0023E    64       A
05 0023F    0000     N
05 00241    C9       A             RET

                         *         CALLS FOR NOT READY 10 MS SYN BACKGROUND
```

```
05 00242   CD0000   N   NRDY10    CALL      ADH0CTRL
05 00245   C9       A             RET

                        *         CALLS FOR NOT READY 20 MS SYN BACKGROUND

05 00246   0000     N   NRDY20    DW        NRDY0SWS
05 00248   0000     N             DW        MN0ELVRS
05 0024A   0000     N             DW        DSPL0CTL
05 0024C   0000     N             DW        LMP0CTRL
05 0024E   0000     N             DW        INSTRU
05 00250   FFFF     A             DW        X'FFFF'                  END OF TABLE

                        *         CALLS FOR NOT READY 100 MS SYN BACKGROUND

05 00252   0000     N   NRDY100   DW        NRILKACK
05 00254   0000     N             DW        RED0BGND
05 00256   0000     N             DW        DVL0DUMP
05 00258   0000     N             DW        RECAPER
05 0025A   0000     N             DW        BIN0CHK                  1
05 0025C   0000     N             DW        MINIPHS1                 2
05 0025E   0000     N             DW        BIL0JMP0
05 00260   0000     N             DW        FUS0ROUT
05 00262   0000     N             DW        FLT0100                  1
05 00264   0000     N             DW        FLT0CTRL                 2
05 00266   0000     N             DW        FLT0CLRN                 3
05 00268   0000     N             DW        PROG2SJM
05 0026A   0000     N             DW        2SD0STPY
05 0026C   0000     N             DW        XMM0STPY
05 0026E   0000     N             DW        JAM0RST
05 00270   0000     N             DW        KEY0CNTR
05 00272   0000     N             DW        TST0LP4
05 00274   8402     N             DW        NRDY:CHG                 TEST IF OK TO
05 00276   FF01     N             DW        STAT:CHG                       LEAVE NOT READY
05 00278   FFFF     A             DW        X'FFFF'                  END OF TABLE

                        *         EPILOG

05 0027A   CD0000   N   NRDY:EPL  C0BIT,S   WAIT*                    INSURE WAIT OFF AT NRDY EXIT
05 0027D   E9FE     A
05 0027F   AF       A             CFLG      STRT:PRT                 DIS-ABLE TRANSFER TO 'PRINT'
05 00280   325BF4   A
05 00283   C9       A             RET

                        *
                        *         SUBR FOR 'NOT-READY' 100MS SYNC BKGND
                        *          TESTS FOR CHANGE TO 'READY' OR 'TREP REP'
                        *
05 00284   CDDF05   N   NRDY:CHG  CALL      TREP:CHG                 TEST FOR STATE CHANGE TO :TREP
05 00287   7E       A             IF:       XBYT,M,NE,:TREP          DID IT CHANGE TO :TREP STATE
05 00288   FE01     A
05 0028A   CA9302   N
                                        ID:READ   STATE:
05 0028D   CD9402   N                   CALL      RDYTEST:       TEST ALL 'READY' FLAGS
05 00290   CD0803   N                   CALL      NRDY:RDY       MOVE TO EITHER :NRDY OR :RDY
                                  ENDIF
05 00293   C9       A             RET

                        *
                        *         SUBR TO TEST ALL 'READY' FLAGS IN A LOOP
                        *
05 00294   2184F7   A   RDYTEST:  LXI       H,RDYFLGS:               H&L= START ADDR OF READY FLAGS
05 00297   0609     A             MVI       B,RDYFNUM:               B= # OF READY FLAGS TO CHK
                                  REPEAT
05 00299   7E       A                   MOV       A,M                A= <PRESENT READY FLAG>
05 0029A   07       A                   RLC                          SET C IF FLAG SET (READY)
05 0029B   DAA002   N                   IF:       CC,C,C             IS PRESENT FLAG INDICATING RDY
05 0029E   0601     A                         MVI       B,1          NO, DON'T TEST ANY FURTHER
                                        ENDIF
05 002A0   23       A                   INX       H                  MOVE TO NEXT FLAG LOCATION
05 002A1   05       A                   DCR       B                  DECRM LOOP CNTR (# READY FLAGS)
05 002A2   C29902   N             UNTIL:    CC,Z,S                   LOOP UNTIL ALL FLAGS CHKED
                                  ID:READ   LENS0RDY,ELV0RDY,FUS0RDY,;  FLAGS READ
                                            PROG0RDY,ILCK0RDY,XMM0RDY,;
                                            FLT0RDY,ADH0NMOV,SRT0RDY
05 002A5   C9       A             RET                                RETURN
                        *NAR
                        *
                        *         R E A D Y   S T A T E
                        *
                        *         READY STATE- EXECUTES WHEN MACHINE IS READY TO GO INTO PRINT STATE.
                        *         CONTROL CAN GO BACK TO 'NOT READY' OR GO TO 'TECH REP' IF REQUIRED.

                        *         PROLOG

05 002A6   CD0000   N   RDY:PRL   S0BIT,S   READY*
05 002A9   E701     A
05 002AB   CDA901   N             CALL      SB:PNTRS                 SYNC BKG PNTRS TO NEW STATE
05 002AE   C9       A             RET

                        *         CALLS FOR READY 10MS SYN BACKGROUND

05 002AF   CD0000   N   RDY10     CALL      ADH0CTRL
05 002B2   C9       A             RET

                        *         CALLS FOR READY 20MS SYN BACKGROUND

05 002B3   0000     N   RDY20     DW        RDY0SWS
05 002B5   0000     N             DW        MN0ELVRS
05 002B7   0000     N             DW        DSPL0CTL
05 002B9   0000     N             DW        LMP0CTRL
05 002BB   0000     N             DW        INSTRU
05 002BD   FFFF     A             DW        X'FFFF'                  END OF TABLE
```

```
                              *     CALLS FOR READY 100MS SYN BACKGROUND

05 002BF   0000     N   RDY100   DW       BIN@CHK                    1
05 002C1   0000     N            DW       MINIPHS1                   2
05 002C3   0000     N            DW       BIL@JMP@
05 002C5   0000     N            DW       OVL@DUMP
05 002C7   0000     N            DW       RECAPER
05 002C9   0000     N            DW       FUS@RDUT
05 002CB   0000     N            DW       FLT@10C                    1
05 002CD   0000     N            DW       FLT@CTRL                   2
05 002CF   0000     N            DW       NRILK@CK
05 002D1   0000     N            DW       RED@BGND
05 002D3   0000     N            DW       2SD@STPY
05 002D5   0000     N            DW       XMM@STPY
05 002D7   0000     N            DW       JAM@RST
05 002D9   0000     N            DW       KEY@CNTR
05 002DB   0000     N            DW       TST@LP4
05 002DD   E9C2     N            DW       RDY:CHG                    TEST IF OK TO
05 002DF   FFC1     N            DW       STAT:CHG                          LEAVE READY
05 002E1   FFFF     A            DW       X'FFFF'                    END OF TABLE

                              *     EPILOG

05 002E3   CD0000   N   RDY:EPL  COBIT,S  READY$
05 002E6   E7FE     A
05 002E8   C9       A            RET

                              *     CHANGE OF STATE ROUTINES

                              *
                              *     SUBR FOR 'READY' 100MS SYNC BKGND
                              *      TESTS FOR CHANGE TO 'NOT-READY' OR 'TECH REP'
                              *
05 002E9   CDDF05   N   RDY:CHG  CALL     TREP:CHG                   TEST FOR STATE CHANGE TO !TREP
05 002EC   7E       A            IF:      XBYT,M,NE,!TREP            DID IT CHANGE TO !TREP STATE
05 002ED   FE01     A
05 002EF   CA0A03   N
                                    ID:READ  STATE:
05 002F2   CD9402   N               CALL     RDYTEST!                TEST ALL 'READY' FLAGS
05 002F5   CD0B03   N               CALL     NRDY!RDY                MOVE TO EITHER !NRDY OR !RDY
05 002F8   3A58F4   A               IF:      FLG,STRT!PRT,T          IS START PRINT REQUESTED
05 002FB   07       A
05 002FC   D20A03   N
05 002FF   2153FD   A                  LXI      H,ADR(DATA,STATE!)   SET MEM PNTR
05 00302   7E       A                  IF:      XBYT,M,EQ,!RDY       OK TO GO TO PRINT
05 00303   FE03     A
05 00305   C20A03   N
                                          ID:READ  STATE:
05 00308   3604     A                     MVI      M,!PRNT           CHG TO PRT STATE
                                          ID:ALTR  STATE:
                                       ENDIF
                                    ENDIF
                                 ENDIF
05 0030A   C9       A            RET

                              *
                              *     SUBR TO USE INFO FROM 'RDYTEST' AND EXECUTE THE PROPER CHANGE OF STATE
                              *
05 0030B   2153FD   A   NRDY:RDY LXI      H,ADR(DATA,STATE!)         SET MEM PNTR
05 0030E   3603     A            MVI      M,!RDY                     ASSUME GOING TO 'READY' STATE
                                 ID:ALTR  STATE!
05 00310   DA1503   N            IF:      CC,C,C                     ARE ALL 'READY' FLAGS SET
05 00313   3602     A               MVI      M,!NRDY                 NO, MOVE TO 'NOT-READY' STATE
                                    ID:ALTR  STATE:
                                 ENDIF
05 00315   C9       A            RET
                              *NAR
                              *
                              *     P R I N T    S T A T E
                              *
                              *     PRINT STATE- EXECUTES WHILE MACHINE IS PRODUCING COPIES.
                              *     ENTERED FROM 'READY' AND EXITS TO 'RUN NOT PRINT'.

                              *     PROLOG

05 00316   2160FE   N   PRNT:PRL CLR!MEM  16,SHIFTREG                CLEAR SHIFT REGISTER
05 00319   0610     A
05 0031B   CD0000   N
05 0031E   3E60     A            MVI      A,LADR(DATA,SHIFTREG)      FORCE SHIFT REG TO START AT
05 00320   3263FD   A            STA      ADR(DATA,SR@PTR!)           BEGINNING OF SHIFTREG TABLE
                                 CLR!MEM  SD1@DLY-TIME@DN!+1,,       CLEAR THE FOLLOWING FLAGS
05 00323   21A7F4   A                     ADR(FLG,TIME@DN!)
05 00326   0609     A
05 00328   CD0000   N
                                 ID:CLR   TIME@DN!,IMED@DN!,,
                                          CYCL@DN!,NORM@DN!,QWIK!OUT,,
                                          IMGMADE!,SD1@TIM@,SD1@DLY
05 0032B   3E80     A            SFLG     910@DONE                   ALLOW FIRST PITCH RESET
05 0032D   326FF4   A
05 00330   AF       A            XRA      A
05 00331   3266FD   N            STA      CYCUPCT!                   INIT CYCLE-UP CNTR TO 0
05 00334   3269FD   N            STA      SR@VALU!                   INIT 'NEW SR VALUE' TO 0
05 00337   325DFA   N            STA      PLL@INFO                   INIT PLL SHUTDOWN CONTROL TO 0
05 0033A   3265FD   N            STA      SHPL@CT!                   INIT SAMPLE COPY CNTR TO 0
05 0033D   3E03     A            MVI      A,3
05 0033F   3267FD   N            STA      NOIMGCT!                   INIT 'NO IMAGE CNTR' TO 3
05 00342   CD0000   N            CALL     SRSK                       SHIFT REG SCHEDULER (INIT SR#0)
05 00345   CD0000   N            CALL     TIM@M@D                    CALC SHIFTED IMAGE VALUES   (1)
05 00348   CD0000   N            STIMR    935:THR,810,RETURN!        SET 'OVER-RUN EVENT' TIMER  (2)
05 0034B   22       A
05 0034C   51       A
```

```
05 0034D    0000     N
05 0034F    CD0000   N              CALL     TBLD@PPT                    BUILD NEW PITCH TABLE      (3)
05 00352    CD0000   N              S0BIT,S  PRNT$RLY,PR$COOL            PRINT RELAY & COOLING FAN ON
05 00355    02       A
05 00356    EA08     A
05 00358    F608     A
05 0035A    AF       A              CTIMR    PR@COOL                     CLEAR COOLING FAN TIMER
05 0035B    3232FA   N
05 0035E    CD0000   N              C0BIT,S  NPF0$0N                     TURN OFF PF0 (INVERTED DRIVER)
05 00361    E47F     A
05 00363    3AB0F4   A              IF!      FLG,ADH@SELC,T
05 00366    07       A
05 00367    D27003   N
05 0036A    CD0000   N                 CALL     ADH@MOTN
05 0036D    C37503   N              ELSE:
05 00370    3E80     A                 SFLG     ADH@WTEN
05 00372    320CF4   A
                                    ENDIF
05 00375    CD0000   N              CALL     TRN@B0D
05 00378    CD0000   N              CALL     PAP@SIZE                    CHK PAPER WIDTH FOR FUSER  (1)
05 0037B    CD0000   N              CALL     EDGE@FP                     CHK WHICH EDGE FADE OUT    (2)
05 0037E    CD0000   N              CALL     PAP@PRL3
05 00381    CD0000   N              CALL     PROG@UP                     PROG INITIALIZATION SUBR
05 00384    CD0000   N              CALL     PROG@UP1
05 00387    CDC000   N              CALL     FDR@PRT                     CHECK FEEDER SELECTION
05 0038A    CD0000   N              CALL     BLG@BKPT                    READ BILLING BREAK-POINTS
05 0038D    CD0000   N              CALL     O0@ELV                      CAUSE ELV TO EXECUTE
05 00390    3A54F4   A              IF!      FLG,SRT@SEL,T               IS SORTER BEING USED
05 00393    07       A
05 00394    D29F03   N
05 00397    CD0000   N                 CALL     SRT@INIT                 INITIALIZE SORTER JAM DETECT
                                       MVI      A,MSK(NVBIT,NV@FJAM,;    SETS ALL 4 JAM CONDITIONS
05 0039A    3E0F     A                          NV@IMED,NV@LOW@J,NV@UP@J)
05 0039C    C3A403   N              ELSE!
05 0039F    3AC9E2   A                 RNVNIB   NV@JAM@N                 READ SAVED PREVIOUS SRT JAMS
                                       MODBYT   A,OR,MSK(NVBIT,;         & SET IMED ON & FOR JAM
05 003A2    F603     A                          NV@FJAM,NV@IMED)
                                    ENDIF
05 003A4    32C9E2   A              WNVNIB   NV@JAM@N                    STORE IN CASE OF PWR DN
                                    ID!ALTR  NV@FJAM,NV@IMED,NV@LOW@J,;  SEE ABOVE IF!/ELSE!
                                             NV@UP@J
05 003A7    CDA901   N              CALL     SB!PNTRS                    SYNC BKG PNTRS TO NEW STATE
05 003AA    C9       A              RET

                          *         CALLS FOR PRINT 10 MS SYN BACKGROUND

05 003AB    CD0000   N    PRNT10    CALL     ADH@CTPL
05 003AE    CDC004   N              CALL     PRT!IMD
05 003B1    C9       A              RET

                          *         CALLS FOR PRINT 20 MS SYN BACKGROUND

05 003B2    0000     N    PRNT20    DW       PRT@SWS
05 003B4    0000     N              DW       TON@DIS
05 003B6    0000     N              DW       PAP@TGL3
05 003B8    0000     N              DW       LMP@CTPL
05 003BA    0000     N              DW       FDR@BKFD
05 003BC    0000     N              DW       SORTER@
05 003BE    0000     N              DW       ELV@PRNT
05 003C0    0000     N              DW       SOS@JMDT
05 003C2    0000     N              DW       DSPL@CTL
05 003C4    0000     N              DW       INSTRU
05 003C6    FFFF     A              DW       X'FFFF'                     END OF TABLE

                          *         CALLS FOR PRINT 100 MS SYN BACKGROUND

05 003C8    0000     N    PRNT100   DW       RILK@CK
05 003CA    0000     N              DW       2SD@RUN
05 003CC    0000     N              DW       LITE@OFF
05 003CE    0000     N              DW       XMM@PRNT
05 003D0    0000     N              DW       FUS@RDUT
05 003D2    0000     N              DW       READY@CK
05 003D4    0000     N              DW       JAM@RST
05 003D6    0000     N              DW       MINIPHS8
05 003D8    4F06     N              DW       SMPL@CPY
05 003DA    0000     N              DW       RXCYCLDN                    STUB IN US IMG
05 003DC    0000     N              DW       KEY@CNTR
05 003DE    0000     N              DW       TST@LP4
05 003E0    2C04     N              DW       PRT!CHG                     TEST IF OK TO
05 003E2    FF01     N              DW       STAT!CHG                              LEAVE PRINT
05 003E4    FFFF     A              DW       X'FFFF'                     END OF TABLE
                          *         EPILOG

05 003E6    CD0000   N    PRNT!EPL  CALL     AX@EPTY                     (1)
05 003E9    CD0000   N              CALL     FDM@EPL3                    (2)
05 003EC    CD0000   N              CALL     FDA@EPL3                    (3)
05 003EF    CD0000   N              CALL     TRN@EPL3
05 003F2    CD0000   N              CALL     DVL@NRDY
                                    C0BIT,S  FUS$CPPL,FUS$LOAD,ILLM$SPL,;
05 003F5    CD0000   N                       EF0$11,EF0$12$5,SMPL$CPY,READY$
05 003F8    07       A
05 003F9    E6F7     A
05 003FB    EDFD     A
05 003FD    F2F7     A
05 003FF    ECF7     A
05 00401    EBF7     A
05 00403    E2FE     A
05 00405    E7FE     A
05 00407    CD0000   N              S0BIT,S  NPF0$0N                     TURN OFF PF0 (INVERTED DRIVER)
05 0040A    E480     A
05 0040C    AF       A              CFLG     ELV@AUTO                    DISABLE AUTO-TRAY SWITCHING
```

```
05 0040D    3222F4   A
05 00410    CD0000   N                CALL      PAP8EPL3
05 00413    CD1704   N                CALL      AB8RT
05 00416    C9       A                RET

                          *
                          *           SUBR8UTINE
                          *

05 00417    F3       A    AB8RT       DI                                      TURN 8FF INTERRUPT SYSTEM
05 00418    AF       A                CFLG      TBL08FIN                      SIGNAL NEW PITCH TABLE REQ'D
05 00419    3250F4   A
05 0041C    211907   N                LXI       H,EV8STBY!                    ADDR 8F STBY EVENT TABLE
05 0041F    2264FD   N                SHLD      EV8PTR!                       SAVE F8R MACH CLK R8UTINE
05 00422    CD0000   N                C8BIT,S   BTR$L8AD,PRNT$RLY             UN-L8AD BTR & DR8P PRINT RELAY
05 00425    02       A
05 00426    E17F     A
05 00428    EAF7     A
05 0042A    FB       A                EI
05 0042B    C9       A                RET
05 0042C    3A66FD   N    PRT!CHG     IF!       XBYT,CYCUPCT!,EQ,2            CHECK F8R PR8L8G 2 8R CYCLE 8UT
05 0042F    FEC2     A
05 00431    C23C04   N
05 00434    3E80     A                    SFLG      PRT$PR82                  YES, SET 'PRINT PR8L8G 2' FLAG
05 00436    3271F4   A
05 00439    C37004   N                8RIF!     XBYT,A,EQ,3                   N8, IS CYCLE UP CNTR=3
05 0043C    FEC3     A
05 0043E    C27004   N
05 00441    3A71F4   A                ANDIF!    FLG,PRT$PR82,T                YES, AND IS PR8L8G 2 FLAG SET
05 00444    07       A
05 00445    D27004   N
05 00448    AF       A                    CFLG      PRT$PR82                  YES, D8 PR8L8G 2 AND CLR FLAG
05 00449    3271F4   A
                          *
                          *           PRINT STATE BACKGR8UND- PR8L8G 2
                          *
05 0044C    CD0000   N                    CALL      PAP$PRL2                  RETN XP8RT 8FF IF N8T SIDE 1
05 0044F    CD0000   N                    CALL      PR8G8UP2
05 00452    3AADF4   A                    IF!       FLG,IMGMADE!,T            HAS 1ST IMAGE BEEN MADE
05 00455    07       A
05 00456    D25C04   N
05 00459    CD0000   N                        CALL      PR8G8UP               YES, CALL PR8G INITIALIZATI8N
                                          ENDIF
05 0045C    3A57FA   N                    IF!       VBYT,MINIBYTE,NZ          IS MINI-PHYSICAL ACTIVE
05 0045F    A7       A
05 00460    CA7004   N
05 00463    AF       A                        CFLG      DSPL81ST              YES, ENABLE DISPLAY UPDATE
05 00464    329AF4   A
05 00467    3C       A                        INR       A                     DISPLAY QUANTITY
05 00468    3250FA   N                        STA       DSPL8ST1               C8MPLETE
05 0046B    3E06     A                        MVI       A,6                   SET D8CUMENT T8TAL T8
05 0046D    326FFA   N                        STA       D8C8T8TL               6 F8R ADH D8CUMENT CHECK
                                          ENDIF
                                      ENDIF

                          *           END PR8L8G2

                          *
                          *           BUILD FLAG BYTE
                          *
05 00470    0608     A                MVI       B,8                           NUMBER 8F FLAGS REQ'D
05 00472    AF       A                XRA       A                             CLEAR A-REG
05 00473    57       A                M8V       D,A                           CLEAR D-REG
05 00474    21A9F4   A                LXI       H,ADR(FLG,IMED8DN!)           STARTING ADDR 8F PRT!CHG FLAGS
                                      REPEAT
05 00477    7E       A                    M8V       A,M                       L8AD A W/C8NTENTS 8F FLAG ADDR
05 00478    07       A                    RLC                                 R8TATE FLAG(D7) INT8 CARRY
05 00479    7A       A                    M8V       A,D                       L8AD A W/FLAGS BILT INT8 BYTE
05 0047A    17       A                    RAL                                 PUT FLAG IN D0 & SHIFT LEFT
05 0047B    57       A                    M8V       D,A                       SAVE RESULT IN D-REG
05 0047C    23       A                    INX       H                         STEP T8 NEXT FLAG
05 0047D    05       A                    DCR       B                         DECR NUMBER 8F FLAGS REQ'D
05 0047E    C27704   N                UNTIL!    CC,Z,S                        L88P UNTIL ALL FLAGS IN BYTE
                                      IDIREAD   IMED8DN!,CYCL8DN!,N8RM8DN!,;  FLAGS READ
                                                QWIK!8UT,IMGMADE!,SD18TIM8,;
                                                SD18DLY,ADH8SELC
                          *
                          *           TEST F8R STATE CHANGE T8 !RUNN
                          *
05 00481    3A67FD   N                LDA       N8IMGCT!                      M8V CURRENT N8 IMAGE C8UNTER
05 00484    5F       A                M8V       E,A                           T8 THE E-REG
05 00485    060E     A                MVI       B,14                          L88P CNTR F8R STATE CHG TESTS
05 00487    21E104   N                LXI       H,CYC!8UT                     TABLE ADDR 8F PRT!CHG TESTS
                                      REPEAT
05 0048A    7A       A                    M8V       A,D                       M8V FLAG BYTE T8 THE A-REG
05 0048B    A6       A                    M8DBYT    A,AND,M                   MASK F8R DESIRED FLAGS
05 0048C    23       A                    INX       H                         STEP T8 STATUS TEST
05 0048D    AE       A                    M8DBYT    A,X8R,M                   TEST FLAG STATUS
05 0048E    C29F04   N                    IF!       CC,Z,S                    DID TEST PASS
05 00491    23       A                        INX       H                     YES, STEP T8 N8IMGCT! TEST
05 00492    7B       A                        IF!       XBYT,E,GE,M           IS N8IMGCT! AT C8RRECT VALUE
05 00493    BE       A
05 00494    DA9E04   N
05 00497    3E05     A                            MVI       A,!RUNN           YES, CHANGE STATE
05 00499    3253FD   N                            STA       STATE!             T8 RUN N8T PRINT
05 0049C    0601     A                            MVI       B,1               F8RCE END 8F TESTS (EARLY 8UT)
                                              ENDIF
05 0049E    2B       A                        DCX       H                     ADJ PNTR BACK T8 N8 IMG TEST
                                          ENDIF
05 0049F    23       A                    INX       H                         STEP 8VER N8 IMG TEST
05 004A0    23       A                    INX       H                         STEP T8 MASK F8R NEXT TEST
```

```
830  05 004A1   05      A              DCR      B                        DECR LOOP COUNTER
831  05 004A2   C28A04  N            UNTIL!   CC,Z,S                     ALL TESTS COMPLETE OR STATE CHG
832                          *
833  05 004A5   7A      A            MOV      A,D                        MOV FLAG BYTE TO A-REG
834  05 004A6   E662    A            MODBYT   A,AND,D6!D5!D1             MASK AND TEST FOR FLAGS TRUE
835                                  ID!READ  NORMODN!,CYCLODN!,SD1ODLY  FROM ABOVE BYTF BUILD
836  05 004A8   CAFF04  N            IF!      CC,Z,C                     ARE ANY FLAGS TRUE
837  05 004AB   2166FD  A              LXI      H,ADR(DATA,CYCUPCT!)     PREPARE TO TEST OR MODIFY
838  05 004AE   7E      A              IF!      XBYT,M,GF,3              HAS PROG PUSHED IT TO 0
     05 004AF   FE03    A
     05 004B1   DAB604  N
839                                        ID!READ  CYCUPCT!
840  05 004B4   3602    A                  MVI      M,2                  NO, FORCE CYCLE-UP MODE AGAIN
841                                        ID!ALTR  CYCUPCT!
842                                    ENDIF
843  05 004B6   CD0000  N              COBIT,S  ILLM*SPL                 ILLM SPL OFF DURING DEAD CYCLE
     05 004B9   F2F7    A
844  05 004BB   AF      A              CFLG     SMPLOFLG                 CANCEL SAMPLE COPY SEQUENCE
     05 004BC   324CF4  A
845                                  ENDIF
846  05 004BF   C9      A            RET
                             .

848                          PRT!IMD IF!      FLGS,IMEDODN!,AND,!        IS IMEDIATE DOWN REQUESTED
849  05 004C0   3AA9F4  A                     TBLOSFIN,T                  AND HAS PROB PEEN DETECTED
     05 004C3   215DF4  A
     05 004C6   A6      A
     05 004C7   F20004  N
850  05 004CA   CD1704  N              CALL     ABORT
851  05 004CD   C3E004  N            ORIF!    FLG,TIMEDDN!,T             IF TIMED DWN RFQ'D DROP OUT
     05 004D0   3AA7F4  A
     05 004D3   07      A
     05 004D4   D2E004  N
852  05 004D7   21E1FF  A              COBIT    BTR*LOAD                  BIAS TRANS ROLL (ASAP)
     05 004DA   3E7F    A
     05 004DC   F3      A
     05 004DD   A6      A
     05 004DE   77      A
     05 004DF   F8      A
853                                  ENDIF
854  05 004E0   C9      A            RET

856                          *
857                          *                                           D7 6 5 4 3 2 1 0 (X=DON'T CARE)
858                          *
859                          *                TABLE OF FLAG STATUS TESTS  I C N O I S S A   N C
860                          *                 AND NO IMAGE COUNTER VALUES M Y O W M D D D   O O
861                          *                 USED TO DETERMINE IF STATE  E C R I G 1 1 H     U   T N
862                          *                 SHOULD CHANGE FROM PRINT TO D L M K M O O O   I N   E U
863                          *                 RUN NOT PRINT               O O O ! A T D S   M T   S M
864                          *                                             D D D O D I L E   A E   T B
865                          *                                             N N N U E M Y L   G R     E
866                          *                                             ! ! ! T ! O   C   E       R
867                          *
868  05 004E1   48      A    CYC!OUT DB       D6!D3                       X 1 X X 0 X X X   00     1
869  05 004E2   40      A            DB       D6
870  05 004E3   00      A            DB       0
871  05 004E4   5C      A            DB       D6!D4!D3!D2                 X 1 X 0 1 1 X X   16     2
872  05 004E5   4C      A            DB       D6!D3!D2
873  05 004E6   10      A            DB       16
874  05 004E7   5C      A            DB       D6!D4!D3!D2                 X 1 X 0 1 0 X X   11     3
875  05 004E8   48      A            DB       D6!D3
876  05 004E9   08      A            DB       11
877  05 004EA   68      A            DB       D6!D5!D3                    X 0 1 X 0 X X X   00     4
878  05 004EB   20      A            DB       D5
879  05 004EC   00      A            DB       0
880  05 004ED   75      A            DB       D6!D5!D4!D2!D0              X 0 0 0 X 1 X 0   36     5
881  05 004EE   04      A            DB       D2
882  05 004EF   24      A            DB       36
883  05 004F0   75      A            DB       D6!D5!D4!D2!D0              X 0 0 0 X 1 X 1   20     6
884  05 004F1   05      A            DB       D2!D0
885  05 004F2   14      A            DB       20
886  05 004F3   7D      A            DB       D6!D5!D4!D3!D2!D0           X 0 1 0 1 1 X 0   36     7
887  05 004F4   2C      A            DB       D5!D3!D2
888  05 004F5   24      A            DB       36
889  05 004F6   7D      A            DB       D6!D5!D4!D3!D2!D0           X 0 1 0 1 1 X 1   20     8
890  05 004F7   2D      A            DB       D5!D3!D2!D0
891  05 004F8   14      A            DB       20
892  05 004F9   75      A            DB       D6!D5!D4!D2!D0              X 0 0 0 X 0 X 0   21     9
893  05 004FA   00      A            DB       0
894  05 004FB   15      A            DB       21
895  05 004FC   7D      A            DB       D6!D5!D4!D3!D2!D0           X 0 1 0 1 0 X 0   21     10
896  05 004FD   28      A            DB       D5!D3
897  05 004FE   15      A            DB       21
898  05 004FF   75      A            DB       D6!D5!D4!D2!D0              X 0 0 0 X 0 X 1   13     11
899  05 00500   01      A            DB       D0
900  05 00501   0D      A            DB       13
901  05 00502   7D      A            DB       D6!D5!D4!D3!D2!D0           X 0 1 0 1 0 X 1   13     12
902  05 00503   29      A            DB       D5!D3!D0
903  05 00504   0D      A            DB       13
904  05 00505   10      A            DB       D4                          X X X 1 X X X X   11     13
905  05 00506   10      A            DB       D4
906  05 00507   0B      A            DB       11
907  05 00508   80      A            DB       D7                          1 X X X X X X X   00     14
908  05 00509   80      A            DB       D7
909  05 0050A   00      A            DB       0
```

```
                                  *NAR
                                  *
                                  *        R U N   N O T   P R I N T   S T A T E
                                  *
                                  *        RUN NOT PRINT- EXECUTES WHILE MACHINE IS COMPLETING A COPY RUN.
                                  *        ENTERED FROM 'PRINT' AND EXITS TO 'NOT READY'.

                                  *        PROLOG

05 0050B   CD0000    N   RUNN:PRL  CALL     DO8ELV                        CAUSE ELV TO EXECUTE
05 0050E   CD0000    N             STIMR    RUNN:TMR,2500,RUNNOCHG        STAY IN RUNN 2.5 SEC
05 00511   2F        A
05 00512   FA        A
05 00513   7505      N
05 00515   CDA901    N             CALL     SB:PNTRS                      SYNC BKG PNTRS TO NEW STATE
05 00518   C9        A             RET

                                  *        CALLS FOR RUN NOT PRINT 10 MS SYN BACKGROUND

05 00519   CD0000    N   RUNN10    CALL     ADHOCTPL
05 0051C   C9        A             RET

                                  *        CALLS FOR RUN NOT PRINT 20 MS SYN BACKGROUND

05 0051D   0000      N   RUNN20    DW       RUNNOSWS
05 0051F   0000      N             DW       SORTERS
05 00521   0000      N             DW       SOSOJMDT
05 00523   0000      N             DW       FLVOPRNT
05 00525   0000      N             DW       LMPOCTRL
05 00527   0000      N             DW       PAPOTGL4
05 00529   0000      N             DW       DSPLOCTL
05 0052B   0000      N             DW       INSTRU
05 0052D   FFFF      A             DW       X'FFFF'                       END OF TABLE

                                  *        CALLS FOR RUN NOT PRINT 100 MS SYN BACKGROUND

05 0052F   0000      N   RUNN100   DW       JAMORST
05 00531   0000      N             DW       RILKOCK
05 00533   0000      N             DW       FUSORDUT
05 00535   0000      N             DW       PSDORUN
05 00537   0000      N             DW       XMMOPRNT
05 00539   0000      N             DW       LITEOOFF
05 0053B   0000      N             DW       TSTOLP4
05 0053D   FF01      N             DW       STAT:CHG                      TEST IF OK TO LEAVE RUN NOT PRT
05 0053F   FFFF      A             DW       X'FFFF'                       END OF TABLE

05 00541   CD0000    N   RUNN:EPL  CALL     DELOCK                        CALC COPIES DELIVERED
05 00544   CD0000    N             CALL     PAPOEPL4                      'RUNNPRT' PAPER PATH MOP UP SUB
05 00547   CD0000    N             CALL     MOTOOFF                       TURN OFF SORTER MOTORS
05 0054A   CD0000    N             CALL     DO8ELV                        CAUSE ELV TO EXECUTE
05 0054D   AF        A             CFLG     AXFDOFLT                      RESET FOR USE DURING NEXT RUN
05 0054E   323FF4    A
05 00551   2123FC    A             CFBIT,P  TFOXMMO                       STOP BLINKING OF XMM 'OTHER'
05 00554   3EFE      A
05 00556   A6        A
05 00557   77        A
05 00558   CD0000    N             COBIT,S  SOS$SMPL
05 0055B   ECFD      A
05 0055D   CD7B05    N             CALL     NVOJAM
05 00560   CD0000    N             CALL     RCPOSTRE                      STORE RECAP DATA IN RAM
05 00563   CD0000    N             CALL     ADHOMOTF
05 00566   3E08      A             MVI      A,8
05 00568   3285FA    N             STA      COOLCNT                       SET COUNTER FOR 7 TIMEOUTS
05 0056B   CD0000    N             CALL     PROFAN
05 0056E   CD0000    N             CALL     FLTOEPL5                      (1)
05 00571   CD0000    N             CALL     HISTOFLE                      (2) LOG HISTORY DATA FOR RUN
05 00574   C9        A             RET                                    (3)

05 00575   2153FD    N   RUNNOCHG  LXI      H,STATE!                      SET H&L TO ADDR OF STATE!
05 00578   3602      A             MVI      M,:NRDY                       CHANGE STATE! TO NOT READY
                                   ID:ALTR  STATE!
05 0057A   C9        A             RET

05 0057B   3A66F4    A   NVOJAM    RFLG     UPOJAM                        LOAD A WITH SRT UPPER JAM FLAG
05 0057E   07        A
                                  *                                       & SAVE IT IN THE CARRY BIT
05 0057F   3A36F4    A             LDAFLG   LOWOJAM                       LOAD A WITH SRT LOWER JAM FLAG
05 00582   17        A             RAL                                    & MOVE CARRY &
05 00583   17        A             RAL                                    LOWOJAM INTO THEIR POSITIONS
05 00584   07        A             RLC
05 00585   07        A             RLC
                                   MODBYT   A,AND,MSK(NVBIT,;             MASK FOR DESIRED BITS
05 00586   E60C      A                      NVOLOWOJ,NVOUPOJ)
05 00588   47        A             MOV      B,A                           & SAVE IT IN THE B-REG
05 00589   3AA9F4    A             IF!      FLG,IMEDODN!,T                WAS THERE AN IMED DN CONDITION
05 0058C   07        A
05 0058D   D29605    N
05 00590   78        A                  MOV      A,B                      YES,RESTORE A-REG
                                        MODBYT   A,OR,MSK(NVOBIT,NVOFJAM,;  & SET NV JAM BITS
05 00591   F603      A                           NVOIMED)
05 00593   C3A105    N             ELSE!
05 00596   3A3CFD    A                  IF!      FBITS,FDROAJAM,OR,FDROMJAM,T IS EITHER JAM CONDITION TRUE
05 00599   E60C      A
05 0059B   CA9F05    N
05 0059E   37        A                       STC                          YES,SET CARRY
                                        ENDIF
05 0059F   17        A                  RAL                               ROTATE INTO DO
05 005A0   B0        A                  MODBYT   A,OR,B                   'OR' IN SRT JAM BITS
                                   ENDIF                                  '
05 005A1   32C9E2    A             WNVNIB   NVOJAMON
                                   ID:ALTR  NVOFJAM,NVOIMED,NVOLOWOJ,NVOUPOJ
05 005A4   C9        A             RET                                    RETURN TO STATE CHECKER
```

```
                                  *NAR
                                  *
                                  *      T E C H    R E P    S T A T E
                                  *
                                  *      THE TECH REP STATE IS ENTERED WHEN THE SERVICE KEY IS ON IN
                                  *      'NOT READY' & 'READY' STATES. THIS ALLOWS THE TECH REP TO PERFORM SUCH
                                  *      TASKS AS ACCESS NON-VOLATILE MEMORY & COMPONENT CONTROL.

                                  *
                                  *      PROLOG
                                  *
05 005A5   CD0000   N   TREP:PRL  COBIT,S    WAIT$                  INSURE WAIT OFF AT TREP ENTRANC
05 005A8   E9FE     A
05 005AA   CD0000   N             CALL       DGN@PRL                DIAGNOSTIC PROLOG
05 005AD   CDA901   N             CALL       SB:PNTRS               SYNC BKG PNTRS TO NEW STATE
05 005B0   C9       A             RET

                                  *      CALLS FOR TECH REP 10MS SYN BACKGROUND

05 005B1   CD0000   N   TREP10    CALL       ADH@CTRL
05 005B4   C9       A             RET

                                  *      CALLS FOR TECH REP 20MS SYN BACKGROUND

05 005B5   0000     N   TREP20    DW         TREP@SWS
05 005B7   0000     N             DW         MN@ELVRS
05 005B9   0000     N             DW         LMP@CTRL
05 005BB   0000     N             DW         DSPL@CTL
05 005BD   0000     N             DW         DGN@BKG
05 005BF   0000     N             DW         INSTRU
05 005C1   FFFF     A             DW         X'FFFF'                END OF TABLE

                                  *      CALLS FOR TECH REP 100MS SYN BACKGROUND

05 005C3   0000     N   TREP100   DW         NRILK@CK
05 005C5   0000     N             DW         PSD@STBY
05 005C7   0000     N             DW         XMM@STBY
05 005C9   0000     N             DW         RED@BOND
05 005CB   0000     N             DW         BIN@CHK
05 005CD   0000     N             DW         JAM@RST
05 005CF   0000     N             DW         DVL@DUMP
05 005D1   0000     N             DW         FUS@ROUT
05 005D3   0000     N             DW         TST@LP4
05 005D5   DF05     N             DW         TREP:CHG               TEST IF OK TO
05 005D7   FF01     N             DW         STAT:CHG                        LEAVE TREP REP
05 005D9   FFFF     A             DW         X'FFFF'                END OF TABLE
                                  *
                                  *      EPILOG  (TECH REP STATE)
                                  *
05 005DB   CD0000   N   TREP:EPL  CALL       DGN@EPL                DIAGNOSTIC EPILOG
05 005DE   C9       A             RET

                                  *      CHANGE OF STATE CHECK

05 005DF   2153FD   A   TREP:CHG  LXI        H,ADR(DATA,STATE:)     PREPARE FOR POSSIBLE STATE CHG
05 005E2   7E       A             IF:        XBYT,M,NE,:COMP        DO NOT CHG STATE IF IN COMP
05 005E3   FE00     A
05 005E5   CAFE05   N
05 005E8   3A49F4   A                  IF:        FLG,SER@ACT,T     IF SERVICE KEY IS ON AND IF
05 005EB   07       A
05 005EC   D2FC05   N
05 005EF   3A20FC   A                  ANDIF:     FBIT,DGN@PRT@,F    IN DIAG PRINT PROGRAM
05 005F2   E6C2     A
05 005F4   C2FC05   N
05 005F7   3601     A                       MVI        M,:TREP      CHG TO TREP STATE
05 005F9   C3FE05   N                  ELSE:                        IF KEY IS TURNED OFF
05 005FC   3602     A                       MVI        M,:NRDY      CHG TO NOT READY STATE
                                       ENDIF
                                       ID:ALTR    STATE:
                                  ENDIF
05 005FE   C9       A             RET
```

TABLE II

```
                                  *      FIXED PITCH EVENT TABLE
                                  *
                                  *      EVENTS MUST BE IN SEQUENTIAL ORDER STARTING
                                  *      WITH THE EVENT CLOSES TO PITCH RESET FIRST
                                  *
                                  *      THERE CAN BE NO MORE THAN 256 COUNTS BETWEEN EVENTS
                                  *
                                  *      FORMAT OF EVENTS FOR EVENT TABLE
                                  *
                                  *      EVENT     X,Y,Z
                                  *      WHERE:
                                  *      X = ABSOLUTE COUNTS FROM RESET
                                  *      Y = SHIFT REGISTER NEEDED IN EVENT
                                  *      Z = EVENT NAME
                                  *
                                  *
                                  *      PITCH EVENTS
                                  *
                                         TABLE
```

```
115   05 0001E   0200   A        EVENT   2,3,TRN2CURR
      05 00020   03     A
      05 00021   0000   N
116   05 00023   0300   A        EVENT   3,2,ADC@ACT
      05 00025   02     A
      05 00026   0000   N
117   05 00028   0400   A        EVENT   4,3,FDR5AFLT
      05 0002A   03     A
      05 0002B   0000   N
118   05 0002D   0700   A        EVENT   7,0,SPLYS@ØN
      05 0002F   00     A
      05 00030   0000   N
119   05 00032   0800   A        EVENT   8,2,FDR1AXFD
      05 00034   02     A
      05 00035   0000   N
120   05 00037   0A00   A        EVENT   10,3,FUS@LØAD
      05 00039   03     A
      05 0003A   0000   N
121   05 0003C   3000   A        EVENT   48,8,DECG@INV       DECISIØN GATE FØR INVTD CØPIES
      05 0003E   08     A
      05 0003F   0000   N
122   05 00041   3600   A        EVENT   54,5,FUS@NTLD       FUSER LØADED TEST
      05 00043   05     A
      05 00044   0000   N
123   05 00046   5500   A        EVENT   85,3,FDR6MFLT
      05 00048   03     A
      05 00049   0000   N
124   05 0004B   5900   A        EVENT   89,2,FDR2MNFD
      05 0004D   02     A
      05 0004E   0000   N
125   05 00050   5D00   A        EVENT   93,8,JAM6@NØN       PAPER PATH JAM SW PITCH EVENT
      05 00052   08     A
      05 00053   0000   N
126   05 00055   7600   A        EVENT   118,9,JAM5@INV      PAPER PATH JAM SW PITCH EVENT
      05 00057   09     A
      05 00058   0000   N
127   05 0005A   7800   A        EVENT   120,0,FSH@ØFF
      05 0005C   00     A
      05 0005D   0000   N
128   05 0005F   8700   A        EVENT   135,0,PRØG@HST      PRØG HISTØRY FILE UPDATE
      05 00061   00     A
      05 00062   0000   N
129   05 00064   8F00   A        EVENT   143,6,JAM4@CHK      PAPER PATH JAM SW PITCH EVENT
      05 00066   06     A
      05 00067   0000   N
130   05 00069   AA00   A        EVENT   170,10,RET2@CHK     PAPER PATH JAM SW PITCH EVENT
      05 0006B   0A     A
      05 0006C   0000   N
131   05 0006E   CF00   A        EVENT   207,3,SØS@CLN
      05 00070   03     A
      05 00071   0000   N
132   05 00073   D100   A        EVENT   209,2,TRN5CURR
      05 00075   02     A
      05 00076   0000   N
133   05 00078   E300   A        EVENT   227,5,JAM3@CHK      PAPER PATH JAM SW PITCH EVENT
      05 0007A   05     A
      05 0007B   0000   N
134   05 0007D   0901   A        EVENT   265,2,FDR3AEDG      ENABLE AUX FDR WT SENSØR
      05 0007F   02     A
      05 00080   0000   N
135   05 00082   0B01   A        EVENT   267,4,JAM2@CHK      PAPER PATH JAM SW PITCH EVENT
      05 00084   04     A
      05 00085   0000   N
136   05 00087   0E01   A        EVENT   270,8,RET1@CHK      PAPER PATH JAM SW PITCH EVENT
      05 00089   08     A
      05 0008A   0000   N
137   05 0008C   6901   A        EVENT   361,3,TRN3DTCK
      05 0008E   03     A
      05 0008F   0000   N
138   05 00091   6C01   A        EVENT   364,2,FDR4MEDG      ENABLE MAIN WT SENSØR
      05 00093   02     A
      05 00094   0000   N
139   05 00096   B901   A        EVENT   441,9,JAM6@INV      PAPER PATH JAM SW PITCH EVENT
      05 00098   09     A
      05 00099   0000   N
140   05 0009B   C201   A        EVENT   450,4,FUS@UNLD
      05 0009D   04     A
      05 0009E   0000   N
141   05 000A0   C301   A        EVENT   451,2,TRN1RØLL
      05 000A2   02     A
      05 000A3   0000   N
142   05 000A5   F401   A        EVENT   500,0,DPM@SMPL
      05 000A7   00     A
      05 000A8   0000   N
143   05 000AA   0E02   A        EVENT   526,3,TRN4DTCK
      05 000AC   03     A
      05 000AD   0000   N
144   05 000AF   1B02   A        EVENT   539,0,DVLV@ØFF      TURN ØFF VAR DENS DEVELØPERS
      05 000B1   00     A
      05 000B2   0000   N
145   05 000B4   5802   A        EVENT   600,0,BIL@PLØP      TEST FØR PLATEN ØPEN      (BLG)
      05 000B6   00     A
      05 000B7   0000   N
146   05 000B9   7602   A        EVENT   630,5,INVTRCTL      INVTR GATE & RETURN CØNTRØL
      05 000BB   05     A
      05 000BC   0000   N
147   05 000BE   8A02   A        EVENT   650,6,DECG@NØN      DECISIØN GATE FØR NØN-INVTD
      05 000C0   06     A
      05 000C1   0000   N
148   05 000C3   9A02   A        EVENT   666,0,JAM@DLY
      05 000C5   00     A
```

```
    05 000C6    0000    N
49  05 000C8    BC02    A          EVENT    700,7,JAM5@NON        PAPER PATH JAM SW PITCH EVENT
    05 000CA    07      A
    05 000CB    0000    N
50  05 000CD    2003    A          EVENT    800,0,PROGMODE
    05 000CF    00      A
    05 000D0    0000    N
51  05 000D2    2203    A          EVENT    802,0,FSH@ENB
    05 000D4    00      A
    05 000D5    0000    N
52  05 000D7    5003    A          EVENT    848,0,DVB@VAR         TURN ON VARIABLE-BIAS DEVELOPER
    05 000D9    00      A
    05 000DA    0000    N
153 05 000DC    5203    A          EVENT    850,4,SRSK@EV         INIT SRSK & SRT MOTOR
    05 000DE    04      A
    05 000DF    0000    N
154 05 000E1    5403    A          EVENT    852,0,PECOFFEV        TURN OFF POST EXP, COROTRON
    05 000E3    00      A
    05 000E4    0000    N
155 05 000E6    8C03    A          EVENT    908,0,PECONEV         TURN ON POST EXP COROTRON
    05 000E8    00      A
    05 000E9    0000    N
156 05 000EB    8EC3    A          EVENT    910,0,910@EV
    05 000ED    00      A
    05 000EE    0000    N
157 05 000F0    9003    A          EVENT    912,0,DGN&HCNT
    05 000F2    00      A
    05 000F3    0000    N
158 05 000F5    A703    A          EVENT    935,0,OVER@RUN
    05 000F7    00      A
    05 000F8    0000    N
159                                ENDTABLE
```

TABLE III

```
71                                 *
72                                 *         VARIABLE PITCH EVENT TABLE
73                                 *
74          00000001               FLSH@BSE  EQU     1
75          00000019               F@@ONBSE  EQU     25
76          00000064               F@@OFFBS  EQU     100
77  05 00000   0100      A         ROM@FSH   DW      FLSH@BSE
78  05 00002   00        A                   DB      0
79  05 00003   0000      N                   DW      FSH@ON
80  05 00005   6400      A         ROM@OFF   DW      F@@OFFBS
81  05 00007   00        A                   DB      0
82  05 00008   0000      N                   DW      F@@OFF
83  05 0000A   1900      A         ROM@ON    DW      F@@ONBSE
84  05 0000C   00        A                   DB      0
85  05 0000D   0000      N                   DW      F@@ON
86  05 0000F   0100      A         ROM@FSHS  DW      FLSH@BSE
87  05 00011   00        A                   DB      0
88  05 00012   0000      N                   DW      FSH@ON@S
89  05 00014   6400      A         ROM@OFFS  DW      F@@OFFBS
90  05 00016   00        A                   DB      0
91  05 00017   0000      N                   DW      F@@OFF@S
92  05 00019   1900      A         ROM@ONS   DW      F@@ONBSE
93  05 0001B   00        A                   DB      0
94  05 0001C   0000      N                   DW      F@@ON@S
95                                 *
```

TABLE IV

```
161         00000396            BASE@CNT SET      918                     #CLK CNTS/PITCH
162         0000038E            SAFE@CNT SET      910                     MIN # CLK CNTS/PITCH
163                             *
164                             *        PITCH TABLE BUILDER
165                             *
166                             *        BUILD VARIABLE PITCH EVENT TABLE INTO RAM
167                             *        FROM ROM DATA + REDUCTION ADJUST & FO TRIM
168                             *
169 05 000FA    2A0000    N     TBLD@PRT LHLD     ROM@FSH                 H&L= BASE CNT OF FLASH
170 05 000FD    EB        A              XCHG                             D&E= BASE CNT OF FLASH
171 05 000FE    2A9AFC    N              LHLD     1FLSH@ON                H&L= RED ADJ
172 05 00101    19        A              DAD      D                       H&L= BASE + ADJ
173 05 00102    2244FC    N              SHLD     RAM@FSH                 RAM@FSH = BASE + ADJ
174                             *
175 05 00105    2A0500    N              LHLD     ROM@OFF                 H&L= BASE CNT OF FO OFF
176 05 00108    EB        A              XCHG                             D&E= BASE CNT OF FO OFF
177 05 00109    2A9CFC    N              LHLD     1F@@OFF                 H&L= RED ADJ + TRIM ADJ
178 05 0010C    19        A              DAD      D                       H&L= BASE + ADJ
179 05 0010D    2249FC    N              SHLD     RAM@OFF                 RAM@OFF = BASE + ADJ
180                             *
181 05 00110    2A0A00    N              LHLD     ROM@ON                  H&L= BASE CNT OF FO ON
182 05 00113    EB        A              XCHG                             D&E= BASE CNT OF FO ON
183 05 00114    2A9EFC    N              LHLD     1F@@ON                  H&L= RED ADJ + TRIM ADJ
184 05 00117    19        A              DAD      D                       H&L= BASE + ADJ
185 05 00118    CDEA02    N              CALL     ON@MOD                  CALL MOD ROUTINE TO MOD IF<0
186 05 0011B    224EFC    N              SHLD     RAM@ON                  RAM@ON = RESULTS OF ABOVE
187                             *
188 05 0011E    3A31F4    A              IF1      FLG,IMG@SFT,T           IS THERE IMAGE SHIFT
    05 00121    07        A
    05 00122    D25601    N
```

```
189  05 00125  3E06     A            MVI    A,6           YES,# OF VAR EVENTS TO USE = 6
190  05 00127  47       A            MOV    B,A           SET UP B-REG FOR LOOP CONTROL
191  05 00128  3262FA   N            STA    TBLD@NUM      STORE # OF VAR EVENTS
192  05 0012B  3D       A            DCR    A             SET UP # OF TIMES TO GO
193  05 0012C  3263FA   N            STA    TBLD@TMP      THRU SORT
194                         *
195  05 0012F  2A0F00   N            LHLD   ROM@FSHS      UPDATE ROM@FSHS TO
196  05 00132  EB       A            XCHG                 INCLUDE RED MODE ADJ + SHIFT
197  05 00133  2AA0FC   N            LHLD   2FLSH@ON      ADJ AND SAVE FOR THE
198  05 00136  19       A            DAD    D             IMAGE SHIFT
199  05 00137  2253FC   N            SHLD   RAM@FSHS      FLASH EVENT
200                         *
201  05 0013A  2A1400   N            LHLD   ROM@OFFS      UPDATE ROM@OFFS TO INCLUDE
202  05 0013D  EB       A            XCHG                 RED MODE ADJ + TRIM ADJ +
203  05 0013E  2AA2FC   N            LHLD   2FE@OFF       SHIFT ADJ AND SAVE
204  05 00141  19       A            DAD    D             FOR THE IMAGE SHIFT
205  05 00142  2258FC   N            SHLD   RAM@OFFS      FADE OUT EVENT
206                         *
207  05 00145  2A1900   N            LHLD   ROM@ONS       UPDATE ROM@ONS TO INCLUDE
208  05 00148  EB       A            XCHG                 RED MODE ADJ + TRIM ADJ +
209  05 00149  2AA4FC   N            LHLD   2FE@ON        SHIFT ADJ
210  05 0014C  19       A            DAD    D
211  05 0014D  CDEA02   N            CALL   ON@MOD        CALL MOD ROUTINE TO MOD IF <0
212  05 00150  225DFC   N            SHLD   RAM@ONS       SAVE THE RESULTS
213                         *
214  05 00153  C36001   N        ELSE:
215  05 00156  3E03     A            MVI    A,3           IF IMAGE SHIFT NOT SET
216  05 00158  47       A            MOV    B,A           #OF VAR EVENTS TO USE = 3
217  05 00159  3262FA   N            STA    TBLD@NUM      SET UP B-REG FOR LOOP CONTROL
218  05 0015C  3D       A            DCR    A             STORE # OF VAR EVENTS & SETUP
219  05 0015D  3263FA   N            STA    TBLD@TMP      #OF TIMES TO GO THRU SORT
220                              ENDIF
221                         *
440                         *
441                         *    SUBROUTINE TO DETERMINE IF MODIFIED FO ON EVENT
442                         *    CLK COUNT IF CLK COUNT RESULTS ARE NEGATIVE OR 0
443                         *
444  05 002EA  7C       A   ON@MOD  MOV    A,H            A= MS PART OF ABS CLK COUNT
445  05 002EB  07       A           RLC                   CARRY= SIGN OF ABS CLK COUNT
446  05 002EC  D20203   N           IF:    CC,C,S         IS THE ABS CLK CNT NEG
447  05 002EF  119603   A              LXI    D,BASE@CNT  YES,ADD # CLK COUNTS PER PITCH
448  05 002F2  19       A              DAD    D           TO NEG #
449  05 002F3  118E03   A              IF:    XWRD,H,GE,SAFE@CNT  IS RESULTS GE SAFE # CLK/PITCH
     05 002F6  CD0000   N
     05 002F9  DAFF02   N
450  05 002FC  210100   A                 LXI    H,1      YES,MOVE TO TURN ON LATER
451                                    ENDIF
452  05 002FF  C30E03   N           ORIF:  XWRD,H,EQ,0    IF RESULTS = 0, MOVE LATER IN
     05 00302  110000   A
     05 00305  CD0000   N
     05 00308  C20E03   N
453  05 0030B  210100   A              LXI    H,1         PITCH BECUASE EVENT MUST BE > 0
454                                 ENDIF
455  05 0030E  C9       A           RET
456                                 END

CONTROL SECTION SUMMARY: 01 00000  PT 0    02 00000  PT 0    03 00000  PT 0    04 OFFD8  PT 2
                         05 0030F  PT 1
* NO UNDEFINED SYMBOLS
*    ERROR SEVERITY LEVEL: 0
* NO ERROR LINES
```

TABLE V

```
252                         *
253                         *    SORTS VARIABLE RAM EVENT TABLE BY
254                         *    ABS CLK COUNT & LOWEST ENDS IN EV@RAM
255                         *
256                         *    SORTS ONLY 1ST 3 IF NO IMAGE SHIFT, OTHERWISE SORTS ALL 6
257                         *
258  05 0017E  2144FC   N        LXI     H,EV@RAM              H&L= ADDR OF TOP OF VAR RAM TBL
259  05 00181  3A63FA   N        WHILE:  XBYT,TBLD@TMP,NE,0    TIMES TO GO THRU OUTER LOOP
     05 00184  FE00     A
     05 00186  CAFD01   N
260  05 00189  3253FA   N           STA     IN@LP@CT          INTER LOOP CNT=OUTER LOOP CNT
261  05 0018C  3E80     A           SFLG    TBLD@1ST          SET 1ST FLAG FOR THIS POSITION
     05 0018E  325EF4   A
262  05 00191  2252F8   N           SHLD    FIX@ADDR          ADDR OF POSITION TO FULL
263  05 00194  B7       A           ORA     A                 CLEAR Z CONDITION BIT
264  05 00195  CAEF01   N           WHILE:  CC,Z,C
265  05 00198  5E       A              MOV     E,M            E= LS PART OF ABS CLK COUNT
266  05 00199  23       A              INX     H
267  05 0019A  56       A              MOV     D,M            D= MS PART OF ABS CLK COUNT
268  05 0019B  D5       A              PUSH    D              STORE ABS CLK CNT OF FILL POS
269  05 0019C  3A5EF4   A              IF:     FLG,TBLD@1ST,T IS IT 1ST TIME FOR THIS POS
     05 0019F  07       A
     05 001A0  D2AE01   N
270  05 001A3  AF       A                 CFLG    TBLD@1ST    YES, CLEAR ITS FLAG
     05 001A4  325EF4   A
271  05 001A7  23       A                 INX     H           AND INCREMENT
272  05 001A8  23       A                 INX     H           POINTER TO LS PART OF
273  05 001A9  23       A                 INX     H           ABS CLK COUNT OF NEXT
274  05 001AA  23       A                 INX     H           EVENT
275  05 001AB  C3B601   N              ELSE:
276  05 001AE  2A5CFB   N                 LHLD    VAR@ADDR    H&L= ADDR
277  05 001B1  23       A                 INX     H           OF LS PART OF
278  05 001B2  23       A                 INX     H           ABS CLK COUNT TO
279  05 001B3  23       A                 INX     H           COMPARE TO FILL
280  05 001B4  23       A                 INX     H           POSITION
```

```
05 001B5    23       A                INX      H
                                  ENDIF
05 001B6    225CFB   N            SHLD     VAR@ADDR              STORE POINTER TO COMPARE EVENT
05 001B9    5E       A            MOV      E,M                   E= LS PART OF COMPARE ABS CLK
05 001BA    23       A            INX      H
05 001BB    56       A            MOV      D,M                   D= MS PART OF COMPARE ABS CLK
05 001BC    E1       A            POP      H                     H&L= ABS CLK COUNT OF FILL POS
05 001BD    EB       A            IF:      XWRD,D,LT,H           IS CLK OF COMPARE < FILL
05 001BE    CD0000   N
05 001C1    D2E501   N
05 001C4    2A5CFB   N                LHLD     VAR@ADDR          YES, SWITCH THE 2 EVENTS
05 001C7    EB       A                XCHG                       D&E= ADDR LOWER CLK VALUE
05 001C8    2A52FB   N                LHLD     FIX@ADDR          H&L= ADDR LARGER CLK VALUE
05 001CB    3EFB     A                MVI      A,-5              INITIALIZE LOOP COUNTER TO 5
05 001CD    3265FA   N                STA      TSW@NUM           WHICH = # OF ITEMS TO MOVE
05 001D0    B7       A                ORA      A                 CLEAR Z CONDITION BIT
05 001D1    CAE501   N                WHILE:   CC,Z,C
05 001D4    1A       A                    LDAX     D             A= CONTAINS OF COMPARE EVENT
05 001D5    46       A                    MOV      B,M           B= CONTAINS OF FILL EVENT
05 001D6    77       A                    MOV      M,A           UPDATE FILL POS
05 001D7    78       A                    MOV      A,B           UPDATE COMPARE POS
05 001D8    12       A                    STAX     D             WITH NEW VALUE
05 001D9    13       A                    INX      D             MOVE POINTERS TO
05 001DA    23       A                    INX      H             NEXT ITEM
05 001DB    3A65FA   N                    LDA      TSW@NUM       INC MOVE
05 001DE    3C       A                    INR      A             LOOP CONTROL
05 001DF    3265FA   N                    STA      TSW@NUM       COUNTER
05 001E2    C3D101   N                ENDWHILE
                                  ENDIF
05 001E5    2153FA   N            DECBYT   IN@LP@CT              DECRM INNER LOOP CNTR
05 001E8    35       A
05 001E9    2A52FB   N            LHLD     FIX@ADDR              H&L= ADDR OF FILL POSITION
05 001EC    C39501   N        ENDWHILE
05 001EF    110500   A        LXI      D,5                       MOVE H&L TO LOOK AT NEXT EVENT
05 001F2    19       A        DAD      D                         POSITION TO FILL
05 001F3    3A63FA   N        LDA      TBLD@TMP                  DECREMENT # OF EVENTS
05 001F6    3D       A        DCR      A                         TO SORT
05 001F7    3263FA   N        STA      TBLD@TMP
05 001FA    C38101   N    ENDWHILE
```

TABLE VI

```
                         *
                         *   MOVE THE SR# & EVENT ADDR FROM ROM TABLE
                         *   TO RAM TABLE.  MOVES ONLY THE FIRST 3 IF
                         *   NO IMAGE SHIFT, OTHERWISE MOVES ALL 6
                         *
05 00160    1144FC   N       LXI      D,RAM@FSH          D&E = ADDR OF RAM TABLE
05 00163    210000   N       LXI      H,ROM@FSH          H&L = ADDR OF ROM TABLE
05 00166    B0       A       ORA      B                  CLEAR Z CONDITION BIT
05 00167    CA7E01   N       WHILE:   CC,Z,C
05 0016A    23       A           INX      H              INCREMENT H&L AND D&E
05 0016B    23       A           INX      H              POINTERS OVER THE
05 0016C    13       A           INX      D              ABS CLK COUNT
05 0016D    13       A           INX      D
05 0016E    7E       A           MOV      A,M            LOAD A WITH SR#
05 0016F    12       A           STAX     D              STORE SR# IN RAM TABLE
05 00170    23       A           INX      H              MOVE POINTERS TO LS
05 00171    13       A           INX      D              ADDR OF EVENT
05 00172    7E       A           MOV      A,M            LOAD A WITH LS ADDR OF EVENT
05 00173    12       A           STAX     D              & STORE IT IN RAM TABLE
05 00174    23       A           INX      H              MOVE POINTERS TO MS
05 00175    13       A           INX      D              ADDR OF EVENT
05 00176    7E       A           MOV      A,M            MOVE MS ADDR OF EVENT
05 00177    12       A           STAX     D              TO RAM
05 00178    23       A           INX      H              MOVES POINTERS TO
05 00179    13       A           INX      D              LS PART OF ABS CLK COUNT
05 0017A    05       A           DCR      B              DECREMENT LOOP COUNTER
05 0017B    C36701   N       ENDWHILE
                         *
```

TABLE VII

```
                         *
                         *   MERGE VARIABLE PITCH EVENT TABLE & FIXED EVENT
                         *   TABLE CALCULATING THE REL DIFFERENCE WITH THE
                         *   RESULTS GOING INTO THE RUN EVENT TABLE
                         *
05 001FD    2A44FC   N       LHLD     EV@RAM             INITIALIZE VAR@CLK TO ABS CLK
05 00200    225EFB   N       SHLD     VAR@CLK            COUNT OF 1ST VAR PITCH EVENT
05 00203    2144FC   N       LXI      H,EV@RAM           INITIALIZE VAR@ADDR TO ADDR OF
05 00206    225CFB   N       SHLD     VAR@ADDR           1ST VAR PITCH EVENT
05 00209    211E00   N       LXI      H,EV@ROM           INITIALIZE FIX@ADDR TO ADDR OF
05 0020C    2252FB   N       SHLD     FIX@ADDR           1ST FIXED PITCH EVENT
05 0020F    3E80     A       SFLG     TBLD@1ST           NOTES 1ST EVENT TO RUN TABLE
05 00211    325EF4   A
05 00214    3E2C     A       MVI      A,TABLENUM         INITIALIZE TSW@NUM TO # OF
05 00216    3265FA   N       STA      TSW@NUM            EVENTS IN FIXED PITCH TABLE
05 00219    2A1E00   N       LHLD     EV@ROM             INITIALIZE D&E WITH ABS CLOCK
05 0021C    EB       A       XCHG                        COUNT OF 1ST FIXED EVENT
05 0021D    AF       A       CFLG     VAR@DONE           FLAG DENOTES VAR EVENTS
05 0021E    3259F4   A
05 00221    3A59F4   A       WHILE:   FLG,VAR@DONE,F     WHILE THERE ARE MORE VAR EVENTS
05 00224    07       A
05 00225    DA6F02   N
```

```
05 00228   2A5EFB   N          IF!      XWRD,VAR@CLK,LE,D       IS VAR CLK CNT <= FIXED CLK CNT
05 0022B   CD0000   N
05 0022E   DA3402   N
05 00231   C25902   N
05 00234   2A5CFB   N             LHLD     VAR@ADDR             YES, H&L= VAR EVENT ADDR
05 00237   CD9302   N             CALL     TBLD@UPD             PLACE VAR EVENT AT END RUN TBL
05 0023A   3A62FA   N             LDA      TBLD@NUM             DECREMENT # OF
05 0023D   3D       A             DCR      A                    VARIABLE EVENTS LEFT
05 0023E   3262FA   N             STA      TBLD@NUM             TO MERGE
05 00241   C24C02   N             IF!      CC,Z,S               DID TBLD@NUM GO TO 0
05 00244   3E80     A                SFLG     VAR@DONE          YES,DENOTE NO MORE VAR EVENTS
05 00246   3259F4   A
05 00249   C35602   N             ELSE!
05 0024C   225CFB   N                SHLD     VAR@ADDR          STORE ADDR OF NEXT VAR EVENT
05 0024F   5E       A                MOV      E,M               UPDATE VAR@CLK TO
05 00250   23       A                INX      H                 VALUE OF ABS CLK COUNT
05 00251   56       A                MOV      D,M               OF PRESENT VARIABLE
05 00252   EB       A                XCHG                       EVENT
05 00253   225EFB   N                SHLD     VAR@CLK
                                  ENDIF
05 00256   C36602   N          ELSE!                            IF FIXED TABLE CLK COUNT IS
05 00259   2A52FB   N             LHLD     FIX@ADDR             LESS THEN VAR TABLE UPDATE THE
05 0025C   CD9302   N             CALL     TBLD@UPD             RUN TABLE WITH THAT EVENT
05 0025F   2252FB   N             SHLD     FIX@ADDR             UPDATE TO NEXT FIXED EVENT
05 00262   2165FA   N             LXI      H,TSW@NUM            DECREMENT # OF FIXED EVENTS
05 00265   35       A             DCR      M                    LEFT
                               ENDIF
05 00266   2A52FB   N          LHLD     FIX@ADDR
05 00269   5E       A          MOV      E,M                     UPDATE D&L TO =
05 0026A   23       A          INX      H                       ABS CLK CNT VALUE
05 0026B   56       A          MOV      D,M                     OF PRESENT FIXED TABLE
05 0026C   C32102   N       ENDWHILE
05 0026F   3EFF     A       MVI      A,X'FF'                    CLEAR Z CONDITION
05 00271   B7       A       ORA      A                          BIT FOR LOOP
05 00272   2A52FB   N       LHLD     FIX@ADDR                   NO MORE VAR EVENTS, USE FIXED
05 00275   CA8402   N       WHILE!   CC,Z,C                     DONE WITH FIXED TABLE
05 00278   CD9302   N          CALL     TBLD@UPD                NO,UPDATE RUN TABLE
05 0027B   EB       A          XCHG                             SAVE H&L IN D&E
05 0027C   2165FA   N          LXI      H,TSW@NUM               DECREMENT # OF FIXED
05 0027F   35       A          DCR      M                       EVENTS LEFT
05 00280   EB       A          XCHG                             RESTORE H&L
05 00281   C37502   N       ENDWHILE
05 00284   2A58FB   N       LHLD     P@TBL@A                    H&L=ADDR OF LAST MS ADDR IN RUN
05 00287   2B       A       DCX      H                          MOVE H&L POINTER BACK TO POINT
05 00288   2B       A       DCX      H                          AT THE BEGINNING OF THE LAST
05 00289   2B       A       DCX      H                          EVENT (OVER@RUN) & STORE IT
05 0028A   2264FD   N       SHLD     EV@PTR!                    FOR MACH CLK INTERRUPT HANDLER
05 0028D   3E80     A       SFLG     TBLD@FIN                   DENOTES PITCH TABLE IS COMPLETE
05 0028F   325DF4   A
05 00292   C9       A       RET
                        *
                        *   SUBROUTINE TO CALCULATE REL DIFFERENCE BETWEEN
                        *   2 EVENTS & MOVE REST OF TABLE TO RUN TABLE
                        *
05 00293   3A5EF4   A   TBLD@UPD IF!   FLG,TBLD@1ST,T           THIS IS THE FIRST EVENT
05 00296   07       A
05 00297   D2AF02   N
05 0029A   AF       A          CFLG     TBLD@1ST                YES, CLR FLAG TO KEEP OUT
05 0029B   325EF4   A
05 0029E   7E       A          MOV      A,M                     A= LS OF 1ST EVENT ABS CLK CNT
05 0029F   3251FA   N          STA      EV@1@TIM                USED AT PITCH RESET
05 002A2   5F       A          MOV      E,A                     E=LS OF 1ST EVENT ABS CLK CNT
05 002A3   23       A          INX      H                       H&L=ADDR OF MS ABS CLK CNT
05 002A4   56       A          MOV      D,M                     D=MS OF 1ST EVENT ABS CLK CNT
05 002A5   EB       A          XCHG                             D&E= ADDR OF MS ABS CLK CNT
05 002A6   2256FB   N          SHLD     LCLK@CNT                STORE ABS CLK OF 1ST EVENT
05 002A9   21E8FE   N          LXI      H,EV@BASE!              H&L = ADDR OF RUN TABLE
05 002AC   C3D802   N       ELSE!
05 002AF   5E       A          MOV      E,M                     E=LS CLK CNT OF NEW EVENT
05 002B0   23       A          INX      H                       H&L= ADDR OF MS ABS CLK CNT
05 002B1   56       A          MOV      D,M                     D=MS CLK CNT OF NEW EVENT
05 002B2   E5       A          PUSH     H                       SAVE ADDR OF MS ABS CLK CNT
05 002B3   2A56FB   N          IF!      XWRD,LCLK@CNT,GE,D      IS LAST CLK CNT GE NEW CLK CNT
05 002B6   CD0000   N
05 002B9   DAC502   N
05 002BC   23       A             INX      H                    H&L= LAST CLK CNT + 1
05 002BD   2256FB   N             SHLD     LCLK@CNT             STORE IT FOR NEXT TIME
05 002C0   3E01     A             MVI      A,1                  PUT THIS EVENT AT THE NEXT CLK
05 002C2   C3CC02   N          ELSE!
05 002C5   45       A             MOV      B,L                  B=LS CLK CNT OF LAST EVENT
05 002C6   EB       A             XCHG                          H&L=ABS CLK CNT OF NEW EVENT
05 002C7   2256FB   N             SHLD     LCLK@CNT             STORE IT FOR THE NEXT TIME
05 002CA   7D       A             MOV      A,L                  A=LS CLK CNT OF NEW EVENT
05 002CB   90       A             SUB      B                    FIND DIFF (ONLY NEED LS IF CLK
                                  ENDIF                         CNTS BETWEEN EVENTS <256)
05 002CC   D1       A          POP      D                       D&E=ADDR OF MS OF CLK OF NEW EV
05 002CD   2A58FB   N          LHLD     P@TBL@A                 H&L= ADDR OF END OF LAST RUN EV
05 002D0   2B       A          DCX      H                       MOVE H&L POINTER
05 002D1   2B       A          DCX      H                       TO REL DIFF OF LAST
05 002D2   2B       A          DCX      H                       EVENT IN RUN TABLE
05 002D3   77       A          MOV      M,A                     MOVE REL DIFF TO RUN TABLE
05 002D4   23       A          INX      H                       INCREMENT RUN TABLE
05 002D5   23       A          INX      H                       POINTER OVER LAST
05 002D6   23       A          INX      H                       EVENT
05 002D7   23       A          INX      H
                            ENDIF
05 002D8   23       A       INX      H                          H&L= ADDR OF SR# IN RUN TABLE
05 002D9   13       A       INX      D                          D&E= ADDR OF SR#
05 002DA   1A       A       LDAX     D                          MOVE SR# FROM TABLE TO
05 002DB   77       A       MOV      M,A                        RUN TABLE
```

```
05 002DC    23      A          INX      H                      MOVE POINTERS TO LS 8 BITS
05 002DD    13      A          INX      D                      OF EVENT ADDR
05 002DE    1A      A          LDAX     D                      MOVE LS 8 BITS OF ADDR
05 002DF    77      A          MOV      M,A
05 002E0    23      A          INX      H                      MOVES POINTER TO MS 8 BITS
05 002E1    13      A          INX      D                      OF EVENT ADDR
05 002E2    1A      A          LDAX     D                      MOVES MS 8 BITS OF ADDR
05 002E3    77      A          MOV      M,A
05 002E4    2258FB  N          SHLD     POTBLOA                STORE ADDR OF RUN TABLE
05 002E7    13      A          INX      D                      POINTER TO LS 8 BITS OF CLK CNT
05 002E8    EB      A          XCHG                            H&L= ADDR OF LS 8 BITS OF CLK
05 002E9    C9      A          RET
                        *
                        *      SUBROUTINE TO DETERMINE IF MODIFIED FO ON EVENT
                        *      CLK COUNT IF CLK COUNT RESULTS ARE NEGATIVE OR 0
                        *
05 002EA    7C      A   ONOMOD MOV      A,H                    A= MS PART OF ABS CLK COUNT
05 002EB    07      A          RLC                             CARRY= SIGN OF ABS CLK COUNT
05 002EC    D20203  N          IF:      CC,C,S                 IS THE ABS CLK CNT NEG
05 002EF    119603  A              LXI      D,BASEOCNT         YES,ADD # CLK COUNTS PER PITCH
05 002F2    19      A              DAD      D                  TO NEG #
05 002F3    118E03  A              IF:      XWRD,H,GE,SAFEOCNT IS RESULTS GE SAFE # CLK/PITCH
05 002F6    CD0000  N
05 002F9    DAFF02  N
05 002FC    210100  A                  LXI      H,1            YES,MOVE TO TURN ON LATER
                                   ENDIF
05 002FF    C30E03  N          ORIF:    XWRD,H,EQ,0            IF RESULTS = 0, MOVE LATER IN
05 00302    110000  A
05 00305    CD0000  N
05 00308    C20E03  N
05 0030B    210100  A              LXI      H,1                PITCH BECUASE EVENT MUST BE > 0
                               ENDIF
05 0030E    C9      A          RET
                               END

CONTROL SECTION SUMMARY: 01 00000   PT 0    02 00000   PT 0    03 00000   PT 0    04 OFFD8   PT 2
                         05 0030F   PT 1
* NO UNDEFINED SYMBOLS
*    ERROR SEVERITY LEVEL: 0
* NO ERROR LINES
```

TABLE VIII

```
                        *
                        * PITCH RESET INTERRUPT HANDLER
                        *
06 000F9    FB      A   RSET:  EI                              RE-ENABLE INTERRUPTS
06 000FA    F5      A          PUSH     PSW                    SAVE A-REG & CONDITION BITS
06 000FB    3A5DF4  A          IF:      FLG,TBLDOFIN,T         IS PITCH TABLE BUILD FINISHED
06 000FE    07      A
06 000FF    D26201  N
06 00102    E5      A              PUSH     H                  SAVE H&L
                                   IF:      FLGS,SRODONE,;     YES, IS THERE A NEW SR VALUE
06 00103    3A4DF4  A                       AND,910ODONE,T     YES, DID 910 EVENT GET DONE
06 00106    216FF4  A
06 00109    A6      A
06 0010A    F25501  N
06 0010D    AF      A                  CFLG     910ODONE       YES, RESET & MACH CLK TIMING OK
06 0010E    326FF4  A
06 00111    324DF4  A                  MODFLG   SRODONE        CLR FLAG UNTIL NEXT SR EVENT
06 00114    2163FD  A                  LXI      H,ADR(DATA,SROPTR!)  LOAD RELATIVE
06 00117    7E      A                  MOV      A,M                      PNTR TO SR #0
06 00118    C60F    A                  MODBYT   A,ADD,15       MOVE PNTR BACK
06 0011A    E66F    A                  MODBYT   A,AND,SROADJ!           BY 1 (CIRCULAR)
06 0011C    77      A                  MOV      M,A            SAVE NEW REL SR PNTR IN SROPTR!
06 0011D    26FE    A                  MVI      H,HADR(DATA,SHIFTREG) H&L= ABS ADDR
06 0011F    6F      A                  MOV      L,A                             OF SR #0
06 00120    3A69FD  A                  LDA      ADR(DATA,SROVALU!)  A= NEW SR VALUE FROM SRSK
06 00123    77      A                  MOV      M,A            UPDATE CONTENTS OF SR#0
06 00124    3A51FA  A                  LDA      ADR(DATA,EVO1OTIM)  INIT MCLK!CNT
06 00127    326EFD  A                  STA      ADR(DATA,MCLK!CNT)     TO 1ST EVENT TIME
06 0012A    21E8FE  A                  LXI      H,ADR(DATA,EVOBASE!)  INIT EVOPTR!
06 0012D    2264FD  A                  SHLD     ADR(DATA,EVOPTR!)      TO 1ST EVENT ADDR
                                       IF:      FLGS,NORMODN!,;   IS NORMAL SHUTDOWN REQUESTED
                                                AND,CYCLODN!,;    NO, IS CYCLE-DOWN REQUESTED
06 00130    3AABF4  A                           AND,SD1ODLY,F     NO, IS PROC DEAD CYCLING
06 00133    21AAF4  A
06 00136    B6      A
06 00137    21AFF4  A
06 0013A    B6      A
06 0013B    FA5201  N
06 0013E    2166FD  A                      LXI      H,ADR(DATA,CYCUPCT!) NO, LOAD CYCLE-UP CNTR
06 00141    7E      A                      IF:      XBYT,M,NE,5    IS PROC IN CYCLE-UP MODE
06 00142    FE05    A
06 00144    CA5201  N
06 00147    FE04    A                          IF:      XBYT,A,EQ,4   YES, IS IT RDY TO MAKE 1ST IMG
06 00149    C25101  N
06 0014C    3E80    A                              SFLG     IMGMADE!  YES, SIGNAL 1ST IMAGE MADE
06 0014E    32ADF4  A
                                               ENDIF
06 00151    34      A                          INR      M          INCRM CYCLE-UP CNTR (UNTIL= 5)
                                           ENDIF
                                       ENDIF
06 00152    C36101  N              ELSE:                           NEW SR VALUE NOT AVAILABLE
06 00155    3E80    A                  SFLG     IMEDODN!       REQUEST AN IMED SHUTDOWN
06 00157    32A9F4  A
06 0015A    2132FD  A                  SFBIT,P  EOPROFLT       SIGNAL EARLY PITCH RESET FAULT
06 0015D    3E40    A
06 0015F    B6      A
06 00160    77      A
```

```
258                                      ENDIF
259  06 00161    E1        A             POP      H                     RESTORE H&L
260                                  ENDIF
261  06 00162    3EFE      A             MVI      A,RSETFF!             RESET PITCH RESET
262  06 00164    3200E6    A             STA      ADR(EQU,RSINTFF!)                 INT FLIP-FLOP
263  06 00167    F1        A             POP      PSW                   RESTORE A-REG & CONDITION BITS
264  06 00168    C9        A             RET                            RETURN TO INTERRUPTED ROUTINE
```

TABLE IX

```
 57                           *
 58                           * MACHINE CLOCK INTERRUPT HANDLER
 59                           *

 61        06 0002B                    ORIGIN   X'38'                 INTERRUPT TRAP CELL LOCATION

 64  06 00038    F5        A   MCLK!   PUSH     PSW                   SAVE A-REG & CONDITION CODES
 65  06 00039    3A6EFD    A           LDA      ADR(DATA,MCLK!CNT)    IS THERE
 66  06 0003C    3D        A           DCR      A                              A PITCH
 67  06 0003D    C26600    N           IF!      CC,Z,S                                 EVENT TO DO
 68  06 00040    E5        A             PUSH     H                   YES, SAVE
 69  06 00041    D5        A             PUSH     D                           ALL REMAINING
 70  06 00042    C5        A             PUSH     B                                          REGS
 71  06 00043    2A64FD    A             LHLD     ADR(DATA,EVOPTR!)   H&L= 1ST LOC OF NEXT PE TO DO
 72  06 00046    7E        A             MOV      A,M                 SAVE RELATIVE DIFFERENTIAL TO
 73  06 00047    326EFD    A             STA      ADR(DATA,MCLK!CNT)  NEXT EVENT (# CLOCK COUNTS)
 74  06 0004A    23        A             INX      H                   MOVE PNTR TO REL SR IN TABLE
 75  06 0004B    3A63FD    A             LDA      ADR(DATA,SROPTR!)   LOAD REL POSITION OF SR #O
 76  06 0004E    86        A             MODBYT   A,ADD,M             C= LS PORTION OF ADDR OF THE
 77  06 0004F    E66F      A             MODBYT   A,AND,SROADJ!        REQUESTED SHIFT REGISTER
 78  06 00051    4F        A             MOV      C,A                  POSITION (FOR USE WITHIN PE)
 79  06 00052    06FE      A             MVI      B,HADR(SHIFTREG)    B&C= ADDR REQUESTED SR POSITION
 80  06 00054    0A        A             LDAX     B                   A= <REQUESTED SR POSITION>
 81  06 00055    23        A             INX      H                   E= LS PORTION OF ADDR OF THE
 82  06 00056    5E        A             MOV      E,M                  REQUESTED PITCH EVENT
 83  06 00057    23        A             INX      H                   D= MS PORTION OF ADDR OF THE
 84  06 00058    56        A             MOV      D,M                  REQUESTED PITCH EVENT
 85  06 00059    23        A             INX      H                   SAVE PNTR TO
 86  06 0005A    2264FD    A             SHLD     ADR(DATA,EVOPTR!)                NEXT PITCH EVENT
 87  06 0005D    CD0000    N             CALL     DE!IND              VECTOR TO REQUESTED PITCH EVENT
 88  06 00060    C1        A             POP      B                   RESTORE
 89  06 00061    D1        A             POP      D                           SAVED
 90  06 00062    E1        A             POP      H                                REGISTERS
 91  06 00063    C37000    N           ELSE:
 92  06 00066    326EFD    A             STA      ADR(DATA,MCLK!CNT)  NO PE; SAVE DECRM'D 'MCLK!CNT'
 93  06 00069    0F        A             RRC                          IS IT TIME FOR
 94  06 0006A    D27000    N             IF!      CC,C,S                           A REFRESH
 95  06 0006D    3202E6    A                 REFRESH                  YES, REFRESH REMOTES (1 MSEC)
 96                                      ENDIF
 97                                    ENDIF
 98  06 00070    FB        A           EI                             RE-ENABLE INTERRUPT SYSTEM
 99  06 00071    3EFD      A           MVI      A,MCLKFF!             RESET MCLK
100  06 00073    3200E6    A           STA      ADR(EQU,RSINTFF!)              INTERRUPT FLIP-FLOP
101  06 00076    F1        A           POP      PSW                   RESTORE A-REG & CONDITION CODES
102  06 00077    C9        A           RET                            RETURN TO INTERRUPTED ROUTINE
```

TABLE X

```
139                           *
140                           * REAL TIME CLOCK INTERRUPT HANDLER
141                           *

143  06 00081    FB        A   RTC!    EI                             RE-ENABLE INTERRUPTS
144  06 00082    F5        A           PUSH     PSW                   SAVE A-REG & CONDITION BITS
145  06 00083    3EF7      A           MVI      A,RTCFF!              RESET RTC
146  06 00085    3200E6    A           STA      ADR(EQU,RSINTFF!)              INTERRUPT FLIP-FLOP
147  06 00088    D5        A           PUSH     D                     SAVE D&E REGS
148  06 00089    E5        A           PUSH     H                     SAVE H&L REGS
149  06 0008A    C5        A           PUSH     B                     SAVE 'B' REGISTER
150                           *
151  06 0008B    2150FD    N           DECBYT   GLB!TIMR              DECREMENT THE CLOCK CELL
     06 0008E    35        A
152  06 0008F    7E        A           MOV      A,M                   A = <GLB!TIMR>  ( 0 TO 255 )
153  06 00090    23        A           INX      H                     MEM. PTR. TO SB!RQST BYTE
154  06 00091    E601      A           IF!      XBYT,A,AND,X'01',NZ   IS IT 20 MSEC TIME YET
     06 00093    CA9D00    N
155  06 00096    7E        A             MODBYT   M,OR,10!RQST!20!RQST    YES - BOTH 10 AND 20 BKGD
     06 00097    F6C0      A
     06 00099    77        A
156  06 0009A    C3A100    N           ELSE:
157  06 0009D    7E        A             MODBYT   M,OR,10!RQST          NO - 10 BKGD ONLY
     06 0009E    F680      A
     06 000A0    77        A
158                                    ENDIF
159  06 000A1    23        A           INX      H                     MEM. PTR. TO DIVD!10 CNTR
160  06 000A2    35        A           DCR      M                     DECREMENT 10 TO 0 COUNTER
161  06 000A3    C2AD00    N           IF!      CC,Z,S                HAS 100 MSEC PASSED
162  06 000A6    360A      A             MVI      M,10                YES - RESET THE 10 TO 0 COUNTER
163  06 000A8    2B        A             DCX      H                   MEM. PTR. BACK TO SB!RQST
164  06 000A9    7E        A             MODBYT   M,OR,100!RQST       ADD 100 BKGD TO REQUEST BYTE
     06 000AA    F620      A
     06 000AC    77        A
165                                    ENDIF
166                                    REPEAT                         NOW CHECK FOR TIME OUTS
167  06 000AD    2150FD    N             LXI      H,GLB!TIMR          LOAD 'B' WITH QUANTITY TO LOOK
168  06 000B0    46        A             MOV      B,M                 FOR (CLOCK CELL VALUE)
```

```
06 000B1  16FB    A        MVI      D,COUNT!              SET 'D' FOR TABLE TO SEARCH
06 000B3  CD0000  N        CALL     FIND:LOC              GO LOOK IN ACTIVE LIST
06 000B6  CAF000  N        IF!      CC,Z,C                HAS A MATCH BEEN FOUND
06 000B9  E5      A          PUSH     H                   YES - SAVE LOCATION ON STACK
06 000BA  26FC    A          MVI      H,ID!               SEGWAY MEM PTR TO ID! TABLE
06 000BC  5E      A          MOV      E,M                 NOW ASSEMBLE
06 000BD  1600    A          MVI      D,0                 ADDRESS OF TIMER
06 000BF  21C8F4  A          LXI      H,TMR!FLGS          FLAG INTO THE
06 000C2  19      A          DAD      D                   MEMORY POINTER
06 000C3  0600    A          MVI      B,0                 GET SET TO CLEAR THE FLAG
06 000C5  F3      A          DI                           NO INTERRUPTIONS NOW, PLEASE
06 000C6  7E      A          MOV      A,M                 GET FLAG
06 000C7  07      A          RLC                          INTO THE CARRY BIT
06 000C8  D2EC00  N          IF!      CC,C,S              IS FLAG SET
06 000CB  70      A            MOV      M,B               YES - RESET AND NOW
06 000CC  FB      A            EI                         EVERYBODY CAN INTERRUPT AGAIN
06 000CD  E1      A            POP      H                 LOCATION FROM STACK TO MEM PTR
06 000CE  26FD    A            MVI      H,LS!ADDR         SEGWAY MEM PTR TO LS! TABLE
06 000D0  5E      A            MOV      E,M               GET LS TIME-OUT ADDRESS
06 000D1  24      A            INR      H                 SEGWAY MEM PTR TO MS! TABLE
06 000D2  56      A            MOV      D,M               GET MS TIME-OUT ADDRESS
06 000D3  45      A            MOV      B,L               LOCATION TO 'B' TEMPORARILY
06 000D4  2A5FFD  N            LHLD     INPTR!            STUFF TIME-OUT ADDRESS INTO
06 000D7  73      A            MOV      M,E               INTO TABLE OF TIME-OUT
06 000D8  23      A            INX      H                 ADDRESSES THAT IS CHECKED
06 000D9  72      A            MOV      M,D               FOR ENTRIES EVERY 10 MSECONDS
06 000DA  23      A            INX      H                 BY THE STATE CHECKER
06 000DB  7D      A            MODBYT   L,AND,TIME!MSK    FORCE A CIRCULAR TABLE
06 000DC  E62F    A
06 000DE  6F      A
06 000DF  225FFD  N            SHLD     INPTR!            SAVE NEW ADDRESS LOCATION
06 000E2  58      A            MOV      E,B               LOCATION BACK TO 'E'
06 000E3  CD0000  N            CALL     DEACTIV!          TAKE OUT OF ACTIVE TIMER LIST
06 000E6  CD0000  N            CALL     PUT!              AND MAKE LOCATION AVAILABLE
06 000E9  C3EE00  N          ELSE!                        * * * FLAG IS NOT SET SO
06 000EC  FB      A            EI                           LET INTERRUPTIONS OCCUR
06 000ED  E1      A            POP      H                   MAKE THE STACK RIGHT AND
                             ENDIF                          FORCE NON-ZERO CONDITION TO
06 000EE  F601    A          MODBYT   A,OR,1                STAY IN UNTIL LOOP
                           ENDIF                          * * * NO MATCH - RTC COMPLETE
06 000F0  C2AD00  N      UNTIL!   CC,Z,S                  WILL FALL THROUGH THIS CRACK
                  *
06 000F3  E1      A      POP      H                       RESTORE THE
06 000F4  44      A      MOV      B,H                     'B' REGISTER
06 000F5  E1      A      POP      H                       RESTORE H&L REGS
06 000F6  D1      A      POP      D                       RESTORE D&E REGS
06 000F7  F1      A      POP      PSW                     RESTORE A-REG & CONDITION CODES
06 000F8  C9      A      RET                              RETURN TO 'FLOAT' BACKGROUND
                  *
```

TABLE XI

```
05 00546  3AB0F4  A  ADH0CTRL IF!   FLG,ADH0SELC,T         ADH SELECTED
05 00549  07      A
05 0054A  D2E805  N
05 0054D  CDA004  N        CALL     SENSREAD              CHECK ADH INPUT SENSORS
05 00550  CAE505  N        IF!      CC,Z,C                CHANGE STATE IF SENSOR CHANGE
05 00553  57      A          MOV      D,A                 SAVE CHANGE MASK IN D REG
05 00554  A0      A          ANA      B                   FIND LEAD EDGES
05 00555  5F      A          MOV      E,A                 SAVE LEAD EDGES IN E REG
05 00556  2F      A          CMA
05 00557  A2      A          ANA      D                   FIND TRAIL EDGES
05 00558  2189FC  N          LXI      H,TEDGINH           SET PNTR TO TEDG INHIBIT MASK
05 0055B  A6      A          ANA      M                   MASK OUT INHIBITED SENSORS
05 0055C  CA9E05  N          IF!      CC,Z,C              ANY TRAIL EDGES THIS READ
05 0055F  57      A            MOV      D,A               SAVE TRAIL EDGES IN D REG
05 00560  23      A            INX      H                 MOV PNTR TO TEDG BYPASS MASK
05 00561  A6      A            ANA      M                 MASK OUT INDETERMINENT TRAIL ED
05 00562  47      A            MOV      B,A               SAVE VALID TRAIL EDGES
05 00563  23      A            INX      H                 MOV PNTR TO TRAIL EDGE EXPECTED
05 00564  7E      A            MOV      A,M               FETCH EXPECTED TRAIL EDGES
05 00565  2F      A            CMA
05 00566  A0      A            ANA      B                 COMPARE ACTUAL AND EXPECTED TRA
05 00567  C29605  N            IF!      CC,Z,S            NO UNEXPECTED TRAIL EDGES
05 0056A  B2      A              ORA      D               RESTORE TRAIL EDG BYE/SET CC FO
05 0056B  1600    A              MVI      D,0             CLR CASE BRANCH TABLE POINTER
                                 REPEAT
05 0056D  17      A                RAL
05 0056E  D28E05  N                IF!      CC,C,S
05 00571  D5      A                  PUSH     D
05 00572  F5      A                  PUSH     PSW
05 00573  7A      A                  CASE!    VBYT,D
05 00574  118C05  N
05 00577  FE08    A
05 00579  CD0000  N
05 0057C  0108    N                    C,0     TEDGFDOF FEED-OFF TRAIL EDGE ROUT
05 0057E  C408    N                    C,1     TEDGWAIT WAIT TRAIL EDGE ROUTINE
05 00580  F308    N                    C,2     TEDGRET RETURN TRAIL EDGE ROUTINE
05 00582  EE05    N                    C,3     SPARE SPARE POSITION
05 00584  0208    N                    C,4     TEDGEXIT EXIT TRAIL EDGE ROUTINE
05 00586  3A09    N                    C,5     TEDGKICK KICK TRAIL EDGE ROUTINE
05 00588  EE05    N                    C,6     SPARE SPARE POSITION
05 0058A  5409    N                    C,7     TEDGIEMP INPUT EMPTY TRAIL EDGE R
                                     ENDCASE
05 0058C  F1      A                  POP      PSW
05 0058D  D1      A                  POP      D
                                   ENDIF
05 0058E  14      A                INR      D              INCREMENT CASE TABLE POINTER
05 0058F  B7      A                ORA      A              CHECK FOR ADDITIONAL TRAIL EDGE
```

```
05 00590   C26D05   N                 UNTIL!    CC,Z,S          LOOP UNTIL NO MORE TRAIL EDGES
05 00593   C39E05   N             ELSE!
05 00596   2134FD   A                 LXIFBYT   H,ADH11         SET PNTR TO PRIMARY FAULT BYTE
05 00599   B6       A                 ORA       M               SAVE INVALID TRAIL EDGES IN FAU
05 0059A   77       A                 MOV       M,A
05 0059B   CDA309   N                 CALL      ADH@ABRT        ABORT ADH
                                  ENDIF
                              ENDIF
05 0059E   7B       A         MOV       A,E
05 0059F   21BCFC   N         LXI       H,LEDGINH               SET PNTR TO LEAD EDGE INHIBIT M
05 005A2   A6       A         ANA       M                       MASK OUT INHIBITED SENSORS
05 005A3   CAE505   N         IF!       CC,Z,C                  LEAD EDGES THIS READ
05 005A6   5F       A             MOV       E,A                 SAVE VALID LEAD EDGES
05 005A7   23       A             INX       H                   MOV PNTR TO LEAD EDGE BYPASS MA
05 005A8   A6       A             ANA       M                   MASK OUT INDETERMINENT LEAD EDG
05 005A9   47       A             MOV       B,A                 SAVE VALID LEAD EDGES IN B-REG
05 005AA   23       A             INX       H                   MOV PNTR TO LEAD EDGE EXPECTED
05 005AB   7E       A             MOV       A,M                 FETCH EXPECTED LEAD EDGES
05 005AC   2F       A             CMA
05 005AD   A0       A             ANA       B                   COMPARE ACTUAL WITH EXPECTED LE
05 005AE   CABC05   N             IF!       CC,Z,C
05 005B1   2134FD   A                 LXIFBYT   H,ADH11         SET PNTR TO PRIMARY FAULT BYTE
05 005B4   B6       A                 ORA       M               SAVE INVALID LEAD EDGES
05 005B5   77       A                 MOV       M,A
05 005B6   CDA309   N                 CALL      ADH@ABRT        ABORT ADH
05 005B9   C3E505   N             ELSE!
05 005BC   B3       A                 ORA       E               FETCH LEAD EDGES (IF ANY)
05 005BD   1600     A                 MVI       D,0             SET POINTER TO ZERO
                                      REPEAT
05 005BF   17       A                     RAL
05 005C0   D2E005   N                     IF!       CC,C,S
05 005C3   5F       A                         MOV       E,A     SAVE LEAD EDGE BYTE
05 005C4   D5       A                         PUSH      D
05 005C5   7A       A                         CASE!     VBYT,D
05 005C6   11DE05   N
05 005C9   FE08     A
05 005CB   CD0000   N
05 005CE   0008     N                             C,0   LEDGFDOF FEED-OFF LEAD EDGE ROUTI
05 005D0   5D07     N                             C,1   LEDGWAIT WAIT LEAD EDGE ROUTINE
05 005D2   AF07     N                             C,2   LEDGRET RETURN LEAD EDGE ROUTINE
05 005D4   EE05     N                             C,3   SPARE SPARE POSITION
05 005D6   B206     N                             C,4   LEDGEXIT EXIT LEAD EDGE ROUTINE
05 005D8   9207     N                             C,5   LEDGKICK KICK LEAD EDGE ROUTINE
05 005DA   EE05     N                             C,6   SPARE SPARE POSITION
05 005DC   CB07     N                             C,7   LEDGIEMP INPUT EMPTY LEAD EDGE RO
                                              ENDCASE
05 005DE   D1       A                         POP       D
05 005DF   7B       A                         MOV       A,E     RESTORE LEAD EDGE BYTE
                                          ENDIF
05 005E0   14       A                     INR       D
05 005E1   B7       A                     ORA       A
05 005E2   C2BF05   N                 UNTIL!    CC,Z,S          LOOP UNTIL NO MORE LEAD EDGES
                                  ENDIF
                              ENDIF
                          ENDIF
05 005E5   C3ED05   N     ELSE!                                 ADH NOT SELECTED
05 005E8   3E80     A         SFLG      ADH@NMOV                INDICATE NO ADH PROBLEMS
05 005EA   328BF7   A
                          ENDIF
05 005ED   C9       A     RET

05 005EE   C9       A   SPARE   RET                             DUMMY ROUTINE FOR CASE TABLES
```

TABLE XII

```
                         *   ****************************************
                         *   *                                      *
                         *   *  LEDGIEMP ROUTINE CALLED BY ADH@CTRL *
                         *   *    WHENEVER THE INPUT GETS EMPTY  THE*
                         *   *    ROUTINE SETS THE ODD LAST FLAGS IF*
                         *   *    NECESSARY,CHECKS OR UPDATES THE   *
                         *   *    TOTAL NUMBER OF DOCUMENTS AND SETS*
                         *   *    THE DOCUMENT FAULT FLAG IF VALID  *
                         *   *                                      *
                         *   ****************************************

05 007CB   3A04F4   A   LEDGIEMP LDAFLG    ADH@FORW          FETCH ADH DIRECTION FLAG
05 007CE   B7       A            ORA       A                 CHECK DOC MOVING (SWTCH DEBOUNC
05 007CF   F2FF07   N            IF!       CC,S,S            VALID INDICATION OF INPUT EMPTY
05 007D2   3238F4   A                MODFLG    LST@ORG       SET LAST ORIGINAL FLAG
05 007D5   3A4AF4   A                LDAFLG    SIDE@1        SIDE 1'S ABOUT TO BE MADE
05 007D8   47       A                MOV       B,A
05 007D9   3AAFF4   A                LDAFLG    SD1@DLY
05 007DC   2F       A                CMA
05 007DD   A0       A                ANA       B             AND NOT JUST STILL BEING DELIVE
05 007DE   F2E707   N                IF!       CC,S,S        IF SO THEN
05 007E1   3223F4   A                    MODFLG    ODD@LAST  INDICATE ODD LAST
05 007E4   3253F4   A                    MODFLG    SRT@ODD   AND MAKE SURE SORTER REMEMBERS
                                     ENDIF
05 007E7   216FFA   N                LXI       H,DOC@TOTL
05 007EA   3A74FC   N                LDA       ORIG@FLH      FETCH CURRENT DOCUEMENT TOTAL
05 007ED   3C       A                INR       A             ADD 1 FOR ONE GOING TO PLATEN
05 007EE   47       A                MOV       B,A           SAVE UPDATED DOCUEMENT TOTAL
05 007EF   7E       A                IF!       VBYT,M,Z      FIRST PASS
05 007F0   A7       A
05 007F1   C2F807   N
```

```
05 007F4   70       A          MOV      M,B                     STORE DOCUEMENT TOTAL
05 007F5   C3FF07   N        ORIF:    XBYT,A,NE,B               COUNT ERROR
05 007F8   B8       A
05 007F9   CAFF07   N
05 007FC   CD9609   N          CALL     DBFDOFLT                DOUBLE FEED FAULT
                             ENDIF
                           ENDIF
05 007FF   C9       A      RET
```

TABLE XIII

```
                            SRSK  SEC      RO:,REL:,L:                APPS-4  B2  09-03-76  G2
                            *
                            *     REV 0    APPS 4 RAD FREEZE                                03-18-76
                            *     REV 1    SPOOLING
                            *
                                  DEFINE   SRSK,SRSKOEV
                                  REFER    MOTOON
                            *
                            *
                            *     SHIFT REGISTER SCHEDULER
                            *
                            *     PRINT STATE BACKGROUND
                            *
05 00000   3A4CF4   A       SRSK  IF:      FLG,SMPLOFLG,T             IS IT A SAMPLE COPY
05 00003   07       A
05 00004   D27300   N
05 00007   2169FD   N               LXI      H,SROVALU:               INITIALIZE H&L AS POINTER
05 0000A   3602     A               MVI      M,SRSMPL:                CLR SROVALU: & SET SAMPLE COPY
05 0000C   3A4BF4   A               IF:      FLG,SMPLOACT,F           IS IT THE START OF THE SEQ
05 0000F   07       A
05 00010   DA3900   N
05 00013   3E80     A                 SFLG     SMPLOACT               YES, SET INDICATOR
05 00015   324BF4   A
05 00018   3A54F4   A                 IF:      FLG,SRTOSEL,T          CHECK FOR COPIFS BEING INVERTED
05 0001B   07       A
05 0001C   D23100   N
05 0001F   3A41F4   A                 ANDIF:   FLG,2SDOFLAG,T         IF THEY ARE START SMPLOCT: AT 0
05 00022   07       A
05 00023   D23100   N
05 00026   3A4AF4   A                 ANDIF:   FLG,SIDEO1,F           TO PUT 2 HOLES IN FRONT OF THE
05 00029   07       A
05 0002A   DA3100   N
05 0002D   AF       A                   XRA      A                    SAMPLE COPY
05 0002E   C33300   N                 ELSE:
05 00031   3E01     A                   MVI      A,1                  IF NOT INVERTED COPIES START
                                      ENDIF                           SMPLOCT: AT 1
05 00033   3268FD   N                 STA      SMPLOCT:
05 00036   C37000   N               ELSE:
05 00039   3A68FD   N                 MODBYT   SMPLOCT:,ADD,1         INCREMENT SAMPLE COPY SEQ COUNT
05 0003C   C601     A
05 0003E   3268FD   N
05 00041   FE02     A                 IF:      XBYT,A,EQ,2            DOES SMPLOCT: = 2
05 00043   C25E00   N
05 00046   CD2301   N                   CALL     IMAGEOCK             YES, CHECK TO SEE IF OK FOR IMG
05 00049   7E       A                   IF:      XBYT,M,AND,SRIMG:,Z  WAS IMAGE BIT SET
05 0004A   E601     A
05 0004C   C25700   N
05 0004F   3E01     A                     MVI      A,1                NO
05 00051   3268FD   N                     STA      SMPLOCT:           PUSH SAMPLE COPY SEQ BACK TO 1
05 00054   C35800   N                   ELSE:
05 00057   AF       A                     XRA      A                  ZERO NO IMAGE COUNTER BECAUSE
05 00058   3267FD   N                     STA      NOIMGCT:           THERE WAS AN IMAGE
                                        ENDIF
05 0005B   C37000   N                 ORIF:    XBYT,A,EQ,3            LOOK FOR END OF SAMPLE COPY SEQ
05 0005E   FE03     A
05 00060   C27000   N
05 00063   AF       A                   CFLG     SMPLOFLG             IT IS THE END
05 00064   324CF4   A
05 00067   324BF4   A                   MODFLG   SMPLOACT             DENOTE END OF SAMPLE
05 0006A   3268FD   N                   STA      SMPLOCT:             0 SAMPLE COPY SEQ COUNTER
05 0006D   2169FD   N                   LXI      H,SROVALU:           & RESTORE H&L BACK TO RIGHT ADD
                                      ENDIF
                                    ENDIF                             END OF SAMPLE COPY
05 00070   C39600   N             ELSE:                               CHECK FOR IMAGE W/O SAMPLE COPY
05 00073   2169FD   N               LXI      H,SROVALU:               INITIALIZE H&L AS POINTER
05 00076   AF       A               XRA      A
05 00077   77       A               MOV      M,A
05 00078   3268FD   N               STA      SMPLOCT:
05 0007B   324BF4   A               MODFLG   SMPLOACT
05 0007E   CD2301   N               CALL     IMAGEOCK                 CHECKS TO SEE IF IMAGE IS ALLOW
05 00081   7E       A               IF:      XBYT,M,AND,SRIMG:,Z      IS IMAGE ALLOW
05 00082   E601     A
05 00084   C29200   N
05 00087   3A67FD   N                 MODBYT   NOIMGCT:,ADD,1         NO, INC #OF NO IMAGES W/O H&L
05 0008A   C601     A
05 0008C   3267FD   N
05 0008F   C39600   N               ELSE:
05 00092   AF       A                 XRA      A                      SINCE IMAGE IS ALLOWED
05 00093   3267FD   N                 STA      NOIMGCT:               0 # OF NO IMAGES
                                    ENDIF
                                  ENDIF                               DONE WITH IMAGE BIT
05 00096   3A67FD   N             IF:      XBYT,NOIMGCT:,LT,2         IF THE # OF NO IMAGE LESS THAN
05 00099   FE02     A
05 0009B   D2A200   N
05 0009E   7E       A               MODBYT   M,OR,SRLOAD1             2 SET LOAD BIT
05 0009F   F610     A
05 000A1   77       A
                                  ENDIF
```

```
05 000A2  3A54F4  A    IF:        FLG,SRTOSEL,T              IS SRT SELECTED
05 000A5  07      A
05 000A6  D2AD00  N
05 000A9  7E      A       MODBYT    M,OR,SRSRT:              YES, SET 'SORTER' BIT IN SR
05 000AA  F620    A
05 000AC  77      A
                       ENDIF
05 000AD  3A41F4  A    IF:        FLG,2SDOFLAG,F             IS IT 2 SIDED COPYING
05 000B0  07      A
05 000B1  DAC600  N
05 000B4  AF      A       CFLG      SD1OTIMO                 SIGNAL COPIES NOT GOING TO AUX
05 000B5  32AEF4  A
05 000B8  3A0DF4  A       IF:       FLG,AXOFLAG,F            SIMPLEX  IS AUX TRAY SELECTED
05 000BB  07      A
05 000BC  DAC300  N
05 000BF  7E      A          MODBYT    M,OR,SRFDR:           NO, SO SET 'MAIN FEEDER' BIT
05 000C0  F608    A
05 000C2  77      A
                          ENDIF
05 000C3  C30A01  N    ORIF:      FLG,SIDEO1,T               2 SD COPY, IS IT SIDE 1
05 000C6  3A4AF4  A
05 000C9  07      A
05 000CA  D2EA00  N
05 000CD  AF      A       CFLG      SD1OTIMO                 ASSUME COPIES NOT GOING TO AUX
05 000CE  32AEF4  A
05 000D1  7E      A       MODBYT    M,OR,SRSD1!!SRFDR:       YES, SET SIDE 1 & MAIN FEEDER
05 000D2  F60C    A
05 000D4  77      A
05 000D5  3A23F4  A       IF:       FLG,ODDOLAST,F           IS IT ODD LAST
05 000D8  07      A
05 000D9  DAE700  N
05 000DC  3E80    A          SFLG      SD1OTIMO              NO, COPIES GOING TO AUX TRAY
05 000DE  32AEF4  A
05 000E1  7E      A          MOV       A,M                   SET INDICATION FOR CYCLE DN
05 000E2  F640    A          MODBYT    A,OR,SRINVG:          TIMING & SET INVERT GATE BIT
05 000E4  E6DF    A          MODBYT    A,AND,NSRSRT:         && CLEAR SORTER BIT IN
05 000E6  77      A          MOV       M,A                   SROVALU:
                          ENDIF
05 000E7  C30A01  N    ELSE:                                  DUPLEX SIDE-2
05 000EA  3A4CF4  A       IF:       FLG,SMPLOFLG,T           IS IT A SAMPLE COPY
05 000ED  07      A
05 000EE  D2F500  N
05 000F1  7E      A          MODBYT    M,OR,SRFDR:           YES,SET FEED FROM MAIN
05 000F2  F608    A
05 000F4  77      A
                          ENDIF
05 000F5  7E      A       IF:       XBYT,M,AND,SRIMG:,NZ     IS THERE A IMAGE
05 000F6  E601    A
05 000F8  CAFF00  N
05 000FB  AF      A          CFLG      SD1OTIMO              YES, CLEAR SD1 CYCLE DN COUNT
05 000FC  32AEF4  A
                          ENDIF
05 000FF  3A54F4  A       IF:       FLG,SRTOSEL,T            ,IS SRT SELECTED FOR THIS JOB
05 00102  07      A
05 00103  D20A01  N
05 00106  7E      A          MODBYT    M,OR,SRINVG:          YES, SET 'INVERTER GATE' BIT
05 00107  F640    A
05 00109  77      A
                          ENDIF
                       ENDIF
05 0010A  3A4CF4  A    IF:        FLG,SMPLOFLG,T             IS THIS IN SAMPLE COPY SEQUENCE
05 0010D  07      A
05 0010E  D21D01  N
05 00111  3A68FD  N    ANDIF:     XBYT,SMPLOCT:,LT,3          & IS SMPL CPY SEQ # .LT. 3
05 00114  FE03    A
05 00116  D21D01  N
05 00119  7E      A       MODBYT    M,AND,NSRINVG!&NSRSRT!   YES, CLR 'INVG' & 'SRT' BITS
05 0011A  E69F    A
05 0011C  77      A
                       ENDIF
05 0011D  3E80    A    SFLG       SRODONE                    INDICATE SHIFT REGISTER DONE
05 0011F  324DF4  A
05 00122  C9      A    RET
                  *
                  *    SUBROUTINE TO CHECK IF IMAGE IS TO BE ALLOW
                  *
05 00123  3A97F4  A  IMAGEOCK IF:  FLG,UPOFLH,F               IS PITCH FOR ADH MOTOR DONE
05 00126  07      A
05 00127  DA6501  N
05 0012A  3A66FD  N       IF:       XBYT,CYCUPCT:,GE,4       NO, IS IT THRU CYCLE UP
05 0012D  FEC4    A
05 0012F  DA6201  N
05 00132  3AAAF4  A       ANDIF:    FLG,CYCLODN!,F              IS CLCLE DOWN PENDING
05 00135  07      A
05 00136  DA6201  N
05 00139  3A42F4  A          IF:       FLG,SRSKO1ST,T        YES, HAS THERE A REQ FOR ORIG
05 0013C  07      A
05 0013D  D25401  N
05 00140  3A23F4  A          ANDIF:    FLG,ODDOLAST,T        YES, IS IT THE ODD LAST ORIG
05 00143  07      A
05 00144  D25401  N
05 00147  06C1    A          ANDIF:    SR,1,SRIMG!,T         YES, HAS THERE BEEN 2 HOLES
05 00149  CD0000  N
05 0014C  E601    A
05 0014E  CA5401  N
05 00151  C35F01  N          ELSE:                           NO, DON'T PUT IN IMAGE
05 00154  2169FD  N             LXI       H,SROVALU:         OTHERWISE RESTORE H&L
05 00157  7E      A             MODBYT    M,OR,SRIMG:        & SET IMAGE BIT
05 00158  F601    A
05 0015A  77      A
05 0015B  AF      A             CFLG      SRSKO1ST           & FORGET REQ OF ORIG
05 0015C  3242F4  A
```

```
                                       ENDIF
05 0015F    2169FD    N                LXI      H,SRØVALU!            RESTØRE H&L BECAUSE ØF SR TEST
                                    ENDIF
05 00162    C36A01    N             ELSE!
05 00165    3E80      A                SFLG     SRSKØ1ST              REMEMBER THAT THERE WAS A REQ
05 00167    3242F4    A                                               ØRIG
                                    ENDIF
05 0016A    C9        A             RET
                          *
                          *         SHIFT REGISTER SCHEDULER EVENT
                          *
                          *         AT SR #4 + 850 CLØCK CØUNTS
                          *
05 0016B    E621      A   SRSKØEV   MØDBYT    A,AND,SRSRT!(SRIMG!     CHECK FØR A SHFET THAT IS GØING
05 0016D    FE21      A             IF!       XBYT,A,EQ,SRSRT!(SRIMG!   TØ THE SØRTER
05 0016F    C27801    N
05 00172    110000    N                LXI      D,MØTØØN              YES, TURN ØN SØRTER MØTØR
05 00175    CD0000    N                CALL     SPØØL!                SPØØL JØB TØ BACKGRØUND LIST
                                    ENDIF
05 00178    110000    N             LXI       D,SRSK                  NØW RUN SH-REG SCHED., BUT
05 0017B    CD0000    N             CALL      SPØØL!                  SPØØL JØB TØ BACKGRØUND LIST
05 0017E    C9        A             RET
                                    END

CØNTRØL SECTIØN SUMMARY! 01 00000   PT 0   02 00000   PT 0   03 00000   PT 0   04 0FFD8   PT 2
                         05 0017F   PT 1
* NØ UNDEFINED SYMBØLS
*    ERRØR SEVERITY LEVEL! 0
* NØ ERRØR LINES
```

TABLE XIV

```
                          *
                          * STANDBY SWITCH SCAN SUBR FØR 2-SIDED CØPYING BUTTØN
                          *
05 00000    3A6BF4    A   2SDØCPY  IF!       FLG,2SDØENAB,T          IS 2-SIDED CØPYING ALLØWED
05 00003    07        A
05 00004    D21E00    N
05 00007    3A41F4    A               IF!       FLG,2SDØFLAG,F       YES, WAS DUPLEX SELECTED PRIØR
05 0000A    07        A
05 0000B    DA1400    N
05 0000E    CD1F00    N                  CALL      MINØDUPL          NØ, CØM DUPLEX SELECTIØN SUBR
05 00011    C31E00    N               ELSE!                          DUPLEX PREVIØUSLY SELECTED
05 00014    2133FD    A                  CFBIT,P   AXDNØFLT,AXUPØFLT CLR AUX DN & UP FLT FLAGS
05 00017    3EFC      A
05 00019    A6        A
05 0001A    77        A
05 0001B    CD4300    N                  CALL      2SDCLEAR          CLR 2-SIDED FEATURE SUBR
                                      ENDIF
                                   ENDIF
05 0001E    C9        A            RET
                          *
                          * SUBR TØ SELECT THE 2-SIDED CØPYING FEATURE
                          *
05 0001F    3E80      A   MINØDUPL SFLG      2SDØFLAG                SIGNAL IN 2-SIDED CØPYING MØDE
05 00021    3241F4    A
05 00024    324AF4    A            MØDFLG    SIDEØ1                  'SIGNAL STARTING WITH SIDE 1'S
05 00027    CD0000    N            SØBIT,S   2SD$CPY,SIDE$1          TELL ØPERATØR DUPLEX SIDE 1
05 0002A    02        A
05 0002B    DF01      A
05 0002D    F001      A
05 0002F    3A38F4    A            LDAFLG    LSTØØRG                 SET ØDD LAST ØRIGINAL FLAG IF
05 00032    3223F4    A            MØDFLG    ØDDØLAST                 THIS IS LAST ADH ØRIG & SIDE 1
05 00035    3A5CE3    A            RNVNIB    AXØNVM                  READ AUX DN &
05 00038    E603      A            MØDBYT    A,AND,(AXDNØFLT!AXUPØFLT)&X'FF'   UP FLTS FRØM NVM
                                   MFBYT,P   SERV13,ØR,A             SET ØR CLR FLT BYTE ACCØRDINGLY
05 0003A    2133FD    A
05 0003D    B6        A
05 0003E    77        A
05 0003F    CD6700    N            CALL      AUXCLEAR                DE-SELECT AUX TRAY ØPTIØN
05 00042    C9        A            RET                               RETURN
```

TABLE XV

```
                          *
                          * INVERTER GATE AND RETURN PITCH EVENT- (SR#5 PLUS 550 CLØCK CØUNTS).
                          *
05 002FB    47        A   INVTRCTL MØV      B,A                      B= A= <SR #6>
05 002FC    3AE3FF    A            IF!      ØBIT,GAT$PULL,T          IS INVTR GATE ØN SEQUENCE GØING
05 002FF    E680      A
05 00301    CA1203    N
05 00304    21E3FF    A               CØBIT,P   GAT$PULL             YES, END IT (0.5 SEC LATER) BY
05 00307    3E7F      A
05 00309    A6        A
05 0030A    77        A
05 0030B    21E2FF    A               SØBIT,P   GAT$HØLD             TURNING ØFF 'PULL' & ØN 'HØLD'
05 0030E    3E80      A
05 00310    B6        A
05 00311    77        A
                                   ENDIF
05 00312    78        A            MØV      A,B                      RELØAD <SR #6>
05 00313    E660      A            MØDBYT   A,AND,SRINVG!(SRSRT!     A= DESTINATIØN BITS
05 00315    07        A            RLC                               RØTATE A-REG
05 00316    07        A            RLC                                        3 BITS
05 00317    07        A            RLC                                              TØ LEFT
05 00318    112803    N            CASE!    VBYT,A                   USE DESTINATIØN BITS AS PNTR
05 0031B    FE04      A
05 0031D    CD0000    N
05 00320    2903      N               C,0       INVØFACE             TØ FACE-UP (SIMPLEX ØR DUP-2)
05 00322    2F03      N               C,1       HØLDSØFF             TØ SRT-NØN (SIMPLX ØR DUP-ØDDL)
05 00324    3A03      N               C,2       INVØAUX              TØ AUX TRAY (DUP-1)
```

```
575   05 00326   6803   N              C,3      INV@SRTI         T0 SRT•INVTD (DUP•2)
576                                ENDCASE
577   05 00328   C9     A          RET                           RETURN T0 INTERRUPTED R0UTINE
```

TABLE XVI

```
591   05 0032F   CD0000   N   H0LDS0FF   C0BIT,S   INVT$S0L     DR0P INVERTER D0UGH•NUT
      05 00332   E67F     A
592                                ENDIF
```

Figure 40A:
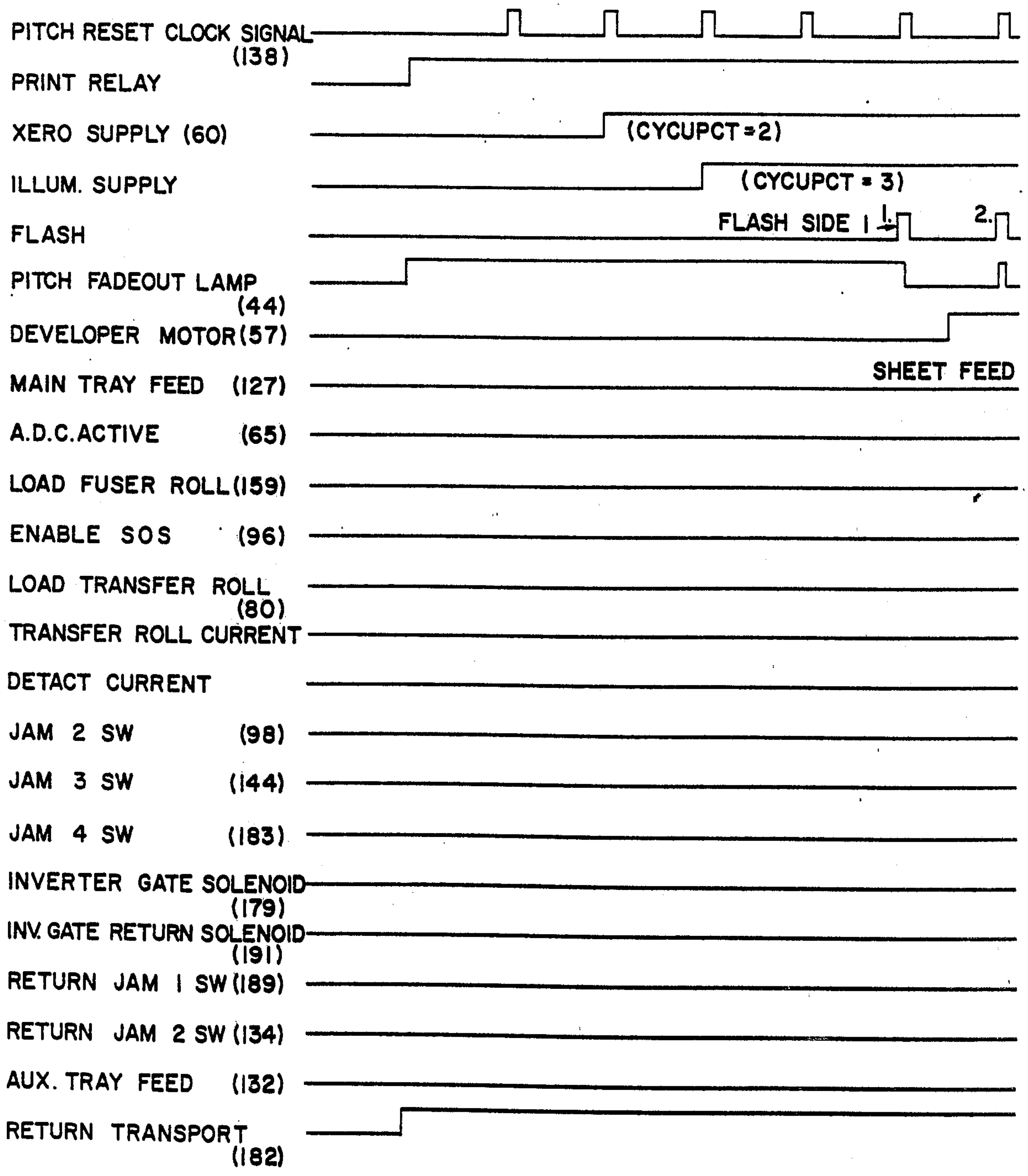
FIG. 40*a*, 40*b*, 40*c* are a timing chart of the principal operating components of the host machine in an exemplary copy run.
Figure 40B:
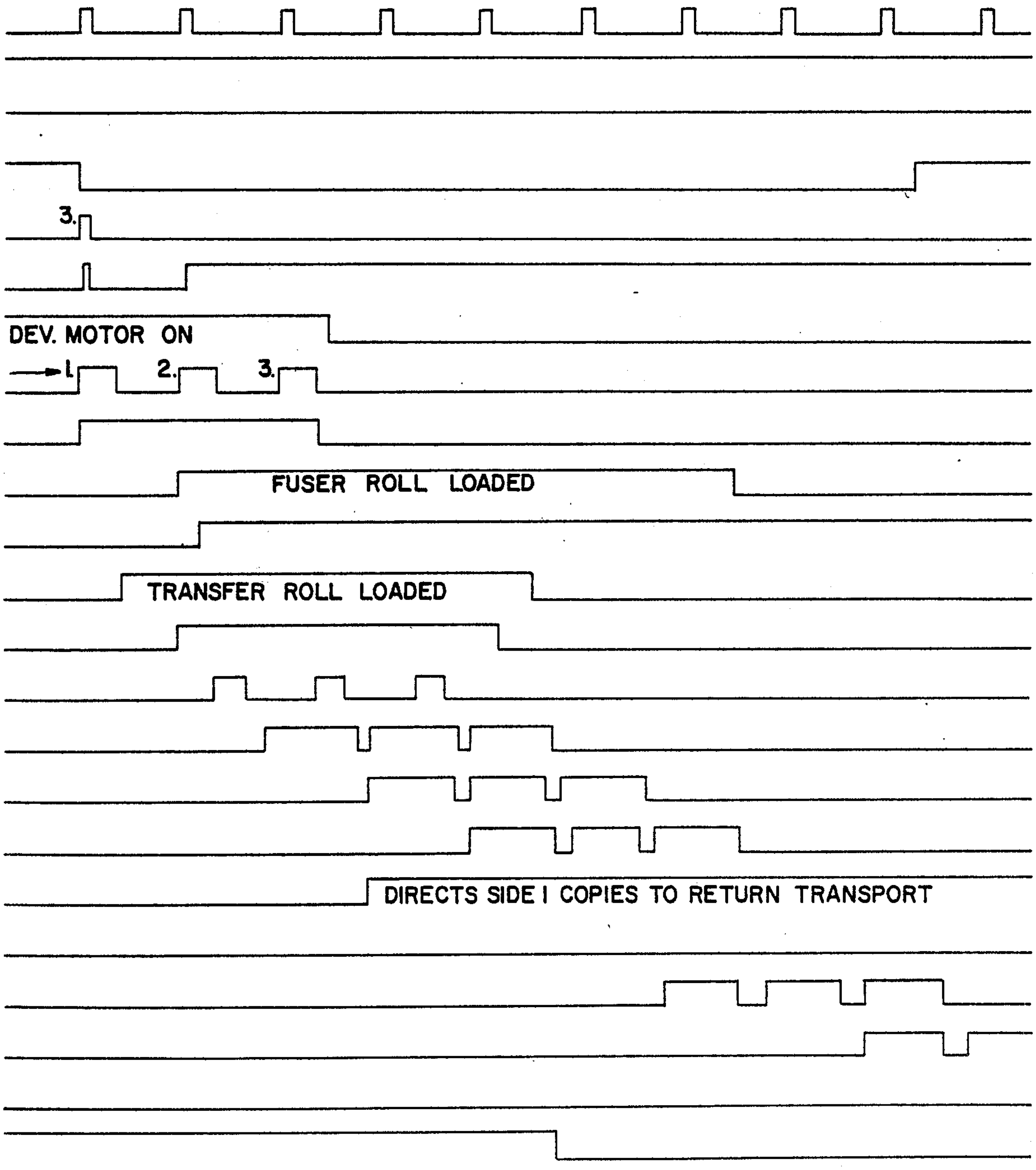
Figure 40C:
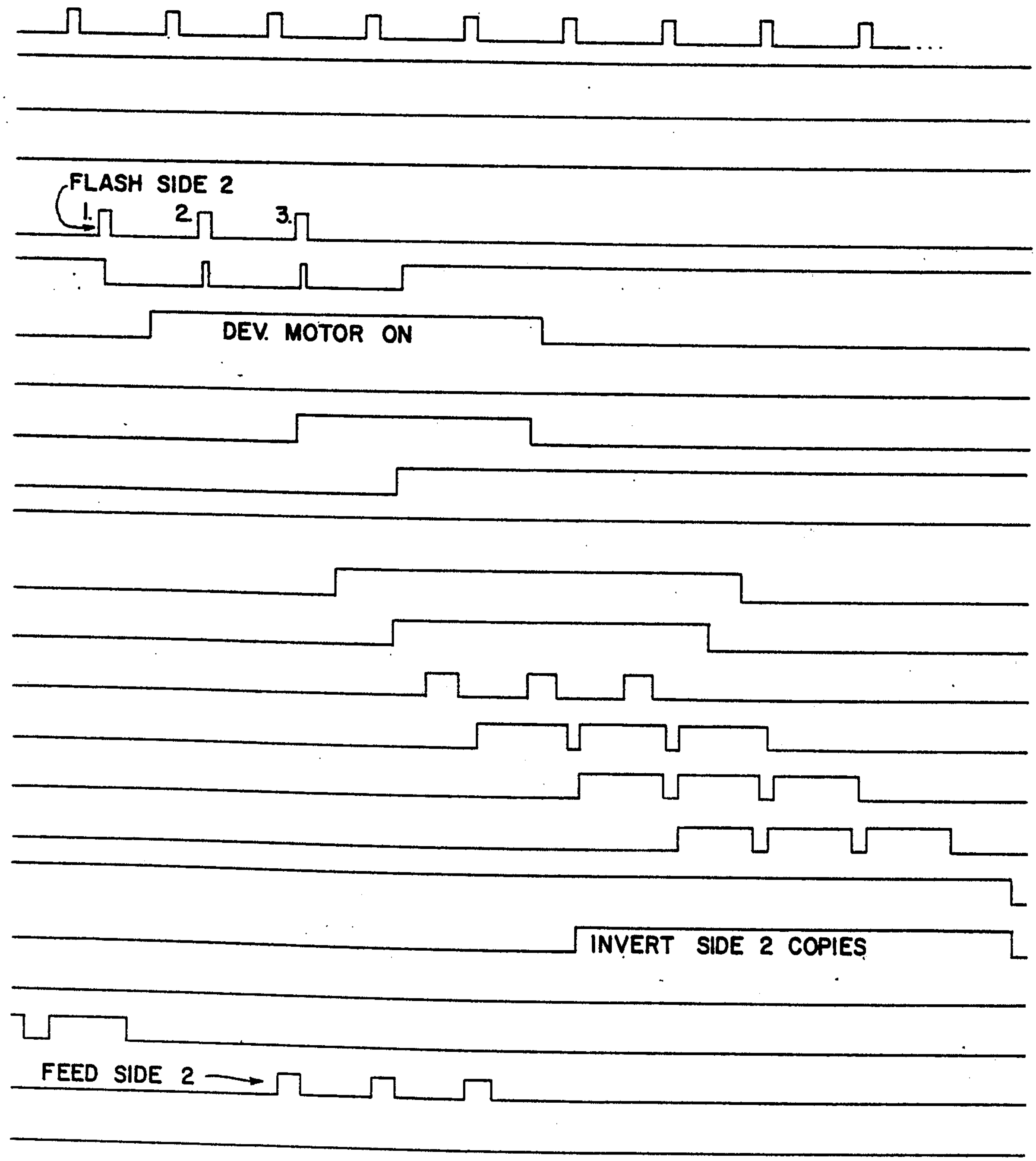

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41:
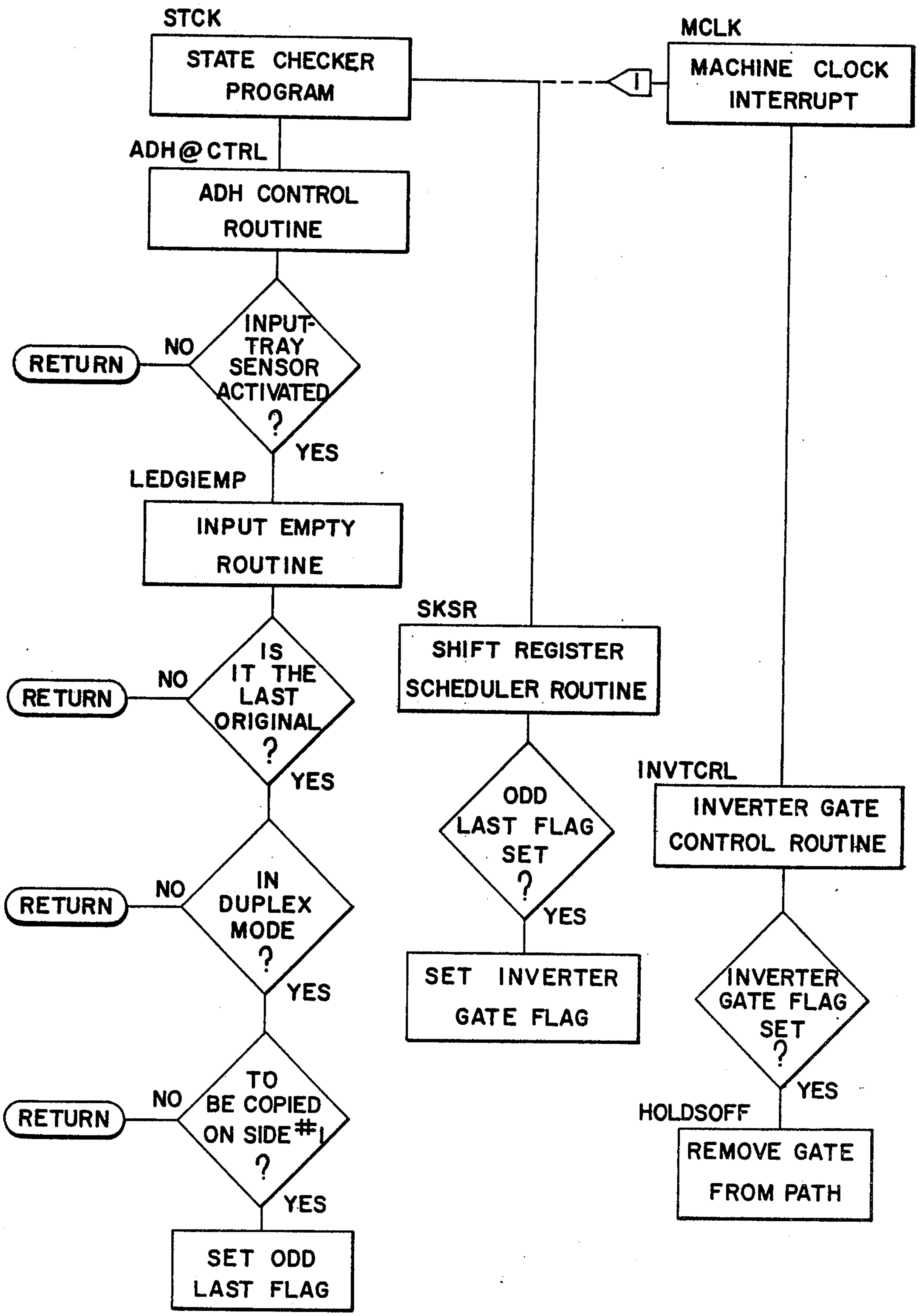
FIG. 41 is a flow chart of the routines for providing automatic control of various machine components during duplex copying.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge patters 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

The present invention is especially concerned with the case where an odd number of single sided or simplex original documents 2 are desired to be copied in a duplex mode, as compared with an even number as just previously described. It can be realized that in such case the machine need only copy an image of the last original onto the front or first side of the copy sheet 3. For example, where three original documents are to be copied in a duplex mode, both sides of the first copy sheet will contain images, while only the front side of the second copy sheet need contain an image. The machine could cycle the second copy sheet through the normal duplex mode by routing the second copy sheet back to the auxiliary tray 102 and then completing the cycle previously described with a blank image being transferred to its backside. However, this would cause unnecessary machine operations resulting in degradation of the machine speed throughput capability since there is no informational image being transferred to the backside of the last copy sheet. To optimize the throughput of the machine this invention provides a control system, under the command of controller 18, which integrally controls various machine components so that the copy sheets are routed directly to the output receptacles when the number of original documents to be copied in the duplex mode is odd in number.

For purpose of illustration assume that there are three originals 2 placed in the document handler 16 (see FIG. 14) with the separator or bail bar 235 being placed on top of the last original. Again for purposes of illustration assume that only one duplex copy of this set is desired to be made. The appropriate buttons of operator console 800 are then pushed as previously described, with specified routines, e.g. the Duplex Select routines 2SD@CPY and MIN@DUPL of Table XIV, setting flags in the computer memory indicating that the machine is in the duplex mode. Similary, another flag is set indicating on which side of the copy sheet the image is to be made. For example, a side 1 flag is set for the first original, a side 2 flag for the second original, with the side 1 flag being reset for the third original, etc. The controller 18 then progresses through its various states in the Background or State Checker routine (see Table I).

Referring now also to FIG. 41, when the controller 18 reaches the PRINT state, the Automatic Document Handler (ADH) Control routine (ADH@CTRL of Table XI) is periodically called, here every 10 milliseconds. Under the command of this routine, the document handler 16 advances the first original 2 onto platen 35 where a latent electrostatic image is formed on belt 20 which is developed and transferred to side one of the first copy sheet 3 fed from main paper tray 100. Turning to FIG. 12, the first copy sheet proceeds through fuser 150, is directed by deflector 184 to return transport 182 and is carried back to auxiliary tray 102 with the image bearing side (side 1) facing upwardly. Under control of the ADH Control routine, the first original 2 is removed from platen 35 via auxiliary transport 276 of document handler 16 and placed on top of bail bar 235. The second original which has been previously fed to a "wait" station underneath sensor 280, is then fed onto platen 35. Now the image of the second original is transferred to the backside or side 2 of the first copy sheet fed from auxiliary paper tray 102 via transport 147. The first copy sheet, which now contains images on both sides, is finished by permanently affixing the transferred image by fuser 150. Deflector 184 which remains in its operative state when sorter 14 is selected now directs the copy sheet via inverter roll 185 towards return transport 182. However, now the stop 190 is activated to intercept the sheet wherein abutment of the leading edge of the copy sheet with stop 190 causes the sheet trailing edge to be guided into discharge chute 186, thus effectively inverting the sheet. The inverted sheet is fed onto transport 181 and into sorter 14 with the side one image facing the bin or tray.

Referring back again to FIG. 14, the second original 2 is fed back to copy tray 233 on top of the first original, which in turn, rests on bail bar 235. The last original, here, original number three which is odd in number, is then fed onto platen 35. However, previous to this, the last original has been fed to the "wait" station underneath sensor 280. When this last document left tray 233, bail bar 235 activates a switch 259 thereby signaling (by setting a flag, LST @ ORG) that this is the last original in the set to be copied.

The activation of switch 259 is sensed by the ADH Control routine which causes it to call another subroutine, the Input Empty routine (LEDGIEMP) shown in Table XII. The Input Empty routine checks flags in specified registers in the computer memory to determine whether the machine is in the duplex mode and whether the image of the last document is to be made on side one of the copy sheets. If so, a specified coded bit or flag, herein termed the odd last flag (ODD @ LAST), is stored in a predetermined location in the memory. In such a manner, the controller realizes that the last document to be placed on platen 35 by the document handler 16 is to be duplex copied and is odd in number. It should be realized that the entire set of original documents need not be odd in number for this to occur. For example, if there were four originals in the set, but only the last three originals were desired to be duplex copied, the last original would still be an odd number to be duplex copied.

The State Checker routine of Table I while in the main body of the PRINT state subsequently calls a Shift Register Scheduler routine shown in Table XIII. As previously described, the Shift Register Schedule routine controls the timing of the activation of various machine components, of which primary concern here is the activation of deflector 184. The shift register schedule routine reads the specified location in the memory which now contains the odd last flag. Accordingly, this routine provides a signal which indicates that the inverter gate or deflector 184 should be removed from the paper path and schedules at which time the event should occur, with the routine again storing this information is a specified location in the Run Event Table of FIG. 35.

The Inverter Gate Control routine of Table XV controls the operation of deflector 184. This routine is a fixed pitch event (see Table II) which is entered through the Machine Clock Interrupt routine (Table IX) at a predetermined clock count. The Inverter Gate routine interrogates the information for this copy run which has been stored by the Shift Register Scheduler routine. If that information indicates that the inverter gate should be removed from the paper path, it calls another routine (HOLDSOFF of Table XVI) which removes the deflector 184 from the paper path.

Hence, when the image of the last original, here, original number three is transferred to the second copy sheet fed from main paper tray 100, the deflector 184 is removed from the paper path so that the finished copy sheet proceeds directly to the sorter 14. In such manner, the last copy sheet is not returned through the duplex cycle, i.e. to the auxiliary tray, for subsequently forming an unneeded copy on its backside when the number of originals to be duplex copied is odd. Accordingly, the throughput of the machine is optimized by the limiting unnecessary machine operations.

The various features of the present invention have been illustrated according to the patent statutes by describing a reproduction machine, a programmable digital computer, and programs for instructing the computer to carry out the claimed functions. However, it should be understood that the spirit of this invention can also be performed by hardwired circuitry if it is desired to do so, for example, by integrated circuit devices which contain the same basic elements which are only temporarily utilized by the computer when instructed by the software programs. Therefore, while this invention has been described in connection with particular examples thereof, no limitation is intended thereby except as defined in the appended claims.

What is claimed is:

1. In a reproduction machine capable of making duplex copies from original documents, said machine including document handler means for locating the documents in seriatim on an exposure platen, and means for forming a finished copy of each document on one side of a copy sheet, wherein the improvement comprises:

a receptacle for receiving the finished copy sheets;

deflector means for preventing said copy sheets from entering said receptacle and for directing said copy sheets to a container from which the copy sheets are subsequently fed to form images on their opposite sides; and control means for inhibiting said deflector means when the last original document to be duplex copied is odd in number so that the finished copy sheets thereof proceed to said receptacle without being returned to the container.

2. The improvement of claim 1 which further comprises means in the document handler for sensing when the last document is to be copied.

3. The improvement of claim 2 which further comprises means for indicating whether the images are to be formed on the first or second side of the copy sheets.

4. The improvement of claim 3 which further comprises comparator means coupled to said document handler sensing means and said copy side indicator means for determining whether the last document will be copied on the first side of the copy sheets, with said comparator means providing an output signal in such instances to the control means to inhibit said deflector means.

5. The improvement of claim 1 wherein said reproduction machine is controlled by a digital computer being instructed by a master program including a plurality of subroutines, said master program periodically calling a document handler subroutine which provides a coded signal when the last document is to be copied on the first side of the copy sheets, said output signal being stored in a specified location in the memory of the computer; and wherein another subroutine monitors that memory location to determine whether that particular coded signal is present and, if so, provides a signal to the control means for inhibiting said deflector means.

6. A method of operating a reproduction machine to make duplex copies from a plurality of original documents, said method comprising the steps of:

placing said documents in seriatim on an exposure platen for making copies therefrom;

sensing the last document to be copied before copies are actually formed therefrom;

determining whether the last document is to be copied on a first or second side of a copy sheet;

forming at least one finished copy of said last document on only one side of a copy sheet if said last document is to be copied on the first side;

placing said copies in a receptacle; and terminating further machine operation.

7. The method of claim 6 wherein the steps are synchronously timed by a digital computer.

8. A method of operating a reproduction machine to provide duplex copies while optimizing the speed throughput of the machine, said machine including a document handler for feeding original documents in seriatim to an exposure platen, means for forming latent electrostatic images on a photoreceptor, means for developing said image, means for transferring said image to one side of copy sheets, means for providing finished copies by permanently affixing said transferred image to the copy sheets, means for inverting said finished copy sheets and returning them to a container, means for refeeding the inverted copy sheets from the container to provide finished images on their opposite sides, and an output receptacle for receiving the finished copies, the method comprising the steps of;

sensing whether the number of original documents in the document handler is odd in number; and depositing the finished copy sheets bearing images from the last original into the receptacle without being returned to the container if the last document is odd in number.

9. The method of claim 8 wherein the machine is operated under the control of a digital computer being instructed by a master program including a plurality of subroutines, said master program periodically calling document handler subroutine which provides a coded output signal when the last document is to be copied on the first side of the copy sheets, said output signal being stored in a specified location in the memory of the computer; and wherein another subroutine monitors that memory location to determine whether that particular coded signal is present and, if so, provides a control signal to prevent inversion of the copy sheets so that they proceed to the receptacle without being returned to the container.

10. The method of claim 9 which further includes the steps of:

placing the originals in a tray in the document handler;

placing a separator member on top of the last original;

sensing when the last original under the separator has left the tray; and providing a coded output signal which is readable by the document handler subroutine thereby indicating that the last document is about to be copied.

* * * * *